US012169842B2

(12) United States Patent
Bronicki

(10) Patent No.: US 12,169,842 B2
(45) Date of Patent: Dec. 17, 2024

(54) TRIGGERING IMAGE PROCESSING BASED ON INFRARED DATA ANALYSIS

(71) Applicant: Trax Technology Solutions Pte Ltd., Singapore (SG)

(72) Inventor: Youval Bronicki, Los Altos, CA (US)

(73) Assignee: Trax Technology Solutions Pte Ltd., Singapore (SG)

( * ) Notice: Subject to any disclaimer, the term of this patent is extended or adjusted under 35 U.S.C. 154(b) by 398 days.

(21) Appl. No.: 17/555,914

(22) Filed: Dec. 20, 2021

(65) Prior Publication Data
US 2022/0157040 A1  May 19, 2022

Related U.S. Application Data

(63) Continuation of application No. PCT/IB2021/000773, filed on Nov. 11, 2021.
(Continued)

(51) Int. Cl.
*G06V 10/20* (2022.01)
*G06Q 10/087* (2023.01)
(Continued)

(52) U.S. Cl.
CPC ......... *G06Q 30/014* (2013.01); *G06Q 10/087* (2013.01); *G06Q 30/018* (2013.01);
(Continued)

(58) Field of Classification Search
CPC ............. G06Q 30/014; G06Q 30/0601; G06Q 30/018; G06Q 10/087; G06Q 30/0639;
(Continued)

(56) References Cited

U.S. PATENT DOCUMENTS 10,612,964 B1 * 4/2020 Shi .................... G01G 19/42
2019/0088096 A1 * 3/2019 King ................ G08B 13/19665
(Continued)

FOREIGN PATENT DOCUMENTS

WO   WO 2018/002709 A2   1/2018
WO   WO 2019/048924 A1   3/2019
WO   WO 2019/140091 A1   7/2019

OTHER PUBLICATIONS

International Search Report and Written Opinion issued in PCT International Application No. PCT/US2021/000773, dated Apr. 3, 2022 (11 pages).

*Primary Examiner* — Congvan Tran
(74) *Attorney, Agent, or Firm* — Haynes and Boone, LLP

(57) ABSTRACT

A method for triggering image processing based on vibration data analysis may include receiving vibration data captured using a vibration sensor mounted to a shelving unit including; analyzing the vibration data to determine whether a vibration is a result of an engagement of a person with a retail shelf; in response to a determination that the vibration is the result of the engagement of the person with the retail shelf, triggering analysis of an image of captured after the beginning of the engagement of the person with the retail shelf; in response to a determination that the vibration is not the result of the engagement of the person with the retail shelf, forgoing triggering the analysis of the image; and providing information based on a result of the analysis of the image.

20 Claims, 27 Drawing Sheets

Related U.S. Application Data

(60) Provisional application No. 63/113,490, filed on Nov. 13, 2020.

(51) Int. Cl.
| | |
|---|---|
| *G06Q 30/014* | (2023.01) |
| *G06Q 30/018* | (2023.01) |
| *G06Q 30/0601* | (2023.01) |
| *G06T 7/00* | (2017.01) |
| *G06T 7/10* | (2017.01) |
| *G06T 7/11* | (2017.01) |
| *G06T 7/20* | (2017.01) |
| *G06V 10/12* | (2022.01) |
| *G06V 10/147* | (2022.01) |
| *G06V 10/22* | (2022.01) |
| *G06V 10/764* | (2022.01) |
| *G06V 20/52* | (2022.01) |
| *H04N 7/18* | (2006.01) |
| *H04N 23/61* | (2023.01) |
| *H04N 23/80* | (2023.01) |

(52) U.S. Cl.
CPC ..... *G06Q 30/0601* (2013.01); *G06Q 30/0639* (2013.01); *G06T 7/0004* (2013.01); *G06T 7/10* (2017.01); *G06T 7/11* (2017.01); *G06T 7/20* (2013.01); *G06V 10/12* (2022.01); *G06V 10/147* (2022.01); *G06V 10/225* (2022.01); *G06V 10/255* (2022.01); *G06V 10/764* (2022.01); *G06V 20/52* (2022.01); *H04N 7/188* (2013.01); *H04N 23/61* (2023.01); *H04N 23/80* (2023.01); *G06T 2207/10016* (2013.01); *G06T 2207/10028* (2013.01); *G06T 2207/10048* (2013.01); *G06T 2207/20084* (2013.01); *G06T 2207/30242* (2013.01)

(58) Field of Classification Search
CPC . G06T 7/20; G06T 7/0004; G06T 7/11; G06T 7/10; G06T 2207/30242; G06T 2207/10028; G06T 2207/10048; G06T 2207/10016; G06T 2207/20084; H04N 23/60; H04N 5/33; H04N 7/188; H04N 7/181; H04N 23/65; H04N 23/80; H04N 23/61; G06V 10/143; G06V 10/255; G06V 10/12; G06V 40/20; G06V 10/764; G06V 10/147; G06V 20/52; G06V 10/225
See application file for complete search history.

(56) References Cited

U.S. PATENT DOCUMENTS

| | | | |
|---|---|---|---|
| 2019/0213390 A1 | 7/2019 | Adato et al. | |
| 2020/0118401 A1* | 4/2020 | Zalewski | G07G 1/0072 |
| 2020/0184230 A1* | 6/2020 | Liu | G06T 7/70 |
| 2020/0184444 A1* | 6/2020 | Gu | G07G 1/0036 |
| 2021/0133835 A1* | 5/2021 | Gu | G06Q 10/08 |
| 2021/0182922 A1* | 6/2021 | Zheng | H04N 23/69 |

* cited by examiner

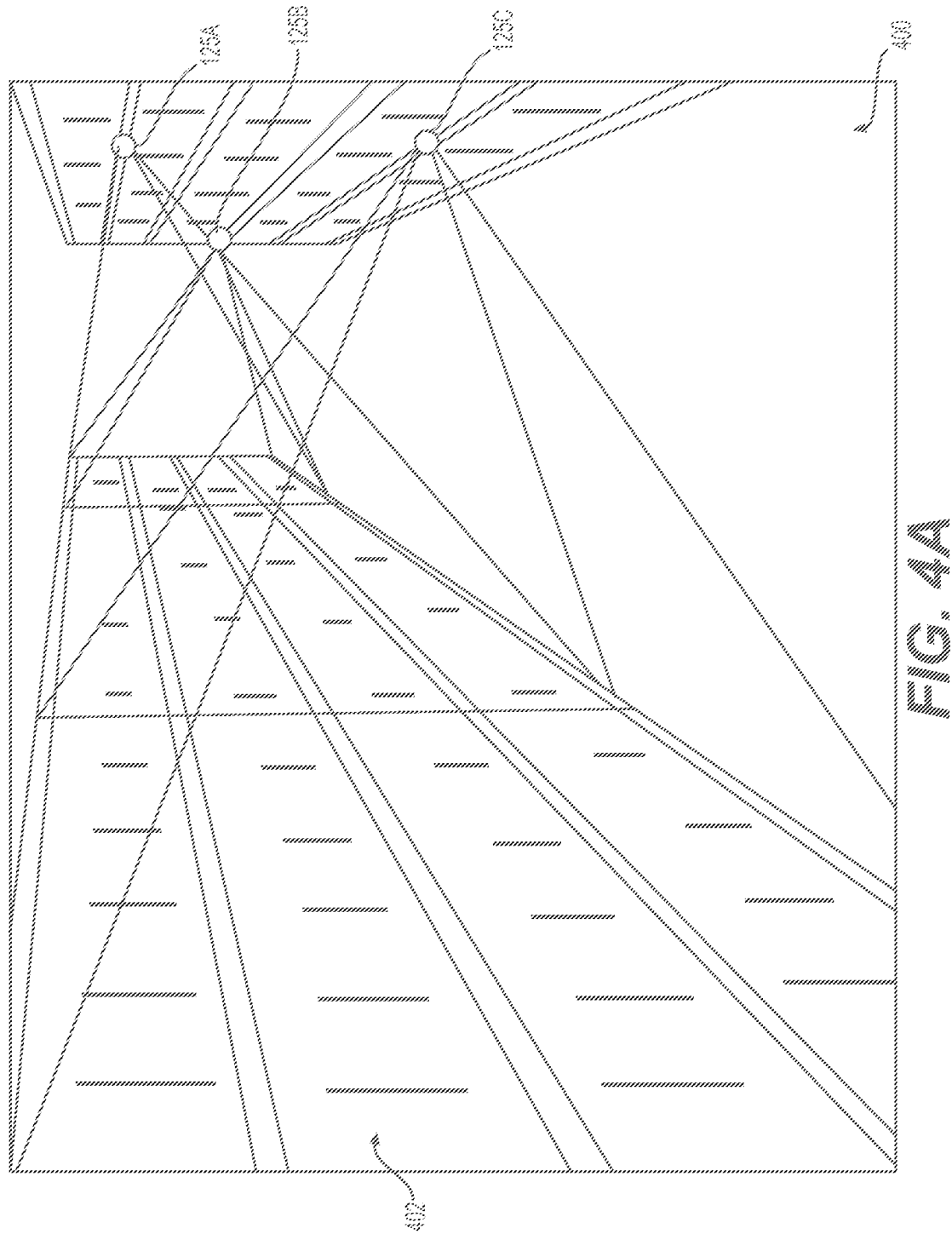

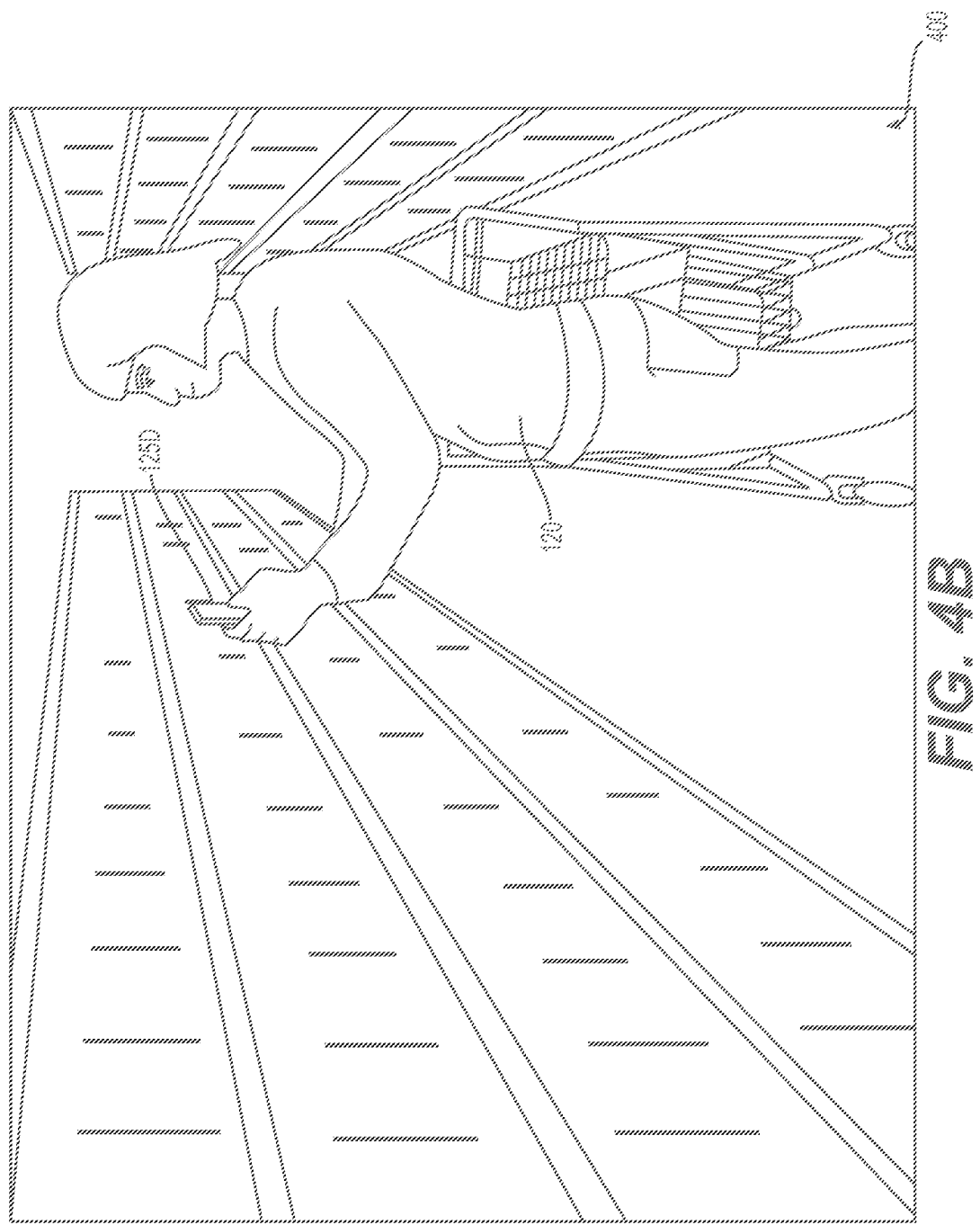

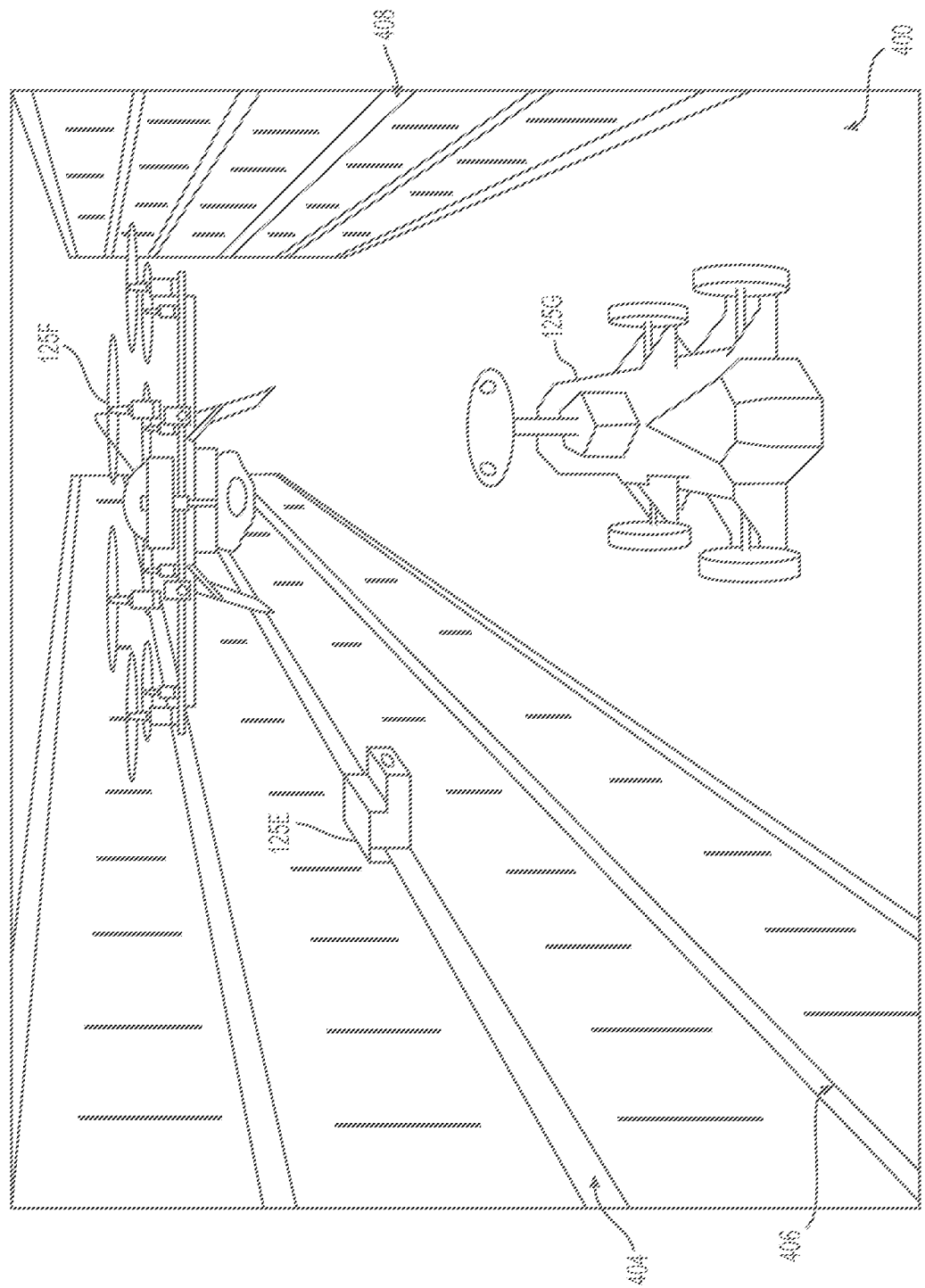

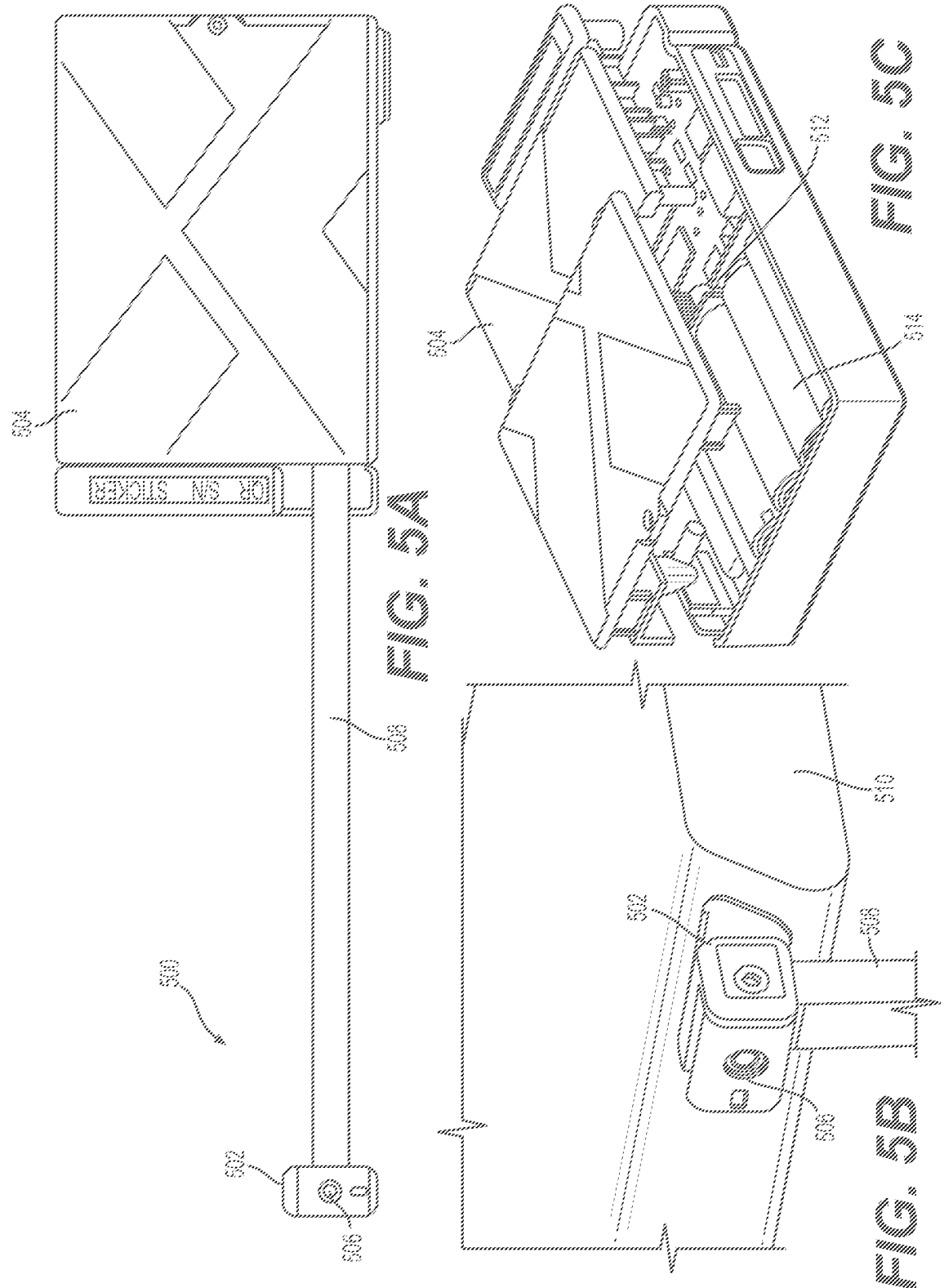

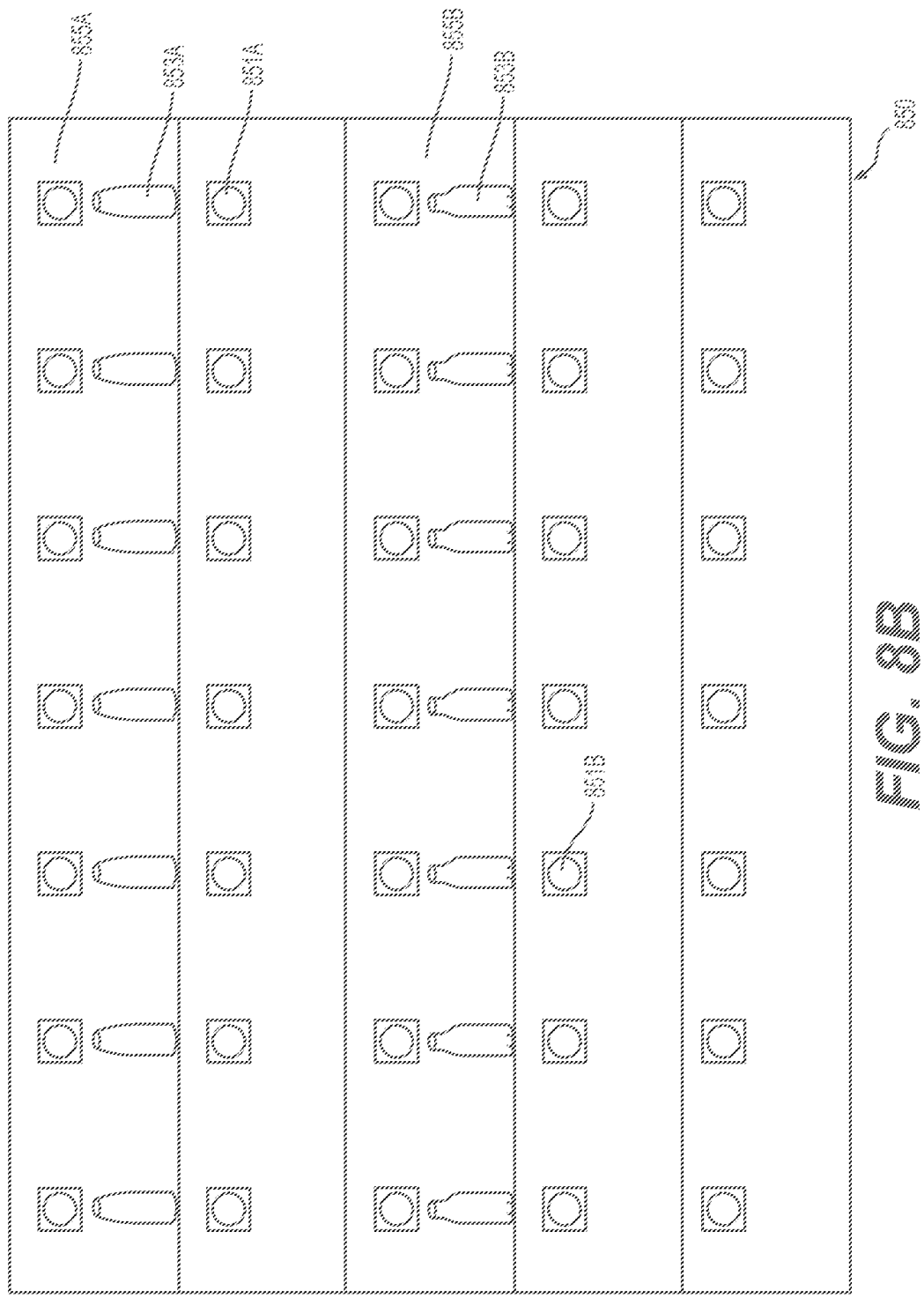

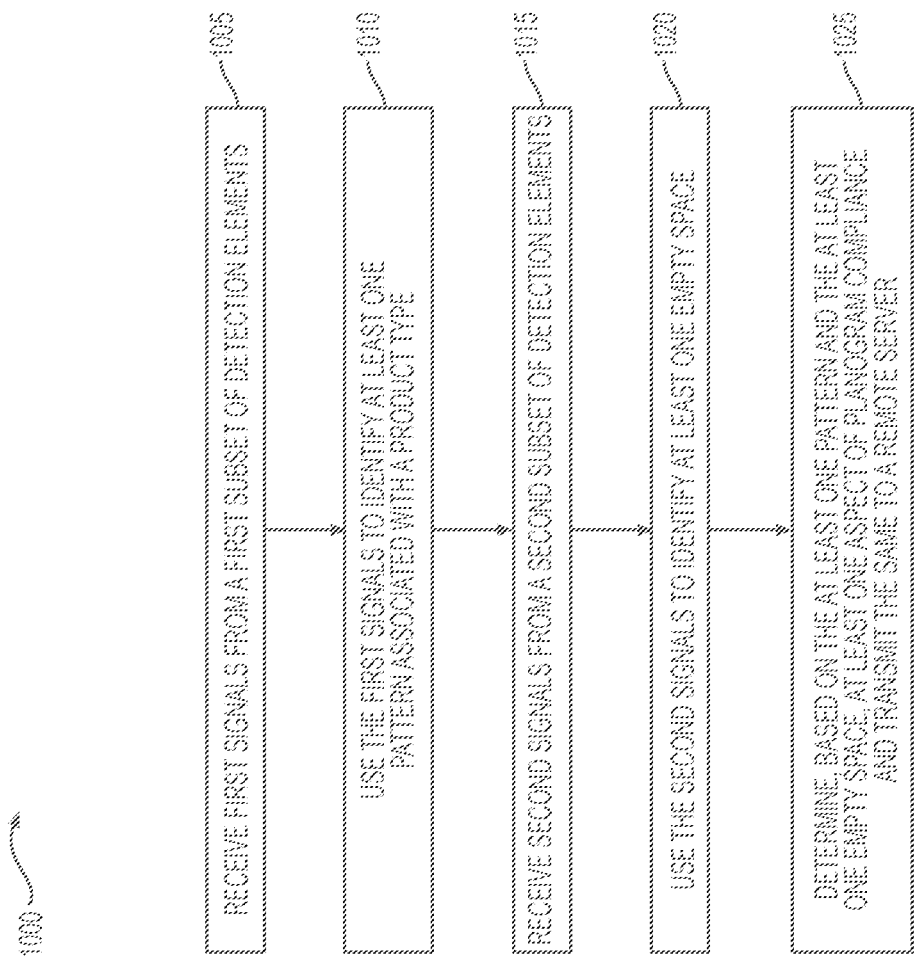

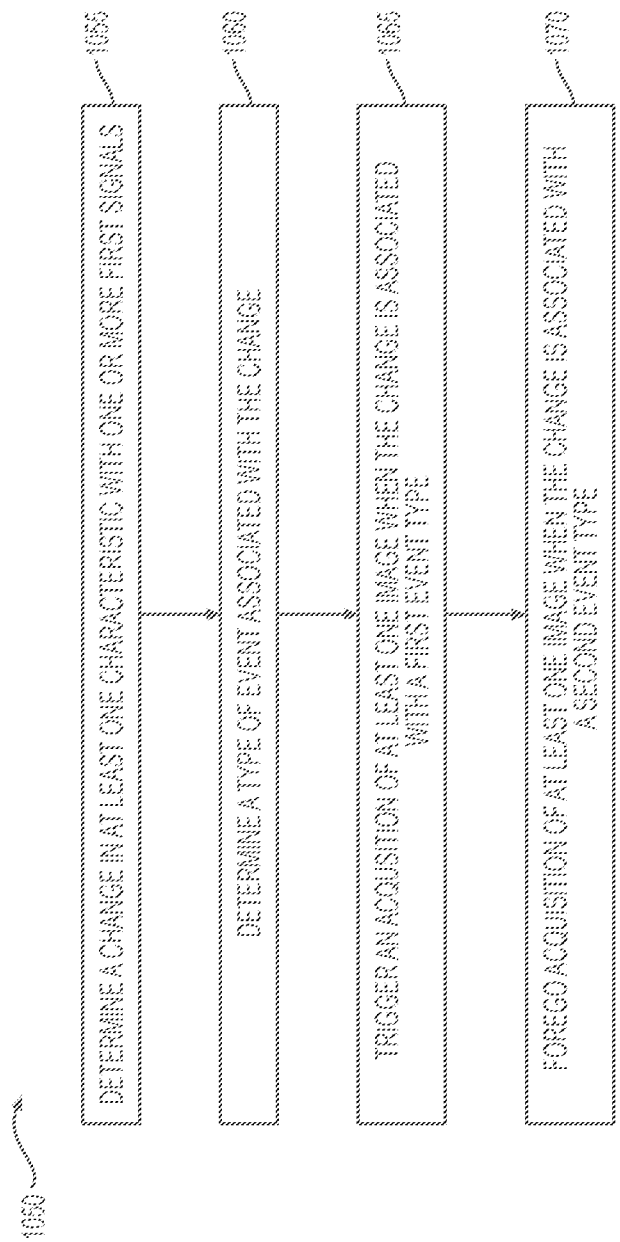

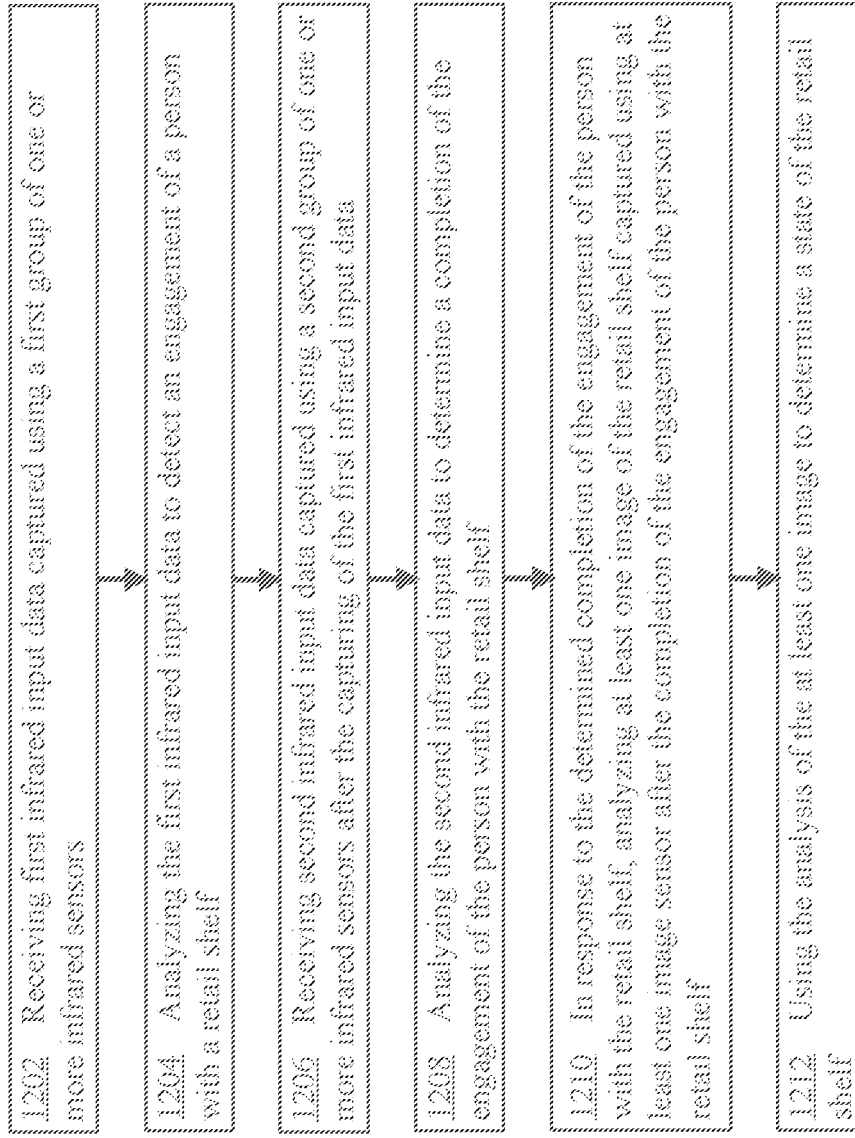

TRIGGERING IMAGE PROCESSING BASED ON INFRARED DATA ANALYSIS

This application is a continuation of PCT International Application No. PCT/IB2021/000773, filed Nov. 11, 2021, which claims the benefit of priority of U.S. Provisional Application No. 63/113,490, filed Nov. 13, 2020. The foregoing applications are incorporated herein by reference in their entirety.

BACKGROUND

I. Technical Field

The present disclosure relates generally to systems and methods for deriving information from sensors in retail environment, and more specifically to systems and methods for deriving information from image, infrared and vibration sensors in retail environment.

II. Background Information

Shopping in stores is a prevalent part of modern daily life. Storeowners (also known as "retailers") stock a wide variety of products in retail stores and add associated labels and promotions in the retail stores. Managing and operating retail stores efficiently is an ongoing effort consuming tremendous resources. Placing cameras in the retail stores, and using image analysis to determine information for enhancing and improving retail stores operation and management is becoming prevalent. However, in large scale, image analysis is still expensive, and the level of details and accuracy of the information derived from the image analysis is still insufficient for many tasks.

The disclosed devices and methods are directed to providing new ways for deriving information in retail stores in an efficient manner.

SUMMARY

Embodiments consistent with the present disclosure provide methods, systems, and computer-readable media are provided for deriving information from sensors in retail environment. Some non-limiting examples of such sensors may include image sensors, infrared sensors, vibration sensors, and so forth.

In some embodiments, methods, systems, and computer-readable media are provided for triggering image processing based on infrared data analysis.

In some examples, first infrared input data captured using a first group of one or more infrared sensors may be received. The first infrared input data may be analyzed to detect an engagement of a person with a retail shelf. Second infrared input data captured using a second group of one or more infrared sensors after the capturing of the first infrared input data may be received. The second infrared input data may be analyzed to determine a completion of the engagement of the person with the retail shelf. In one example, for example in response to the determined completion of the engagement of the person with the retail shelf, at least one image of the retail shelf captured using at least one image sensor after the completion of the engagement of the person with the retail shelf may be analyzed. The analysis of the at least one image may be used to determine a state of the retail shelf.

In some examples, the first group of one or more infrared sensors may be a group of one or more passive infrared sensors. In some examples, the first group of one or more infrared sensors may be identical to the second group of one or more infrared sensors. In some examples, the first group of one or more infrared sensors may be a group of one or more infrared sensors positioned below a second retail shelf, the second retail shelf is positioned above the retail shelf.

In some examples, the determined state of the retail shelf may include an inventory data associated with products on the retail shelf after the engagement of the person with the retail shelf. In some examples, the determined state of the retail shelf may include facings data associated with products on the retail shelf after the engagement of the person with the retail shelf. In some examples, the determined state of the retail shelf may include planogram compliance status associated with the retail shelf after the engagement of the person with the retail shelf.

In some examples, the analysis of the at least one image and an analysis of one or more images of the retail shelf captured using the at least one image sensor before the engagement of the person with the retail shelf may be used to determine a change associated with the retail shelf during the engagement of the person with the retail shelf.

In some examples, the at least one image sensor may be at least one image sensor mounted to a second retail shelf. In some examples, the at least one image sensor may be at least one image sensor mounted to an image capturing robot.

In some examples, for example in response to the determined completion of the engagement of the person with the retail shelf, the capturing of the at least one image of the retail shelf using the at least one image sensor may be triggered.

In some examples, the first infrared input data may be analyzed to determine a type of the engagement of the person with the retail shelf. Further, in some examples, in response to a first determined type of the engagement, the analyzing the at least one image of the retail shelf may be triggered, and in response to a second determined type of the engagement, analyzing the at least one image of the retail shelf may be forgone.

In some examples, the first infrared input data may be analyzed to determine a type of the engagement of the person with the retail shelf. Further, in one example, in response to a first determined type of the engagement, a first analysis step may be included in the analysis of the at least one image of the retail shelf, and in response to a second determined type of the engagement, a second analysis step may be included in the analysis of the at least one image of the retail shelf. The second analysis step may differ from the first analysis step.

In some examples, the determination of the completion of the engagement of the person with the retail shelf may be a determination that the person cleared an environment of the retail shelf.

In some examples, a convolution of at least part of the first infrared input data may be calculated. Further, in some examples, in response to a first value of the calculated convolution of the at least part of the first infrared input data, the engagement of a person with a retail shelf may be detected, and in response to a second value of the calculated convolution of the at least part of the first infrared input data, detecting the engagement of a person with a retail shelf may be forgone.

In some examples, for example in response to the detected engagement of a person with a retail shelf, one or more images of the retail shelf captured before the completion of the engagement of the person with the retail shelf may be analyzed to determine at least one aspect of the engagement.

In one example, a virtual shopping cart associated with the person may be updated based on the determined at least one aspect of the engagement. In one example, the analysis of the at least one image of the retail shelf captured after the completion of the engagement of the person with the retail shelf and the determined at least one aspect of the engagement may be used to determine the state of the retail shelf.

In some embodiments, methods, systems, and computer-readable media are provided for triggering image processing based on vibration data analysis.

In some examples, vibration data captured using one or more vibration sensors mounted to a shelving unit including a plurality of retail shelves may be received. The vibration data may be analyzed to determine whether a vibration is a result of an engagement of a person with at least one retail shelf of the plurality of retail shelves. In one example, in response to a determination that the vibration is the result of the engagement of the person with the at least one retail shelf of the plurality of retail shelves, analysis of at least one image of at least part of the plurality of retail shelves captured after the beginning of the engagement of the person with the at least one retail shelf of the plurality of retail shelves may be triggered, and in response to a determination that the vibration is not the result of the engagement of the person with the at least one retail shelf of the plurality of retail shelves, triggering the analysis of the at least one image may be forgone. In one example, information may be provided based on a result of the analysis of the at least one image of the at least part of the plurality of retail shelves.

In some examples, the plurality of retail shelves may include at least a first retail shelf and a second retail shelf. The vibration data may be analyzed to determine that the vibration is a result of an engagement with the first retail shelf of the plurality of retail shelves and not a result of an engagement with the second retail shelf of the plurality of retail shelves. In one example, for example in response to the determination that the vibration is a result of an engagement with the first retail shelf of the plurality of retail shelves and not a result of an engagement with the second retail shelf of the plurality of retail shelves, including images depicting the second shelf in the at least one image may be avoided.

In some examples, the at least one image may be at least one image of the at least part of the plurality of retail shelves captured after a completion of the engagement of the person with the at least one retail shelf. In one example, the vibration data may be analyzed to determine the completion of the engagement of the person with the at least one retail shelf. In one example, one or more images of the at least one retail shelf may be analyzed to determine the completion of the engagement of the person with the at least one retail shelf. In one example, infrared data captured using at least one infrared sensor may be analyzed to determine a completion of the engagement of the person with the at least one retail shelf. In one example, the analysis of the at least one image of the at least part of the plurality of retail shelves may be used to determine a state of at least one retail shelf after the completion of the engagement. For example, the determined state of the at least one retail shelf may include an inventory data associated with products on the at least one retail shelf after the completion of the engagement, the inventory data is determined using the analysis of the at least one image. In another example, the determined state of the at least one retail shelf may include facings data associated with products on the at least one retail shelf after the completion of the engagement, the facings data is determined using the analysis of the at least one image. In yet another example, the determined state of the at least one retail shelf may include planogram compliance status of the at least one retail shelf after the completion of the engagement, and the planogram compliance status may be determined using the analysis of the at least one image. In an additional example, the analysis of the at least one image and an analysis of one or more images of the at least one retail shelf captured using the at least one image sensor before the engagement may be used to determine a change associated with the at least one retail shelf during the engagement.

In some examples, the at least one image may be captured using at least one image sensor mounted to a retail shelf not included in the at least one retail shelf. In some examples, the at least one image may be captured using at least one image sensor mounted to an image capturing robot. In some examples, the at least one image may be captured using at least one image sensor mounted to a ceiling of a retail store. In some examples, the at least one image may be captured using at least one image sensor included in a personal mobile device.

In some examples, for example, in response to the determination that the vibration is a result of the engagement of the person with the at least one retail shelf, capturing of the at least one image of the at least part of the plurality of retail shelves may be triggered.

In some examples, the vibration data may be analyzed to determine a type of the engagement of the person with the at least one retail shelf. In one example, in response to a first determined type of the engagement, a first analysis step may be included in the analysis of the at least one image of the at least part of the plurality of retail shelves, and in response to a second determined type of the engagement, a second analysis step may be included in the analysis of the at least one image of the at least part of the plurality of retail shelves, the second analysis step differs from the first analysis step.

In some examples, the vibration data may be analyzed to determine a type of the engagement of the person with the at least one retail shelf. In one example, in response to a first determined type of the engagement, the analysis of the at least one image of the at least part of the plurality of retail shelves may be triggered, and in response to a second determined type of the engagement, triggering the analysis of the at least one image of the at least part of the plurality of retail shelves may be forgone.

In some embodiments, methods, systems, and computer-readable media are provided for forgoing image processing in response to infrared data analysis.

In some examples, infrared input data captured using one or more infrared sensors may be received. The infrared input data may be analyzed to detect a presence of an object in an environment of a retail shelf. In one example, in response to no detected presence of an object in the environment of the retail unit, at least one image of the retail shelf captured using at least one image sensor may be analyzed, and in response to a detection of presence of an object in the environment of the retail unit, analyzing the at least one image of the retail shelf captured using the at least one image sensor may be forgone.

In some examples, the at least one image sensor may be at least one image sensor mounted to a second retail shelf. In some examples, the at least one image sensor may be at least one image sensor mounted to an image capturing robot. In some examples, the at least one image sensor may be at least one image sensor mounted to a ceiling of a retail store. In some examples, the at least one image sensor may be a part of a personal mobile device.

In some examples, the analysis of the at least one image may be used to determine a state of the retail shelf. In some examples, the environment of the retail shelf may include an area between the at least one image sensor and at least part of the retail shelf. In some examples, the one or more infrared sensors may be one or more infrared sensors physically coupled with the at least one image sensor. In some examples, the one or more infrared sensors may be one or more passive infrared sensors. In some examples, the object may be at least one of a person, a robot, and an inanimate object.

In some examples, the infrared input data may be analyzed to determine a portion of a field of view of the at least one image sensor associated with the object. In one example, in response to a first determined portion of the field of view of the at least one image sensor associated with the object, the at least one image of the retail shelf captured using the at least one image sensor, and in response to a second determined portion of the field of view of the at least one image sensor associated with the object, analyzing the at least one image of the retail shelf captured using the at least one image sensor may be forgone. In one example, the field of view of the at least one image sensor may differ from the field of view of the one or more infrared sensors.

In some examples, the infrared input data may be analyzed to determine a type of the object. In one example, in response to a first determined type of the object, the at least one image of the retail shelf captured using the at least one image sensor may be analyzed, and in response to a second determined type of the object, analyzing the at least one image of the retail shelf captured using the at least one image sensor may be forgone.

In some examples, the infrared input data may be analyzed to determine a duration associated with the presence of an object in the environment of the retail shelf. The determined duration may be compared with a threshold. In one example, in response to a first result of the comparison, the at least one image of the retail shelf captured using the at least one image sensor may be analyzed, and in response to a second result of the comparison, analyzing the at least one image of the retail shelf captured using the at least one image sensor may be forgone. In one example, the threshold may be selected based on at least one product type associated with the retail shelf. In one example, the threshold may be selected based on a status of the retail shelf determined using image analysis of one or more images of the retail shelf captured using the at least one image sensor before the capturing of the infrared input data. In one example, the threshold may be selected based on a time of day.

In some examples, in response to no detected presence of an object in the environment of the retail unit, the at least one image of the retail shelf using the at least one image sensor may be captured, and in response to a detection of presence of an object in the environment of the retail unit, the capturing of the at least one image of the retail shelf may be forgone.

In some embodiments, methods, systems, and computer-readable media are provided for robust action recognition in retail environment.

In some examples, infrared data captured using one or more infrared sensors from a retail environment may be received. Further, at least one image captured using at least one image sensor from the retail environment may be received. The infrared data and the at least one image may be analyzed to detect an action performed in the retail environment. In one example, information based on the detected action may be provided.

In some examples, the action may include at least one of picking a product from a retail shelf, placing a product on a retail shelf and moving a product on a retail shelf. In some examples, detecting the action performed in the retail environment may include recognizing a type of the action. In some examples, detecting the action performed in the retail environment may include at least one of identifying a product type associated with the action and determining a quantity of products associated with the action. In some examples, the at least one image may include at least one three-dimensional image.

In some examples, a convolution of at least part of the at least one image may be calculated to obtain a value of the calculated convolution. Further, the value of the calculated convolution may be used to analyze the infrared data to detect the action performed in the retail environment.

In some examples, a convolution of at least part of the infrared data may be calculated to obtain a value of the calculated convolution. Further, the value of the calculated convolution may be used to analyze the at least one image to detect the action performed in the retail environment.

In some examples, a convolution of at least part of the at least one image may be calculated to obtain a value of the calculated convolution. Further, the infrared data may be analyzed to determine a wavelength associated with the infrared data. In one example, in response to a first combination of the value of the calculated convolution and the wavelength associated with the infrared data, the action performed in the retail environment may be detected, and in response to a second combination of the value of the calculated convolution and the wavelength associated with the infrared data, the detection of the action performed in the retail environment may be forgone.

In some examples, the infrared data may include a time series of samples captured using the one or more infrared sensors at different points in time. In one example, the time series of samples may be analyzed to select the at least one image of a plurality of images. In one example, two samples of the time series of samples may be compared to one another, and a result of the comparison may be used to analyze the at least one image to detect the action performed in the retail environment.

In some examples, the at least one image may include a plurality of frames of a video captured using the at least one image sensor. In one example, two frames of the plurality of frames may be compared to one another, and a result of the comparison may be used to analyze the infrared data to detect the action performed in the retail environment.

In some examples, the infrared data may be analyzed to select a portion of the at least one image, and the selected portion of the at least one image may be analyzed to detect the action performed in the retail environment.

In some examples, the infrared data may be analyzed to attempt to detect the action performed in the retail environment, and in response to a failure of the attempt to successfully detect the action, the at least one image may be analyzed to detect the action performed in the retail environment. In one example, the failure to successfully detect the action may be a failure to successfully detect the action at a confidence level higher than a selected threshold. In another example, the failure to successfully detect the action may be a failure to determine at least one aspect of the action. In yet another example, in response to a failure to successfully detect the action, the capturing of the at least one image using the at least one image sensor may be triggered.

In some embodiments, methods, systems, and computer-readable media are provided for using vibration data analysis and image analysis for robust action recognition in retail environment.

In some examples, vibration data captured using one or more vibration sensors mounted to a shelving unit including at least one retail shelf may be received. Further, at least one image captured using at least one image sensor from a retail environment including the shelving unit may be received. The vibration data and the at least one image may be analyzed to detect an action performed in the retail environment. In one example, information based on the detected action may be provided.

In some examples, the action may include at least one of picking a product from a retail shelf, placing a product on a retail shelf and moving a product on a retail shelf. In some examples, detecting the action performed in the retail environment may include recognizing a type of the action. In some examples, detecting the action performed in the retail environment may include at least one of identifying a product type associated with the action and determining a quantity of products associated with the action. In some examples, the at least one image may include at least one three-dimensional image.

In some examples, a convolution of at least part of the at least one image may be calculated to obtain a value of the calculated convolution. Further, the value of the calculated convolution may be used to analyze the vibration data to detect the action performed in the retail environment.

In some examples, a convolution of at least part of the vibration data to obtain a value of the calculated convolution may be calculated. Further, the value of the calculated convolution may be used to analyze the at least one image to detect the action performed in the retail environment.

In some examples, a convolution of at least part of the at least one image to obtain a value of the calculated convolution may be calculated. Further, the vibration data may be analyzed to determine a frequency associated with the vibration data. In one example, in response to a first combination of the value of the calculated convolution and the frequency associated with the vibration data, the action performed in the retail environment may be detected, and in response to a second combination of the value of the calculated convolution and the frequency associated with the vibration data, the detection of the action performed in the retail environment may be forgone.

In some examples, the vibration data may include a time series of samples captured using the one or more vibration sensors at different points in time. For example, the time series of samples may be analyzed to select the at least one image of a plurality of images. In another example, two samples of the time series of samples may be compared to one another, and a result of the comparison may be used to analyze the at least one image to detect the action performed in the retail environment.

In some examples, the at least one image may include a plurality of frames of a video captured using the at least one image sensor. In one example, two frames of the plurality of frames may be compared to one another, and a result of the comparison may be used to analyze the vibration data to detect the action performed in the retail environment.

In some examples, the vibration data may be analyzed to select a portion of the at least one image, and the selected portion of the at least one image may be analyzed to detect the action performed in the retail environment.

In some examples, the vibration data may be analyzed to attempt to detect the action performed in the retail environment, and in response to a failure of the attempt to successfully detect the action, the at least one image may be analyzed to detect the action performed in the retail environment. In one example, the failure to successfully detect the action may be a failure to successfully detect the action at a confidence level higher than a selected threshold. In another example, the failure to successfully detect the action may be a failure to determine at least one aspect of the action. In one example, for example, in response to a failure to successfully detect the action, the capturing of the at least one image using the at least one image sensor may be triggered.

Consistent with other disclosed embodiments, non-transitory computer-readable medium including instructions that when executed by a processor may cause the processor to perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 4A is a schematic illustration of an example configuration for capturing image data in a retail store, consistent with the present disclosure.

FIG. 4B is a schematic illustration of another example configuration for capturing image data in a retail store, consistent with the present disclosure.

FIG. 4C is a schematic illustration of another example configuration for capturing image data in a retail store, consistent with the present disclosure.

FIG. 5A is an illustration of an example system for acquiring images of products in a retail store, consistent with the present disclosure.

FIG. 5B is an illustration of a shelf-mounted camera unit included in a first housing of the example system of FIG. 5A, consistent with the present disclosure.

FIG. 5C is an exploded view illustration of a processing unit included in a second housing of the example system of FIG. 5A, consistent with the present disclosure.

FIG. 8B is a schematic illustration of another example configuration for detecting products and empty spaces on a store shelf, consistent with the present disclosure.

FIG. 10A illustrates an exemplary method for monitoring planogram compliance on a store shelf, consistent with the present disclosure.

FIG. 10B is illustrates an exemplary method for triggering image acquisition based on product events on a store shelf, consistent with the present disclosure.

FIG. 12 provides a flowchart of an exemplary method for triggering image processing based on infrared data analysis, consistent with the present disclosure.

DETAILED DESCRIPTION

Figure 1:
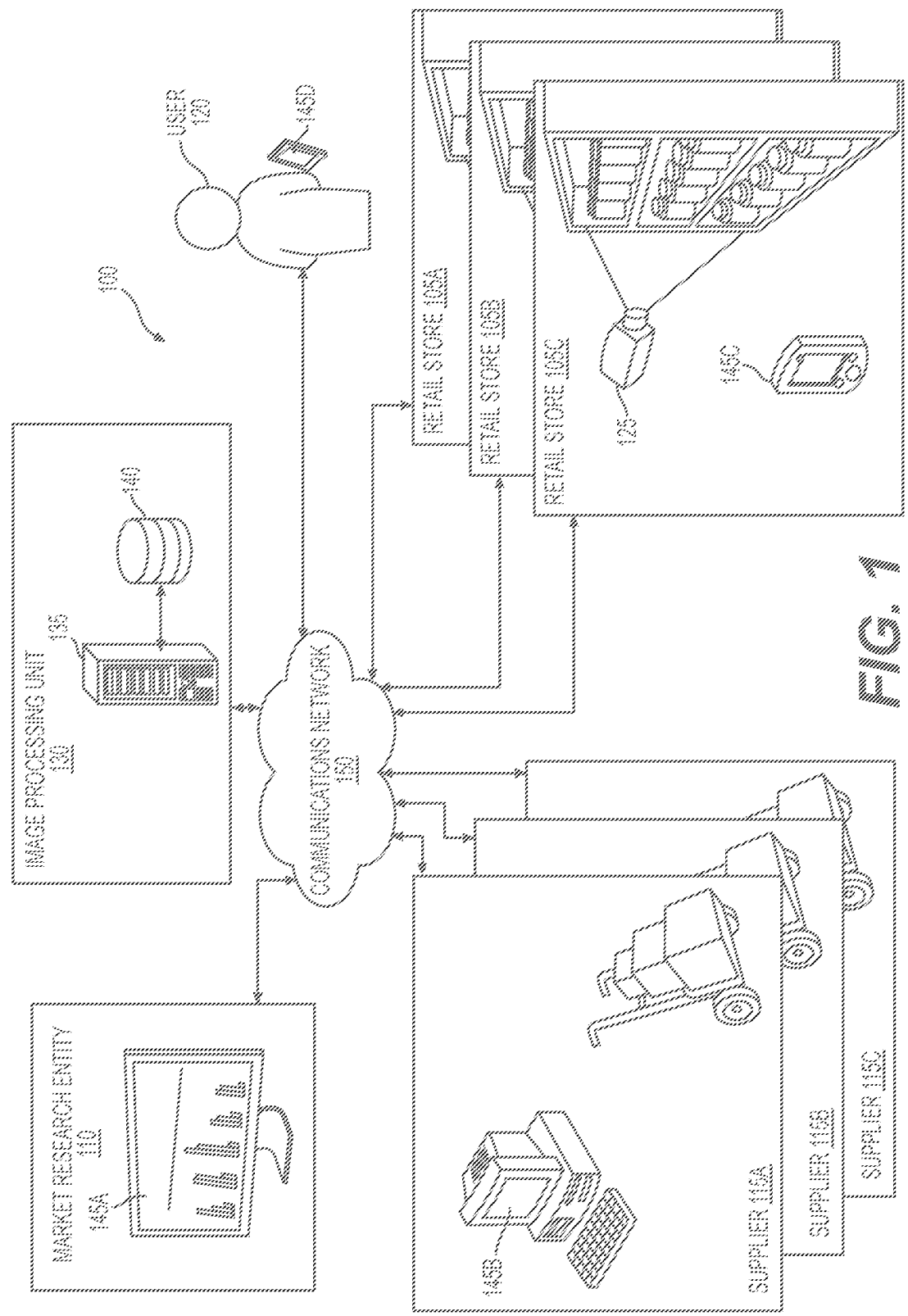
FIG. 1 is an illustration of an exemplary system for analyzing information collected from a retail store.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The present disclosure is directed to systems and methods for processing images captured in a retail store. As used herein, the term "retail store" or simply "store" refers to an establishment offering products for sale by direct selection by customers physically or virtually shopping within the establishment. The retail store may be an establishment operated by a single retailer (e.g., supermarket) or an establishment that includes stores operated by multiple retailers (e.g., a shopping mall). Embodiments of the present disclosure include receiving an image depicting a store shelf having at least one product displayed thereon. As used herein, the term "store shelf" or simply "shelf" refers to any suitable physical structure which may be used for displaying products in a retail environment. In one embodiment, the store shelf may be part of a shelving unit including a number of individual store shelves. In another embodiment, the store shelf may include a display unit having a single-level or multi-level surfaces.

Consistent with the present disclosure, the system may process images and image data acquired by a capturing device to determine information associated with products displayed in the retail store. The term "capturing device" refers to any device configured to acquire image data representative of products displayed in the retail store. Examples of capturing devices may include a digital camera, a time-of-flight camera, a stereo camera, an active stereo camera, a depth camera, a Lidar system, a laser scanner, CCD based devices, or any other sensor based system capable of converting received light into electric signals. The term "image data" refers to any form of data generated based on optical signals in the near-infrared, infrared, visible, and ultraviolet spectrums (or any other suitable radiation frequency range). Consistent with the present disclosure, the image data may include pixel data streams, digital images, digital video streams, data derived from captured images, and data that may be used to construct a 3D image. The image data acquired by a capturing device may be transmitted by wired or wireless transmission to a remote server. In one embodiment, the capturing device may include a stationary camera with communication layers (e.g., a dedicated camera fixed to a store shelf, a security camera, and so forth). Such an embodiment is described in greater detail below with reference to FIG. 4A. In another embodiment, the capturing device may include a handheld device (e.g., a smartphone, a tablet, a mobile station, a personal digital assistant, a laptop, and more) or a wearable device (e.g., smart glasses, a smartwatch, a clip-on camera). Such an embodiment is described in greater detail below with reference to FIG. 4B. In another embodiment, the capturing device may include a robotic device with one or more cameras operated remotely or autonomously (e.g., an autonomous robotic device, a drone, a robot on a track, and more). Such an embodiment is described in greater detail below with reference to FIG. 4C.

In some embodiments, the capturing device may include one or more image sensors. The term "image sensor" refers to a device capable of detecting and converting optical signals in the near-infrared, infrared, visible, and ultraviolet spectrums into electrical signals. The electrical signals may be used to form image data (e.g., an image or a video stream) based on the detected signal. Examples of image sensors may include semiconductor charge-coupled devices (CCD), active pixel sensors in complementary metal-oxide-semiconductor (CMOS), or N-type metal-oxide-semiconductors (NMOS, Live MOS). In some cases, the image sensor may be part of a camera included in the capturing device.

Embodiments of the present disclosure further include analyzing images to detect and identify different products. As used herein, the term "detecting a product" may broadly refer to determining an existence of the product. For example, the system may determine the existence of a plurality of distinct products displayed on a store shelf. By detecting the plurality of products, the system may acquire different details relative to the plurality of products (e.g., how many products on a store shelf are associated with a same product type), but it does not necessarily gain knowledge of the type of product. In contrast, the term "identifying a product" may refer to determining a unique identifier associated with a specific type of product that allows inventory managers to uniquely refer to each product type in a product catalogue. Additionally or alternatively, the term "identifying a product" may refer to determining a unique identifier associated with a specific brand of products that allows inventory managers to uniquely refer to products, e.g., based on a specific brand in a product catalogue. Additionally or alternatively, the term "identifying a product" may refer to determining a unique identifier associated with a specific category of products that allows inventory managers to uniquely refer to products, e.g., based on a specific category in a product catalogue. In some embodiments, the identification may be made based at least in part on visual characteristics of the product (e.g., size, shape, logo, text, color, and so forth). The unique identifier may include any codes that may be used to search a catalog, such as a series of digits, letters, symbols, or any combinations of digits, letters, and symbols. Consistent with the present disclosure, the terms "determining a type of a product" and "determining a product type" may also be used interchangeably in this disclosure with reference to the term "identifying a product."

Embodiments of the present disclosure further include determining at least one characteristic of the product for determining the type of the product. As used herein, the term "characteristic of the product" refers to one or more visually discernable features attributed to the product. Consistent with the present disclosure, the characteristic of the product may assist in classifying and identifying the product. For example, the characteristic of the product may be associated with the ornamental design of the product, the size of the product, the shape of the product, the colors of the product, the brand of the product, a logo or text associated with the product (e.g., on a product label), and more. In addition, embodiments of the present disclosure further include determining a confidence level associated with the determined type of the product. The term "confidence level" refers to any indication, numeric or otherwise, of a level (e.g., within a predetermined range) indicative of an amount of confidence the system has that the determined type of the product is the actual type of the product. For example, the confidence level may have a value between 1 and 10, alternatively, the confidence level may be expressed as a percentage.

In some cases, the system may compare the confidence level to a threshold. The term "threshold" as used herein denotes a reference value, a level, a point, or a range of values, for which, when the confidence level is above it (or below it depending on a particular use case), the system may follow a first course of action and, when the confidence level is below it (or above it depending on a particular use case), the system may follow a second course of action. The value of the threshold may be predetermined for each type of product or may be dynamically selected based on different considerations. In one embodiment, when the confidence level associated with a certain product is below a threshold, the system may obtain contextual information to increase the confidence level. As used herein, the term "contextual information" (or "context") refers to any information having a direct or indirect relationship with a product displayed on a store shelf. In some embodiments, the system may retrieve different types of contextual information from captured image data and/or from other data sources. In some cases, contextual information may include recognized types of products adjacent to the product under examination. In other cases, contextual information may include text appearing on the product, especially where that text may be recognized (e.g., via OCR) and associated with a particular meaning. Other examples of types of contextual information may include logos appearing on the product, a location of the product in the retail store, a brand name of the product, a price of the product, product information collected from multiple retail stores, product information retrieved from a catalog associated with a retail store, etc.

Reference is now made to FIG. 1, which shows an example of a system 100 for analyzing information collected from retail stores 105 (for example, retail store 105A, retail store 105B, and retail store 105C). In one embodiment, system 100 may represent a computer-based system that may include computer system components, desktop computers, workstations, tablets, handheld computing devices, memory devices, and/or internal network(s) connecting the components. System 100 may include or be connected to various network computing resources (e.g., servers, routers, switches, network connections, storage devices, etc.) necessary to support the services provided by system 100. In one embodiment, system 100 may enable identification of products in retail stores 105 based on analysis of captured images. In another embodiment, system 100 may enable a supply of information based on analysis of captured images to a market research entity 110 and to different suppliers 115 of the identified products in retail stores 105 (for example, supplier 115A, supplier 115B, and supplier 115C). In another embodiment, system 100 may communicate with a user 120 (sometimes referred to herein as a customer, but which may include individuals associated with a retail environment other than customers, such as store employee, data collection agent, etc.) about different products in retail stores 105. In one example, system 100 may receive images of products captured by user 120. In another example, system 100 may provide to user 120 information determined based on automatic machine analysis of images captured by one or more capturing devices 125 associated with retail stores 105.

System 100 may also include an image processing unit 130 to execute the analysis of images captured by the one or more capturing devices 125. Image processing unit 130 may include a server 135 operatively connected to a database 140. Image processing unit 130 may include one or more servers connected by a communication network, a cloud platform, and so forth. Consistent with the present disclosure, image processing unit 130 may receive raw or processed data from capturing device 125 via respective communication links, and provide information to different system components using a network 150. Specifically, image processing unit 130 may use any suitable image analysis technique including, for example, object recognition, object detection, image segmentation, feature extraction, optical character recognition (OCR), object-based image analysis, shape region techniques, edge detection techniques, pixel-based detection, artificial neural networks, convolutional neural networks, etc. In addition, image processing unit 130 may use classification algorithms to distinguish between the different products in the retail store. In some embodiments, image processing unit 130 may utilize suitably trained machine learning algorithms and models to perform the product identification. Network 150 may facilitate communications and data exchange between different system components when these components are coupled to network 150 to enable output of data derived from the images captured by the one or more capturing devices 125. In some examples, the types of outputs that image processing unit 130 can generate may include identification of products, indicators of product quantity, indicators of planogram compliance, indicators of service-improvement events (e.g., a cleaning event, a restocking event, a rearrangement event, etc.), and various reports indicative of the performances of retail stores 105. Additional examples of the different outputs enabled by image processing unit 130 are described below with reference to FIGS. 11A-11E and throughout the disclosure.

Consistent with the present disclosure, network 150 may be any type of network (including infrastructure) that provides communications, exchanges information, and/or facilitates the exchange of information between the components of system 100. For example, network 150 may include or be part of the Internet, a Local Area Network, wireless network (e.g., a Wi-Fi/302.11 network), or other suitable connections. In other embodiments, one or more components of system 100 may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), and so forth.

In one example configuration, server 135 may be a cloud server that processes images received directly (or indirectly) from one or more capturing device 125 and processes the images to detect and/or identify at least some of the plurality of products in the image based on visual characteristics of the plurality of products. The term "cloud server" refers to a computer platform that provides services via a network, such as the Internet. In this example configuration, server 135 may use virtual machines that may not correspond to individual hardware. For example, computational and/or storage capabilities may be implemented by allocating appropriate portions of desirable computation/storage power from a scalable repository, such as a data center or a distributed computing environment. In one example, server 135 may implement the methods described herein using customized hard-wired logic, one or more Application Specific Integrated Circuits (ASICs) or Field Programmable Gate Arrays (FPGAs), firmware, and/or program logic which, in combination with the computer system, cause server 135 to be a special-purpose machine.

In another example configuration, server 135 may be part of a system associated with a retail store that communicates with capturing device 125 using a wireless local area network (WLAN) and may provide similar functionality as a cloud server. In this example configuration, server 135 may communicate with an associated cloud server (not shown) and cloud database (not shown). The communications between the store server and the cloud server may be used in a quality enforcement process, for upgrading the recognition engine and the software from time to time, for extracting information from the store level to other data users, and so forth. Consistent with another embodiment, the communications between the store server and the cloud server may be discontinuous (purposely or unintentional) and the store server may be configured to operate independently from the cloud server. For example, the store server may be configured to generate a record indicative of changes in product placement that occurred when there was a limited connection (or no connection) between the store server and the cloud server, and to forward the record to the cloud server once connection is reestablished.

As depicted in FIG. 1, server 135 may be coupled to one or more physical or virtual storage devices such as database 140. Server 135 may access database 140 to detect and/or identify products. The detection may occur through analysis of features in the image using an algorithm and stored data. The identification may occur through analysis of product features in the image according to stored product models. Consistent with the present embodiment, the term "product model" refers to any type of algorithm or stored product data that a processor may access or execute to enable the identification of a particular product associated with the product model. For example, the product model may include a description of visual and contextual properties of the particular product (e.g., the shape, the size, the colors, the texture, the brand name, the price, the logo, text appearing on the particular product, the shelf associated with the particular product, adjacent products in a planogram, the location within the retail store, and so forth). In some embodiments, a single product model may be used by server 135 to identify more than one type of products, such as, when two or more product models are used in combination to enable identification of a product. For example, in some cases, a first product model may be used by server 135 to identify a product category (such models may apply to multiple product types, e.g., shampoo, soft drinks, etc.), and a second product model may be used by server 135 to identify the product type, product identity, or other characteristics associated with a product. In some cases, such product models may be applied together (e.g., in series, in parallel, in a cascade fashion, in a decision tree fashion, etc.) to reach a product identification. In other embodiments, a single product model may be used by server 135 to identify a particular product type (e.g., 6-pack of 16 oz Coca-Cola Zero).

Database 140 may be included on a volatile or non-volatile, magnetic, semiconductor, tape, optical, removable, non-removable, or other type of storage device or tangible or non-transitory computer-readable medium. Database 140 may also be part of server 135 or separate from server 135. When database 140 is not part of server 135, server 135 may exchange data with database 140 via a communication link. Database 140 may include one or more memory devices that store data and instructions used to perform one or more features of the disclosed embodiments. In one embodiment, database 140 may include any suitable databases, ranging from small databases hosted on a workstation to large databases distributed among data centers. Database 140 may also include any combination of one or more databases controlled by memory controller devices (e.g., server(s), etc.) or software. For example, database 140 may include document management systems, Microsoft SQL databases, SharePoint databases, Oracle™ databases, Sybase™ databases, other relational databases, or non-relational databases, such as mongo and others.

Consistent with the present disclosure, image processing unit 130 may communicate with output devices 145 to present information derived based on processing of image data acquired by capturing devices 125. The term "output device" is intended to include all possible types of devices capable of outputting information from server 135 to users or other computer systems (e.g., a display screen, a speaker, a desktop computer, a laptop computer, mobile device, tablet, a PDA, etc.), such as 145A, 145B, 145C and 145D. In one embodiment, each of the different system components (i.e., retail stores 105, market research entity 110, suppliers 115, and users 120) may be associated with an output device 145, and each system component may be configured to present different information on the output device 145. In one example, server 135 may analyze acquired images including representations of shelf spaces. Based on this analysis, server 135 may compare shelf spaces associated with different products, and output device 145A may present market research entity 110 with information about the shelf spaces associated with different products. The shelf spaces may also be compared with sales data, expired products data, and more. Consistent with the present disclosure, market research entity 110 may be a part of (or may work with) supplier 115. In another example, server 135 may determine product compliance to a predetermined planogram, and output device 145B may present to supplier 115 information about the level of product compliance at one or more retail stores 105 (for example in a specific retail store 105, in a group of retail stores 105 associated with supplier 115, in all retail stores 105, and so forth). The predetermined planogram may be associated with contractual obligations and/or other preferences related to the retailer methodology for placement of products on the store shelves. In another example, server 135 may determine that a specific store shelf has a type of fault in the product placement, and output device 145C may present to a manager of retail store 105 a user-notification that may include information about a correct display location of a misplaced product, information about a store shelf associated with the misplaced product, information about a type of the misplaced product, and/or a visual depiction of the misplaced product. In another example, server 135 may identify which products are available on the shelf and output device 145D may present to user 120 an updated list of products.

The components and arrangements shown in FIG. 1 are not intended to limit the disclosed embodiments, as the system components used to implement the disclosed processes and features may vary. In one embodiment, system 100 may include multiple servers 135, and each server 135 may host a certain type of service. For example, a first server may process images received from capturing devices 125 to identify at least some of the plurality of products in the image, and a second server may determine from the identified products in retail stores 105 compliance with contractual obligations between retail stores 105 and suppliers 115. In another embodiment, system 100 may include multiple servers 135, a first type of servers 135 that may process information from specific capturing devices 125 (e.g., handheld devices of data collection agents) or from specific retail stores 105 (e.g., a server dedicated to a specific retail store 105 may be placed in or near the store). System 100 may further include a second type of servers 135 that collect and process information from the first type of servers 135.

Figure 2:
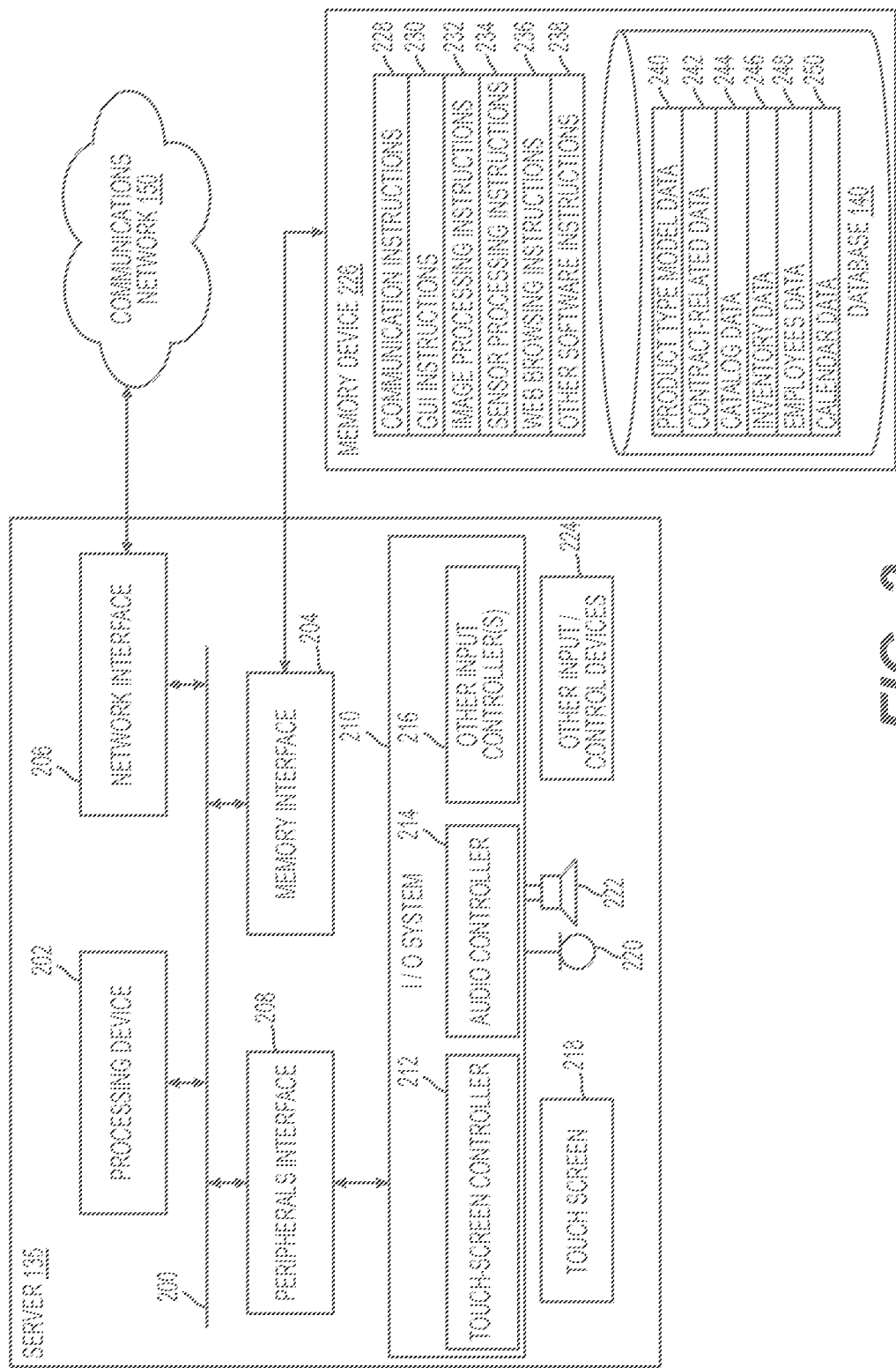
FIG. 2 is a block diagram that illustrates some of the components of an image processing system, consistent with the present disclosure.

FIG. 2 is a block diagram representative of an example configuration of server 135. In one embodiment, server 135 may include a bus 200 (or any other communication mechanism) that interconnects subsystems and components for transferring information within server 135. For example, bus 200 may interconnect a processing device 202, a memory interface 204, a network interface 206, and a peripherals interface 208 connected to an I/O system 210.

Processing device 202, shown in FIG. 2, may include at least one processor configured to execute computer programs, applications, methods, processes, or other software to execute particular instructions associated with embodiments described in the present disclosure. The term "processing device" refers to any physical device having an electric circuit that performs a logic operation. For example, processing device 202 may include one or more processors, integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. Processing device 202 may include at least one processor configured to perform functions of the disclosed methods such as a microprocessor manufactured by Intel™, Nvidia™, manufactured by AMD™, and so forth. Processing device 202 may include a single core or multiple core processors executing parallel processes simultaneously. In one example, processing device 202 may be a single core processor configured with virtual processing technologies. Processing device 202 may implement virtual machine technologies or other technologies to provide the ability to execute, control, run, manipulate, store, etc., multiple software processes, applications, programs, etc. In another example, processing device 202 may include a multiple-core processor arrangement (e.g., dual, quad core, etc.) configured to provide parallel processing functionalities to allow a device associated with processing device 202 to execute multiple processes simultaneously. It is appreciated that other types of processor arrangements could be implemented to provide the capabilities disclosed herein.

Consistent with the present disclosure, the methods and processes disclosed herein may be performed by server 135 as a result of processing device 202 executing one or more sequences of one or more instructions contained in a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within server 135, or at a remote location. Additionally, one or more computer-readable storage mediums can be utilized in implementing a computer-implemented method. The term "computer-readable storage medium" should be understood to include tangible items and exclude carrier waves and transient signals.

According to one embodiment, server 135 may include network interface 206 (which may also be any communications interface) coupled to bus 200. Network interface 206 may provide one-way or two-way data communication to a local network, such as network 150. Network interface 206 may include an integrated services digital network (ISDN) card, cable modem, satellite modem, or a modem to provide a data communication connection to a corresponding type of telephone line. As another example, network interface 206 may include a local area network (LAN) card to provide a data communication connection to a compatible LAN. In another embodiment, network interface 206 may include an Ethernet port connected to radio frequency receivers and transmitters and/or optical (e.g., infrared) receivers and transmitters. The specific design and implementation of network interface 206 depends on the communications network(s) over which server 135 is intended to operate. As described above, server 135 may be a cloud server or a local server associated with retail store 105. In any such implementation, network interface 206 may be configured to send and receive electrical, electromagnetic, or optical signals, through wires or wirelessly, that may carry analog or digital data streams representing various types of information. In another example, the implementation of network interface 206 may be similar or identical to the implementation described below for network interface 306.

Server 135 may also include peripherals interface 208 coupled to bus 200. Peripherals interface 208 may be connected to sensors, devices, and subsystems to facilitate multiple functionalities. In one embodiment, peripherals interface 208 may be connected to I/O system 210 configured to receive signals or input from devices and provide signals or output to one or more devices that allow data to be received and/or transmitted by server 135. In one embodiment I/O system 210 may include or be associated with output device 145. For example, I/O system 210 may include a touch screen controller 212, an audio controller 214, and/or other input controller(s) 216. Touch screen controller 212 may be coupled to a touch screen 218. Touch screen 218 and touch screen controller 212 can, for example, detect contact, movement, or break thereof using any of a plurality of touch sensitivity technologies, including but not limited to capacitive, resistive, infrared, and surface acoustic wave technologies as well as other proximity sensor arrays or other elements for determining one or more points of contact with touch screen 218. Touch screen 218 may also, for example, be used to implement virtual or soft buttons and/or a keyboard. In addition to or instead of touch screen 218, I/O system 210 may include a display screen (e.g., CRT, LCD, etc.), virtual reality device, augmented reality device, and so forth. Specifically, touch screen controller 212 (or display screen controller) and touch screen 218 (or any of the alternatives mentioned above) may facilitate visual output from server 135. Audio controller 214 may be coupled to a microphone 220 and a speaker 222 to facilitate voice-enabled functions, such as voice recognition, voice replication, digital recording, and telephony functions. Specifically, audio controller 214 and speaker 222 may facilitate audio output from server 135. The other input controller(s) 216 may be coupled to other input/control devices 224, such as one or more buttons, keyboards, rocker switches, thumbwheel, infrared port, USB port, image sensors, motion sensors, depth sensors, and/or a pointer device such as a computer mouse or a stylus.

In some embodiments, processing device 202 may use memory interface 204 to access data and a software product stored on a memory device 226. Memory device 226 may include operating system programs for server 135 that perform operating system functions when executed by the processing device. By way of example, the operating system programs may include Microsoft Windows™, Unix™, Linux™, Apple™ operating systems, personal digital assistant (PDA) type operating systems such as Apple iOS, Google Android, Blackberry OS, or other types of operating systems.

Memory device 226 may also store communication instructions 228 to facilitate communicating with one or more additional devices (e.g., capturing device 125), one or more computers (e.g., output devices 145A-145D) and/or one or more servers. Memory device 226 may include graphical user interface instructions 230 to facilitate graphic user interface processing; image processing instructions 232 to facilitate image data processing-related processes and functions; sensor processing instructions 234 to facilitate sensor-related processing and functions; web browsing instructions 236 to facilitate web browsing-related processes and functions; and other software instructions 238 to facilitate other processes and functions. Each of the above identified instructions and applications may correspond to a set of instructions for performing one or more functions described above. These instructions need not be implemented as separate software programs, procedures, or modules. Memory device 226 may include additional instructions or fewer instructions. Furthermore, various functions of server 135 may be implemented in hardware and/or in software, including in one or more signal processing and/or application specific integrated circuits. For example, server 135 may execute an image processing algorithm to identify in received images one or more products and/or obstacles, such as shopping carts, people, and more.

In one embodiment, memory device 226 may store database 140. Database 140 may include product type model data 240 (e.g., an image representation, a list of features, a model obtained by training machine learning algorithm using training examples, an artificial neural network, and more) that may be used to identify products in received images; contract-related data 242 (e.g., planograms, promotions data, etc.) that may be used to determine if the placement of products on the store shelves and/or the promotion execution are consistent with obligations of retail store 105; catalog data 244 (e.g., retail store chain's catalog, retail store's master file, etc.) that may be used to check if all product types that should be offered in retail store 105 are in fact in the store, if the correct price is displayed next to an identified product, etc.; inventory data 246 that may be used to determine if additional products should be ordered from suppliers 115; employee data 248 (e.g., attendance data, records of training provided, evaluation and other performance-related communications, productivity information, etc.) that may be used to assign specific employees to certain tasks; and calendar data 250 (e.g., holidays, national days, international events, etc.) that may be used to determine if a possible change in a product model is associated with a certain event. In other embodiments of the disclosure, database 140 may store additional types of data or fewer types of data. Furthermore, various types of data may be stored in one or more memory devices other than memory device 226.

The components and arrangements shown in FIG. 2 are not intended to limit the disclosed embodiments. As will be appreciated by a person skilled in the art having the benefit of this disclosure, numerous variations and/or modifications may be made to the depicted configuration of server 135. For example, not all components may be essential for the operation of server 135 in all cases. Any component may be located in any appropriate part of server 135, and the components may be rearranged into a variety of configurations while providing the functionality of the disclosed embodiments. For example, some servers may not include some of the elements shown in I/O system 215.

Figure 3:
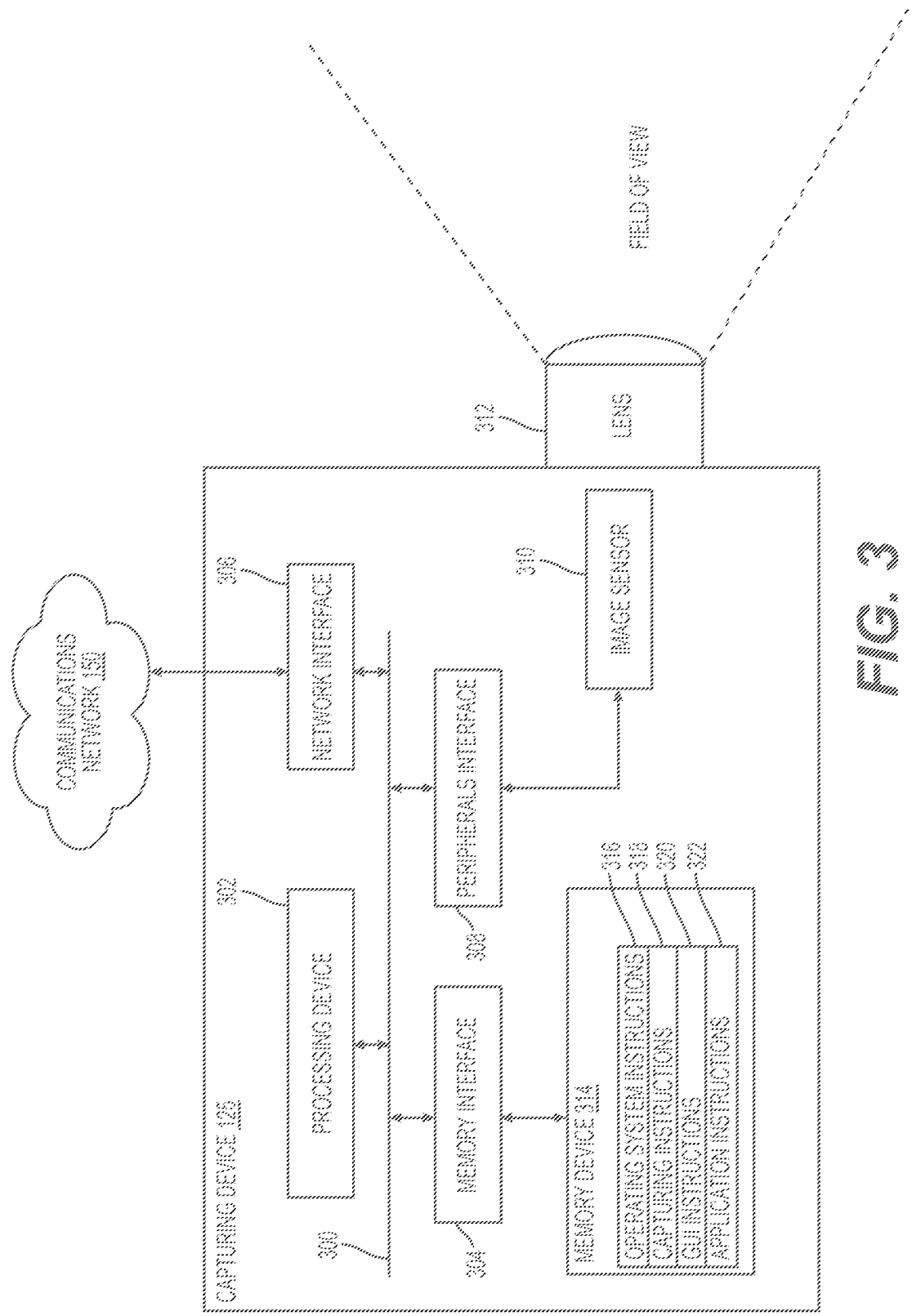
FIG. 3 is a block diagram that illustrates an exemplary embodiment of a capturing device, consistent with the present disclosure.

FIG. 3 is a block diagram representation of an example configuration of capturing device 125. In one embodiment, capturing device 125 may include a processing device 302, a memory interface 304, a network interface 306, and a peripherals interface 308 connected to image sensor 310. These components can be separated or can be integrated in one or more integrated circuits. The various components in capturing device 125 can be coupled by one or more communication buses or signal lines (e.g., bus 300). Different aspects of the functionalities of the various components in capturing device 125 may be understood from the description above regarding components of server 135 having similar functionality.

According to one embodiment, network interface 306 may be used to facilitate communication with server 135. Network interface 306 may be an Ethernet port connected to radio frequency receivers and transmitters and/or optical receivers and transmitters. The specific design and implementation of network interface 306 depends on the communications network(s) over which capturing device 125 is intended to operate. For example, in some embodiments, capturing device 125 may include a network interface 306 designed to operate over a GSM network, a GPRS network, an EDGE network, a Wi-Fi or WiMax network, a Bluetooth® network, etc. In another example, the implementation of network interface 306 may be similar or identical to the implementation described above for network interface 206.

In the example illustrated in FIG. 3, peripherals interface 308 of capturing device 125 may be connected to at least one image sensor 310 associated with at least one lens 312 for capturing image data in an associated field of view. In some configurations, capturing device 125 may include a plurality of image sensors associated with a plurality of lenses 312. In other configurations, image sensor 310 may be part of a camera included in capturing device 125. According to some embodiments, peripherals interface 308 may also be connected to other sensors (not shown), such as a motion sensor, a light sensor, infrared sensor, sound sensor, a proximity sensor, a temperature sensor, a biometric sensor, or other sensing devices to facilitate related functionalities. In addition, a positioning sensor may also be integrated with, or connected to, capturing device 125. For example, such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. For example, the positioning sensor may be built into mobile capturing device 125, such as smartphone devices. In another example, position software may allow mobile capturing devices to use internal or external positioning sensors (e.g., connecting via a serial port or Bluetooth).

Consistent with the present disclosure, capturing device 125 may include digital components that collect data from image sensor 310, transform it into an image, and store the image on a memory device 314 and/or transmit the image using network interface 306. In one embodiment, capturing device 125 may be fixedly mountable to a store shelf or to other objects in the retail store (such as walls, ceilings, floors, refrigerators, checkout stations, displays, dispensers, rods which may be connected to other objects in the retail store, and so forth). In one embodiment, capturing device 125 may be split into at least two housings such that only image sensor 310 and lens 312 may be visible on the store shelf, and the rest of the digital components may be located in a separate housing. An example of this type of capturing device is described below with reference to FIGS. 5-7.

Consistent with the present disclosure, capturing device 125 may use memory interface 304 to access memory device 314. Memory device 314 may include high-speed, random access memory and/or non-volatile memory such as one or more magnetic disk storage devices, one or more optical storage devices, and/or flash memory (e.g., NAND, NOR) to store captured image data. Memory device 314 may store operating system instructions 316, such as DARWIN, RTXC, LINUX, iOS, UNIX, LINUX, OS X, WINDOWS, or an embedded operating system such as VXWorkS. Operating system 316 can include instructions for handling basic system services and for performing hardware dependent tasks. In some implementations, operating system 316 may include a kernel (e.g., UNIX kernel, LINUX kernel, and so forth). In addition, memory device 314 may store capturing instructions 318 to facilitate processes and functions related to image sensor 310; graphical user interface instructions 320 that enables a user associated with capturing device 125 to control the capturing device and/or to acquire images of an area-of-interest in a retail establishment; and application instructions 322 to facilitate a process for monitoring compliance of product placement or other processes.

The components and arrangements shown in FIG. 3 are not intended to limit the disclosed embodiments. As will be appreciated by a person skilled in the art having the benefit of this disclosure, numerous variations and/or modifications may be made to the depicted configuration of capturing device 125. For example, not all components are essential for the operation of capturing device 125 in all cases. Any component may be located in any appropriate part of capturing device 125, and the components may be rearranged into a variety of configurations while providing the functionality of the disclosed embodiments. For example, some capturing devices may not have lenses, and other capturing devices may include an external memory device instead of memory device 314.

FIGS. 4A-4C illustrate example configurations for capturing image data in retail store 105 according to disclosed embodiments. FIG. 4A illustrates how an aisle 400 of retail store 105 may be imaged using a plurality of capturing devices 125 fixedly connected to store shelves. FIG. 4B illustrates how aisle 400 of retail store 105 may be imaged using a handheld communication device. FIG. 4C illustrates how aisle 400 of retail store 105 may be imaged by robotic devices equipped with cameras.

With reference to FIG. 4A and consistent with the present disclosure, retail store 105 may include a plurality of capturing devices 125 fixedly mounted (for example, to store shelves, walls, ceilings, floors, refrigerators, checkout stations, displays, dispensers, rods which may be connected to other objects in the retail store, and so forth) and configured to collect image data. As depicted, one side of an aisle 400 may include a plurality of capturing devices 125 (e.g., 125A, 125B, and 125C) fixedly mounted thereon and directed such that they may capture images of an opposing side of aisle 400. The plurality of capturing devices 125 may be connected to an associated mobile power source (e.g., one or more batteries), to an external power supply (e.g., a power grid), obtain electrical power from a wireless power transmission system, and so forth. As depicted in FIG. 4A, the plurality of capturing devices 125 may be placed at different heights and at least their vertical fields of view may be adjustable. Generally, both sides of aisle 400 may include capturing devices 125 in order to cover both sides of aisle 400.

Differing numbers of capturing devices 125 may be used to cover shelving unit 402. In addition, there may be an overlap region in the horizontal field of views of some of capturing devices 125. For example, the horizontal fields of view of capturing devices (e.g., adjacent capturing devices) may at least partially overlap with one another. In another example, one capturing device may have a lower field of view than the field of view of a second capturing device, and the two capturing devices may have at least partially overlapping fields of view. According to one embodiment, each capturing device 125 may be equipped with network interface 306 for communicating with server 135. In one embodiment, the plurality of capturing devices 125 in retail store 105 may be connected to server 135 via a single WLAN. Network interface 306 may transmit information associated with a plurality of images captured by the plurality of capturing devices 125 for analysis purposes. In one example, server 135 may determine an existence of an occlusion event (such as, by a person, by store equipment, such as a ladder, cart, etc.) and may provide a notification to resolve the occlusion event. In another example, server 135 may determine if a disparity exists between at least one contractual obligation and product placement as determined based on automatic analysis of the plurality of images. The transmitted information may include raw images, cropped images, processed image data, data about products identified in the images, and so forth. Network interface 306 may also transmit information identifying the location of the plurality capturing devices 125 in retail store 105.

With reference to FIG. 4B and consistent with the present disclosure, server 135 may receive image data captured by users 120. In a first embodiment, server 135 may receive image data acquired by store employees. In one implementation, a handheld device of a store employee (e.g., capturing device 125D) may display a real-time video stream captured by the image sensor of the handheld device. The real-time video stream may be augmented with markings identifying to the store employee an area-of-interest that needs manual capturing of images. One of the situations in which manual image capture may be desirable may occur where the area-of-interest is outside the fields of view of a plurality of cameras fixedly connected to store shelves in aisle 400. In other situations, manual capturing of images of an area-of-interest may be desirable when a current set of acquired images is out of date (e.g., obsolete in at least one respect) or of poor quality (e.g., lacking focus, obstacles, lesser resolution, lack of light, and so forth). Additional details of this embodiment are described in Applicant's International Patent Application No. PCT/IB2018/001107, which is incorporated herein by reference.

In a second embodiment, server 135 may receive image data acquired by crowd sourcing. In one exemplary implementation, server 135 may provide a request to a detected mobile device for an updated image of the area-of-interest in aisle 400. The request may include an incentive (e.g., $2 discount) to user 120 for acquiring the image. In response to the request, user 120 may acquire and transmit an up-to-date image of the area-of-interest. After receiving the image from user 120, server 135 may transmit the accepted incentive or agreed upon reward to user 120. The incentive may comprise a text notification and a redeemable coupon. In some embodiments, the incentive may include a redeemable coupon for a product associated with the area-of-interest. Server 135 may generate image-related data based on aggregation of data from images received from crowd sourcing and from images received from a plurality of cameras fixedly connected to store shelves. Additional details of this embodiment are described in Applicant's International Patent Application No. PCT/IB2017/000919, which is incorporated herein by reference.

With reference to FIG. 4C and consistent with the present disclosure, server 135 may receive image data captured by robotic devices with cameras traversing in aisle 400. The present disclosure is not limited to the type of robotic devices used to capture images of retail store 105. In some embodiments, the robotic devices may include a robot on a track (e.g., a Cartesian robot configured to move along an edge of a shelf or in parallel to a shelf, such as capturing device 125E), a drone (e.g., capturing device 125F), and/or a robot that may move on the floor of the retail store (e.g., a wheeled robot such as capturing device 125G, a legged robot, a snake-like robot, and so forth). The robotic devices may be controlled by server 135 and may be operated remotely or autonomously. In one example, server 135 may instruct capturing device 125E to perform periodic scans at times when no customers or other obstructions are identified in aisle 400. Specifically, capturing device 125E may be configured to move along store shelf 404 and to capture images of products placed on store shelf 404, products placed on store shelf 406, or products located on shelves opposite store shelf (e.g., store shelf 408). In another example, server 135 may instruct capturing device 125F to perform a scan of all the area of retail store 105 before the opening hour. In another example, server 135 may instruct capturing device 125G to capture a specific area-of-interest, similar as described above with reference to receiving images acquired by the store employees. In some embodiments, robotic capturing devices (such as 125F and 125G) may include an internal processing unit that may allow them to navigate autonomously within retail store 105. For example, the robotic capturing devices may use input from sensors (e.g., image sensors, depth sensors, proximity sensors, etc.), to avoid collision with objects or people, and to complete the scan of the desired area of retail store 105.

As discussed above with reference to FIG. 4A, the image data representative of products displayed on store shelves may be acquired by a plurality of stationary capturing devices 125 fixedly mounted in the retail store. One advantage of having stationary image capturing devices spread throughout retail store 105 is the potential for acquiring product images from set locations and on an ongoing basis such that up-to-date product status may be determined for products throughout a retail store at any desired periodicity (e.g., in contrast to a moving camera system that may acquire product images more infrequently). However, there may be certain challenges in this approach. The distances and angles of the image capturing devices relative to the captured products should be selected such as to enable adequate product identification, especially when considered in view of image sensor resolution and/or optics specifications. For example, a capturing device placed on the ceiling of retail store 105 may have sufficient resolutions and optics to enable identification of large products (e.g., a pack of toilet paper), but may be insufficient for identifying smaller products (e.g., deodorant packages). The image capturing devices should not occupy shelf space that is reserved for products for sale. The image capturing devices should not be positioned in places where there is a likelihood that their fields of view will be regularly blocked by different objects. The image capturing devices should be able to function for long periods of time with minimum maintenance. For example, a requirement for frequent replacement of batteries may render certain image acquisition systems cumbersome to use, especially where many image acquisition devices are in use throughout multiple locations in a retail store and across multiple retail stores. The image capturing devices should also include processing capabilities and transmission capabilities for providing real time or near real time image data about products. The disclosed image acquisition systems address these challenges.

FIG. 5A illustrates an example of a system 500 for acquiring images of products in retail store 105. Throughout the disclosure, capturing device 125 may refer to a system, such as system 500 shown in FIG. 5A. As shown, system 500 may include a first housing 502 configured for location on a retail shelving unit (e.g., as illustrated in FIG. 5B), and a second housing 504 configured for location on the retail shelving unit separate from first housing 502. The first and the second housing may be configured for mounting on the retail shelving unit in any suitable way (e.g., screws, bolts, clamps, adhesives, magnets, mechanical means, chemical means, and so forth). In some embodiments, first housing 502 may include an image capture device 506 (e.g., a camera module that may include image sensor 310) and second housing 504 may include at least one processor (e.g., processing device 302) configured to control image capture device 506 and also to control a network interface (e.g., network interface 306) for communicating with a remote server (e.g., server 135).

System 500 may also include a data conduit 508 extending between first housing 502 and second housing 504. Data conduit 508 may be configured to enable transfer of control signals from the at least one processor to image capture device 506 and to enable collection of image data acquired by image capture device 506 for transmission by the network interface. Consistent with the present disclosure, the term "data conduit" may refer to a communications channel that may include either a physical transmission medium such as a wire or a logical connection over a multiplexed medium such as a radio channel. In some embodiments, data conduit 508 may be used for conveying image data from image capture device 506 to at least one processor located in second housing 504. Consistent with one implementation of system 500, data conduit 508 may include flexible printed circuits and may have a length of at least about 5 cm, at least about 10 cm, at least about 15 cm, etc. The length of data conduit 508 may be adjustable to enable placement of first housing 502 separately from second housing 504. For example, in some embodiments, data conduit may be retractable within second housing 504 such that the length of data conduit exposed between first housing 502 and second housing 504 may be selectively adjusted.

In one embodiment, the length of data conduit 508 may enable first housing 502 to be mounted on a first side of a horizontal store shelf facing the aisle (e.g., store shelf 510 illustrated in FIG. 5B) and second housing 504 to be mounted on a second side of store shelf 510 that faces the direction of the ground (e.g., an underside of a store shelf). In this embodiment, data conduit 508 may be configured to bend around an edge of store shelf 510 or otherwise adhere/follow contours of the shelving unit. For example, a first portion of data conduit 508 may be configured for location on the first side of store shelf 510 (e.g., a side facing an opposing retail shelving unit across an aisle) and a second portion of data conduit 508 may be configured for location on a second side of store shelf 510 (e.g., an underside of the shelf, which in some cases may be orthogonal to the first side). The second portion of data conduit 508 may be longer than the first portion of data conduit 508. Consistent with another embodiment, data conduit 508 may be configured for location within an envelope of a store shelf. For example, the envelope may include the outer boundaries of a channel located within a store shelf, a region on an underside of an L-shaped store shelf, a region between two store shelves, etc. Consistent with another implementation of system 500 discussed below, data conduit 508 may include a virtual conduit associated with a wireless communications link between first housing 502 and second housing 504.

FIG. 5B illustrates an exemplary configuration for mounting first housing 502 on store shelf 510. Consistent with the present disclosure, first housing 502 may be placed on store shelf 510, next to or embedded in a plastic cover that may be used for displaying prices. Alternatively, first housing 502 may be placed or mounted on any other location in retail store 105. For example, first housing 502 may be placed or mounted on the walls, on the ceiling, on refrigerator units, on display units, and more. The location and/or orientation of first housing 502 may be selected such that a field of view of image capture device 506 may cover at least a portion of an opposing retail shelving unit. Consistent with the present disclosure, image capture device 506 may have a view angle of between 50 and 80 degrees, about 62 degrees, about 67 degrees, or about 75 degrees. Consistent with the present disclosure, image capture device 506 may include an image sensor having sufficient image resolution to enable detection of text associated with labels on an opposing retail shelving unit. In one embodiment, the image sensor may include m*n pixels. For example, image capture device 506 may have an 8MP image sensor that includes an array of 3280*2464 pixels. Each pixel may include at least one photovoltaic cell that converts the photons of the incident light to an electric signal. The electrical signal may be converted to digital data by an A/D converter and processed by the image processor (ISP). In one embodiment, the image sensor of image capture device 506 may be associated with a pixel size of between 1.1×1.1 um2 and 1.7×1.7 um2, for example, 1.4× 1.4 um2.

Figure 6A:
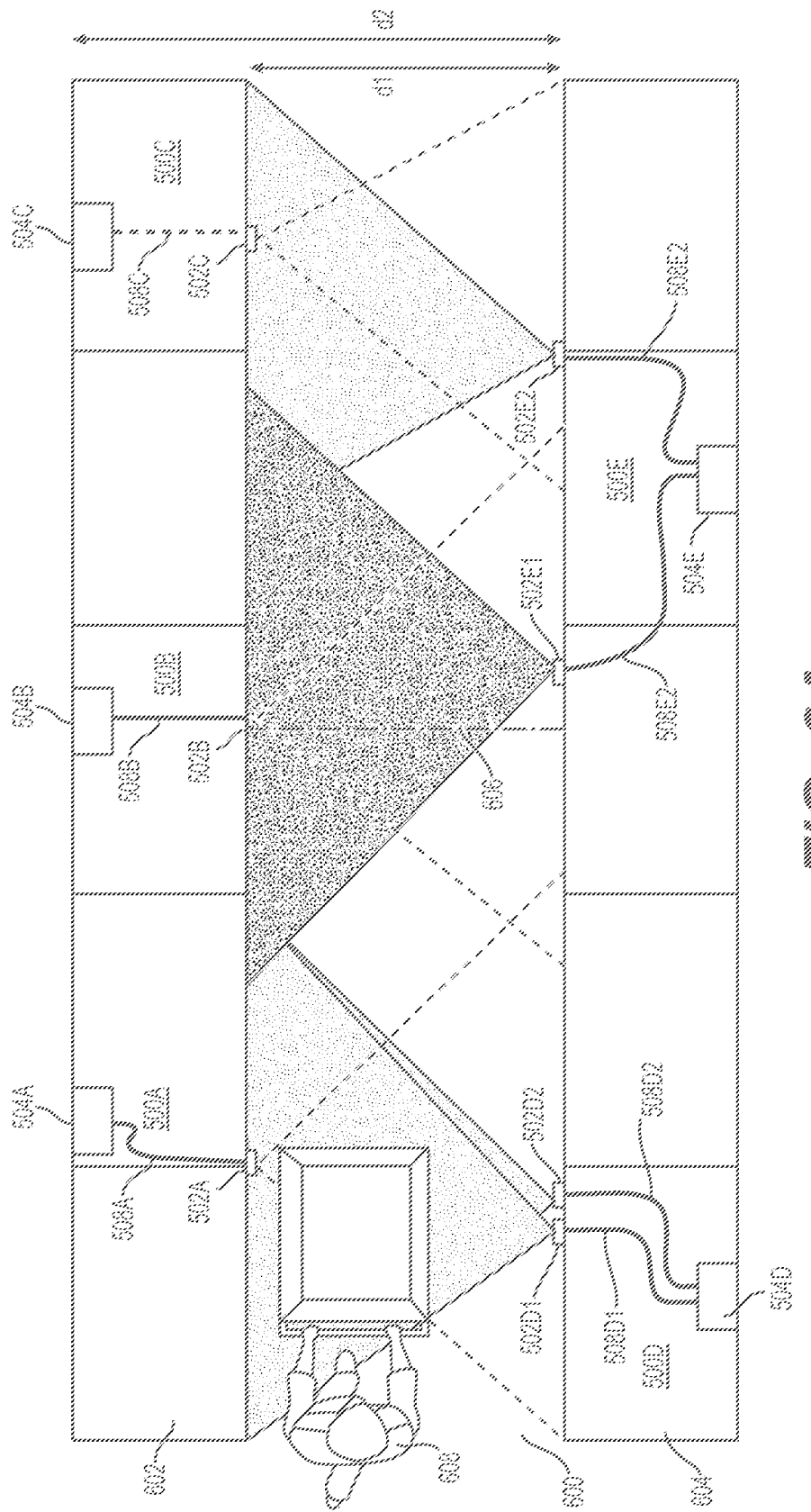
FIG. 6A is a top view representation of an aisle in a retail store with multiple image acquisition systems deployed thereon for acquiring images of products, consistent with the present disclosure.

Consistent with the present disclosure, image capture device 506 may be associated with a lens (e.g., lens 312) having a fixed focal length selected according to a distance expected to be encountered between retail shelving units on opposite sides of an aisle (e.g., distance d1 shown in FIG. 6A) and/or according to a distance expected to be encountered between a side of a shelving unit facing the aisle on one side of an aisle and a side of a shelving unit facing away of the aisle on the other side of the aisle (e.g., distance d2 shown in FIG. 6A). The focal length may also be based on any other expected distance between the image acquisition device and products to be imaged. As used herein, the term "focal length" refers to the distance from the optical center of the lens to a point where objects located at the point are substantially brought into focus. In contrast to zoom lenses, in fixed lenses the focus is not adjustable. The focus is typically set at the time of lens design and remains fixed. In one embodiment, the focal length of lens 312 may be selected based on the distance between two sides of aisles in the retail store (e.g., distance d1, distance d2, and so forth). In some embodiments, image capture device 506 may include a lens with a fixed focal length having a fixed value between 2.5 mm and 4.5 mm, such as about 3.1 mm, about 3.4 mm, about 3.7 mm. For example, when distance d1 between two opposing retail shelving units is about 2 meters, the focal length of the lens may be about 3.6 mm. Unless indicated otherwise, the term "about" with regards to a numeric value is defined as a variance of up to 5% with respect to the stated value. Of course, image capture devices having non-fixed focal lengths may also be used depending on the requirements of certain imaging environments, the power and space resources available, etc.

FIG. 5C illustrates an exploded view of second housing 504. In some embodiments, the network interface located in second housing 504 (e.g., network interface 306) may be configured to transmit to server 135 information associated with a plurality of images captured by image capture device 506. For example, the transmitted information may be used to determine if a disparity exists between at least one contractual obligation (e.g. planogram) and product placement. In one example, the network interface may support transmission speeds of 0.5 Mb/s, 1 Mb/s, 5 Mb/s, or more. Consistent with the present disclosure, the network interface may allow different modes of operations to be selected, such as: high-speed, slope-control, or standby. In high-speed mode, associated output drivers may have fast output rise and fall times to support high-speed bus rates; in slope-control, the electromagnetic interference may be reduced and the slope (i.e., the change of voltage per unit of time) may be proportional to the current output; and in standby mode, the transmitter may be switched off and the receiver may operate at a lower current.

Figure 6B:
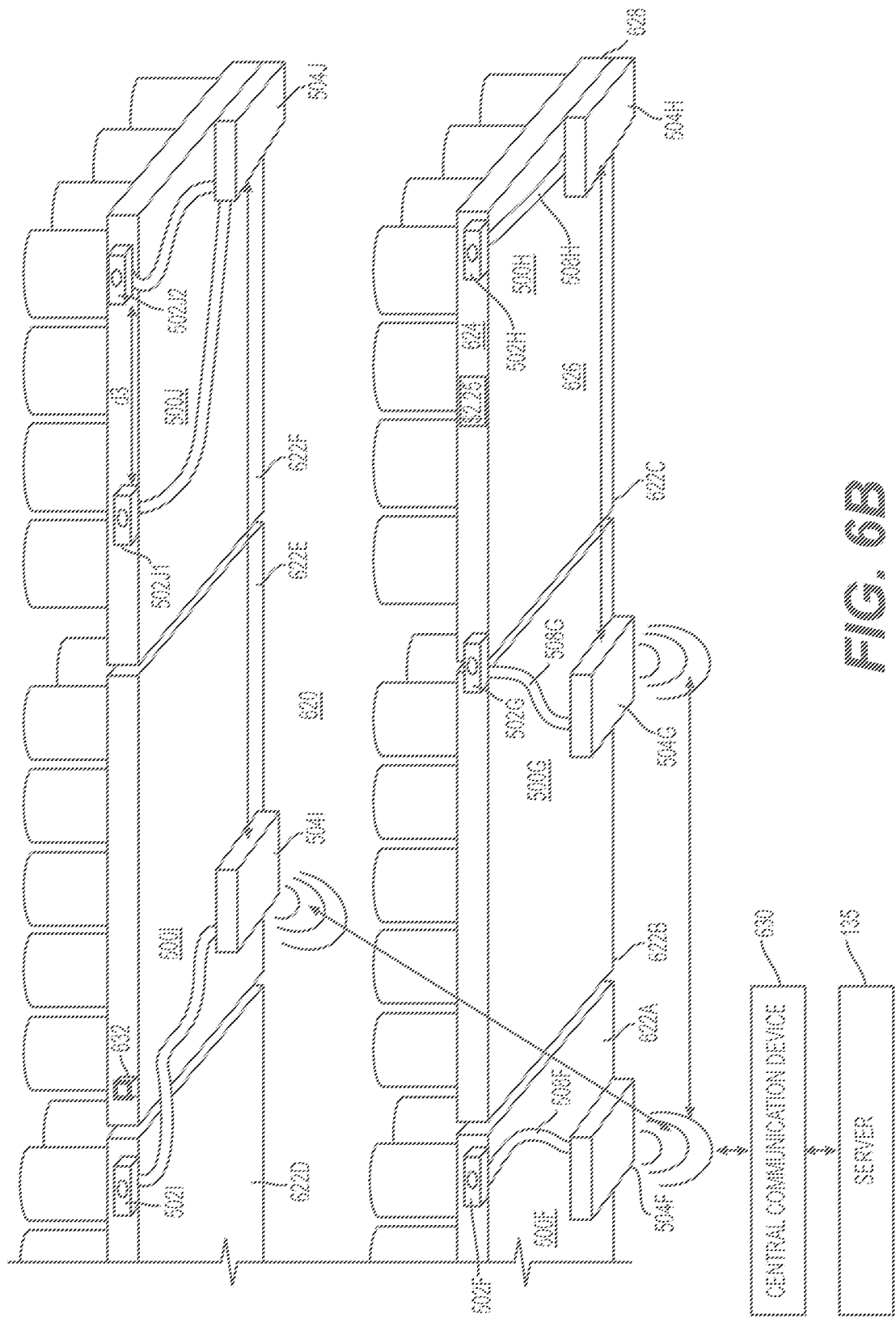
FIG. 6B is a perspective view representation of part of a retail shelving unit with multiple image acquisition systems deployed thereon for acquiring images of products, consistent with the present disclosure.

Consistent with the present disclosure, second housing 504 may include a power port 512 for conveying energy from a power source to first housing 502. In one embodiment, second housing 504 may include a section for at least one mobile power source 514 (e.g., in the depicted configuration the section is configured to house four batteries). The at least one mobile power source may provide sufficient power to enable image capture device 506 to acquire more than 1,000 pictures, more than 5,000 pictures, more than 10,000 pictures, or more than 15,000 pictures, and to transmit them to server 135. In one embodiment, mobile power source 514 located in a single second housing 504 may power two or more image capture devices 506 mounted on the store shelf. For example, as depicted in FIGS. 6A and 6B, a single second housing 504 may be connected to a plurality of first housings 502 with a plurality of image capture devices 506 covering different (overlapping or non-overlapping) fields of view. Accordingly, the two or more image capture devices 506 may be powered by a single mobile power source 514 and/or the data captured by two or more image capture devices 506 may be processed to generate a panoramic image by a single processing device located in second housing 504. In addition to mobile power source 514 or as an alternative to mobile power source 514, second housing 504 may also be connected to an external power source. For example, second housing 504 may be mounted to a store shelf and connected to an electric power grid. In this example, power port 512 may be connected to the store shelf through a wire for providing electrical power to image capture device 506. In another example, a retail shelving unit or retail store 105 may include a wireless power transmission system, and power port 512 may be connected to a device configured to obtain electrical power from the wireless power transmission system. In addition, as discussed below, system 500 may use power management policies to reduce the power consumption. For example, system 500 may use selective image capturing and/or selective transmission of images to reduce the power consumption or conserve power.

FIG. 6A illustrates a schematic diagram of a top view of aisle 600 in retail store 105 with multiple image acquisition systems 500 (e.g., 500A, 500B, 500C, 500D, and 500E) deployed thereon for acquiring images of products. Aisle 600 may include a first retail shelving unit 602 and a second retail shelving unit 604 that opposes first retail shelving unit 602. In some embodiments, different numbers of systems 500 may be mounted on opposing retail shelving units. For example, system 500A (including first housing 502A, second housing 504A, and data conduit 508A), system 500B (including first housing 502B second housing 504B, and data conduit 508B), and system 500C (including first housing 502C, second housing 504C, and data conduit 508C) may be mounted on first retail shelving unit 602; and system 500D (including first housing 502D1, first housing 502D2, second housing 504D, and data conduits 508D1 and 508D2) and system 500E (including first housing 502E1, first housing 502E2, second housing 504E, and data conduits 508E1 and 508E2) may be mounted on second retail shelving unit 604. Consistent with the present disclosure, image capture device 506 may be configured relative to first housing 502 such that an optical axis of image capture device 506 is directed toward an opposing retail shelving unit when first housing 502 is fixedly mounted on a retail shelving unit. For example, optical axis 606 of the image capture device associated with first housing 502B may be directed towards second retail shelving unit 604 when first housing 502B is fixedly mounted on first retail shelving unit 602. A single retail shelving unit may hold a number of systems 500 that include a plurality of image capturing devices. Each of the image capturing devices may be associated with a different field of view directed toward the opposing retail shelving unit. Different vantage points of differently located image capture devices may enable image acquisition relative to different sections of a retail shelf. For example, at least some of the plurality of image capturing devices may be fixedly mounted on shelves at different heights. Examples of such a deployment are illustrated in FIGS. 4A and 6B.

As shown in FIG. 6A each first housing 502 may be associated with a data conduit 508 that enables exchanging of information (e.g., image data, control signals, etc.) between the at least one processor located in second housing 504 and image capture device 506 located in first housing 502. In some embodiments, data conduit 508 may include a wired connection that supports data-transfer and may be used to power image capture device 506 (e.g., data conduit 508A, data conduit 508B, data conduit 508D1, data conduit 508D2, data conduit 508E1, and data conduit 508E2). Consistent with these embodiments, data conduit 508 may comply with a wired standard such as USB, Micro-USB, HDMI, Micro-HDMI, Firewire, Apple, etc. In other embodiments, data conduit 508 may be a wireless connection, such as a dedicated communications channel between the at least one processor located in second housing 504 and image capture device 506 located in first housing 502 (e.g., data conduit 508C). In one example, the communications channel may be established by two Near Field Communication (NFC) transceivers. In other examples, first housing 502 and second housing 504 may include interface circuits that comply with other short-range wireless standards such as Bluetooth, WiFi, ZigBee, etc.

In some embodiments of the disclosure, the at least one processor of system 500 may cause at least one image capture device 506 to periodically capture images of products located on an opposing retail shelving unit (e.g., images of products located on a shelf across an aisle from the shelf on which first housing 502 is mounted). The term "periodically capturing images" includes capturing an image or images at predetermined time intervals (e.g., every minute, every 30 minutes, every 150 minutes, every 300 minutes, etc.), capturing video, capturing an image every time a status request is received, and/or capturing an image subsequent to receiving input from an additional sensor, for example, an associated proximity sensor. Images may also be captured based on various other triggers or in response to various other detected events. In some embodiments, system 500 may receive an output signal from at least one sensor located on an opposing retail shelving unit. For example, system 500B may receive output signals from a sensing system located on second retail shelving unit 604. The output signals may be indicative of a sensed lifting of a product from second retail shelving unit 604 or a sensed positioning of a product on second retail shelving unit 604. In response to receiving the output signal from the at least one sensor located on second retail shelving unit 604, system 500B may cause image capture device 506 to capture one or more images of second retail shelving unit 604. Additional details on a sensing system, including the at least one sensor that generates output signals indicative of a sensed lifting of a product from an opposing retail shelving unit, is discussed below with reference to FIGS. 8-10.

Consistent with embodiments of the disclosure, system 500 may detect an object 608 in a selected area between first retail shelving unit 602 and second retail shelving unit 604. Such detection may be based on the output of one or more dedicated sensors (e.g., motion detectors, etc.) and/or may be based on image analysis of one or more images acquired by an image acquisition device. Such images, for example, may include a representation of a person or other object recognizable through various image analysis techniques (e.g., trained neural networks, Fourier transform analysis, edge detection, filters, face recognition, and so forth). The selected area may be associated with distance d1 between first retail shelving unit 602 and second retail shelving unit 604. The selected area may be within the field of view of image capture device 506 or an area where the object causes an occlusion of a region of interest (such as a shelf, a portion of a shelf being monitored, and more). Upon detecting object 608, system 500 may cause image capture device 506 to forgo image acquisition while object 608 is within the selected area. In one example, object 608 may be an individual, such as a customer or a store employee. In another example, detected object 608 may be an inanimate object, such as a cart, box, carton, one or more products, cleaning robots, etc. In the example illustrated in FIG. 6A, system 500A may detect that object 608 has entered into its associated field of view (e.g., using a proximity sensor) and may instruct image capturing device 506 to forgo image acquisition. In alternative embodiments, system 500 may analyze a plurality of images acquired by image capture device 506 and identify at least one image of the plurality of images that includes a representation of object 608. Thereafter, system 500 may avoid transmission of at least part of the at least one identified image and/or information based on the at least one identified image to server 135.

As shown in FIG. 6A, the at least one processor contained in a second housing 504 may control a plurality of image capture devices 506 contained in a plurality of first housings 502 (e.g., systems 500D and 500E). Controlling image capturing device 506 may include instructing image capturing device 506 to capture an image and/or transmit captured images to a remote server (e.g., server 135). In some cases, each of the plurality of image capture devices 506 may have a field of view that at least partially overlaps with a field of view of at least one other image capture device 506 from among plurality of image capture devices 506. In one embodiment, the plurality of image capture devices 506 may be configured for location on one or more horizontal shelves and may be directed to substantially different areas of the opposing first retail shelving unit. In this embodiment, the at least one processor may control the plurality of image capture devices such that each of the plurality of image capture devices may capture an image at a different time. For example, system 500E may have a second housing 504E with at least one processor that may instruct a first image capturing device contained in first housing 502E1 to capture an image at a first time and may instruct a second image capturing device contained in first housing 502E2 to capture an image at a second time which differs from the first time. Capturing images in different times (or forwarding them to the at least one processor at different times) may assist in processing the images and writing the images in the memory associated with the at least one processor.

FIG. 6B illustrates a perspective view assembly diagram depicting a portion of a retail shelving unit 620 with multiple systems 500 (e.g., 500F, 500G, 500H, 500I, and 500J) deployed thereon for acquiring images of products. Retail shelving unit 620 may include horizontal shelves at different heights. For example, horizontal shelves 622A, 622B, and 622C are located below horizontal shelves 622D, 622E, and 622F. In some embodiments, a different number of systems 500 may be mounted on shelves at different heights. For example, system 500F (including first housing 502F and second housing 504F), system 500G (including first housing 502G and second housing 504G), and system 500H (including first housing 502H and second housing 504H) may be mounted on horizontal shelves associated with a first height; and system 500I (including first housing 502I, second housing 504I, and a projector 632) and system 500J (including first housing 502J1, first housing 502J2, and second housing 504J) may be mounted on horizontal shelves associated with a second height. In some embodiments, retail shelving unit 620 may include a horizontal shelf with at least one designated place (not shown) for mounting a housing of image capturing device 506. The at least one designated place may be associated with connectors such that first housing 502 may be fixedly mounted on a side of horizontal shelf 622 facing an opposing retail shelving unit using the connectors.

Consistent with the present disclosure, system 500 may be mounted on a retail shelving unit that includes at least two adjacent horizontal shelves (e.g., shelves 622A and 622B) forming a substantially continuous surface for product placement. The store shelves may include standard store shelves or customized store shelves. A length of each store shelf 622 may be at least 50 cm, less than 200 cm, or between 75 cm to 175 cm. In one embodiment, first housing 502 may be fixedly mounted on the retail shelving unit in a slit between two adjacent horizontal shelves. For example, first housing 502G may be fixedly mounted on retail shelving unit 620 in a slit between horizontal shelf 622B and horizontal shelf 622C. In another embodiment, first housing 502 may be fixedly mounted on a first shelf and second housing 504 may be fixedly mounted on a second shelf. For example, first housing 502I may be mounted on horizontal shelf 622D and second housing 504I may be mounted on horizontal shelf 622E. In another embodiment, first housing 502 may be fixedly mounted on a retail shelving unit on a first side of a horizontal shelf facing the opposing retail shelving unit and second housing 504 may be fixedly mounted on retail shelving unit 620 on a second side of the horizontal shelf orthogonal to the first side. For example, first housing 502H may mounted on a first side 624 of horizontal shelf 622C next to a label and second housing 504H may be mounted on a second side 626 of horizontal shelf 622C that faces down (e.g., towards the ground or towards a lower shelf). In another embodiment, second housing 504 may be mounted closer to the back of the horizontal shelf than to the front of the horizontal shelf. For example, second housing 504H may be fixedly mounted on horizontal shelf 622C on second side 626 closer to third side 628 of the horizontal shelf 622C than to first side 624. Third side 628 may be parallel to first side 624. As mentioned above, data conduit 508 (e.g., data conduit 508H) may have an adjustable or selectable length for extending between first housing 502 and second housing 504. In one embodiment, when first housing 502H is fixedly mounted on first side 624, the length of data conduit 508H may enable second housing 604H to be fixedly mounted on second side 626 closer to third side 628 than to first side 624.

As mentioned above, at least one processor contained in a single second housing 504 may control a plurality of image capture devices 506 contained in a plurality of first housings 502 (e.g., system 500J). In some embodiments, the plurality of image capture devices 506 may be configured for location on a single horizontal shelf and may be directed to substantially the same area of the opposing first retail shelving unit (e.g., system 500D in FIG. 6A). In these embodiments, the image data acquired by the first image capture device and the second image capture device may enable a calculation of depth information (e.g., based on image parallax information) associated with at least one product positioned on an opposing retail shelving unit. For example, system 500J may have single second housing 504J with at least one processor that may control a first image capturing device contained in first housing 502J1 and a second image capturing device contained in first housing 502J2. The distance d3 between the first image capture device contained in first housing 502J1 and the second image capture device contained in first housing 502J2 may be selected based on the distance between retail shelving unit 620 and the opposing retail shelving unit (e.g., similar to d1 and/or d2). For example, distance d3 may be at least 5 cm, at least 10 cm, at least 15 cm, less than 40 cm, less than 30 cm, between about 5 cm to about 20 cm, or between about 10 cm to about 15 cm. In another example, d3 may be a function of d1 and/or d2, a linear function of d1 and/or d2, a function of $d1*\log(d1)$ and/or $d2*\log(d2)$ such as $a1*d1*\log(d1)$ for some constant a1, and so forth. The data from the first image capturing device contained in first housing 502J1 and the second image capturing device contained in first housing 502J2 may be used to estimate the number of products on a store shelf of retail shelving unit 602. In related embodiments, system 500 may control a projector (e.g., projector 632) and image capture device 506 that are configured for location on a single store shelf or on two separate store shelves. For example, projector 632 may be mounted on horizontal shelf 622E and image capture device 506I may be mounted on horizontal shelf 622D. The image data acquired by image capture device 506 (e.g., included in first housing 502I) may include reflections of light patterns projected from projector 632 on the at least one product and/or the opposing retail shelving unit and may enable a calculation of depth information associated with at least one product positioned on the opposing retail shelving unit. The distance between projector 632 and the image capture device contained in first housing 502I may be selected based on the distance between retail shelving unit 620 and the opposing retail shelving unit (e.g., similar to d1 and/or d2). For example, the distance between the projector and the image capture device may be at least 5 cm, at least 10 cm, at least 15 cm, less than 40 cm, less than 30 cm, between about 5 cm to about 20 cm, or between about 10 cm to about 15 cm. In another example, the distance between the projector and the image capture device may be a function of d1 and/or d2, a linear function of d1 and/or d2, a function of $d1*\log(d1)$ and/or $d2*\log(d2)$ such as $a1*d1*\log(d1)$ for some constant a1, and so forth.

Consistent with the present disclosure, a central communication device 630 may be located in retail store 105 and may be configured to communicate with server 135 (e.g., via an Internet connection). The central communication device may also communicate with a plurality of systems 500 (for example, less than ten, ten, eleven, twelve, more than twelve, and so forth). In some cases, at least one system of the plurality of systems 500 may be located in proximity to central communication device 630. In the illustrated example, system 500F may be located in proximity to central communication device 630. In some embodiments, at least some of systems 500 may communicate directly with at least one other system 500. The communications between some of the plurality of systems 500 may happen via a wired connection, such as the communications between system 500J and system 500I and the communications between system 500H and system 500G. Additionally or alternatively, the communications between some of the plurality of systems 500 may occur via a wireless connection, such as the communications between system 500G and system 500F and the communications between system 500I and system 500F. In some examples, at least one system 500 may be configured to transmit captured image data (or information derived from the captured image data) to central communication device 630 via at least two mediating systems 500, at least three mediating systems 500, at least four mediating systems 500, or more. For example, system 500J may convey captured image data to central communication device 630 via system 500I and system 500F.

Consistent with the present disclosure, two (or more) systems 500 may share information to improve image acquisition. For example, system 500J may be configured to receive from a neighboring system 500I information associated with an event that system 500I had identified, and control image capture device 506 based on the received information. For example, system 500J may forgo image acquisition based on an indication from system 500I that an object has entered or is about to enter its field of view. Systems 500I and 500J may have overlapping fields of view or non-overlapping fields of view. In addition, system 500J may also receive (from system 500I) information that originates from central communication device 630 and control image capture device 506 based on the received information. For example, system 500I may receive instructions from central communication device 630 to capture an image when suppler 115 inquiries about a specific product that is placed in a retail unit opposing system 500I. In some embodiments, a plurality of systems 500 may communicate with central communication device 630. In order to reduce or avoid network congestion, each system 500 may identify an available transmission time slot. Thereafter, each system 500 may determine a default time slot for future transmissions based on the identified transmission time slot.

Figure 6C:
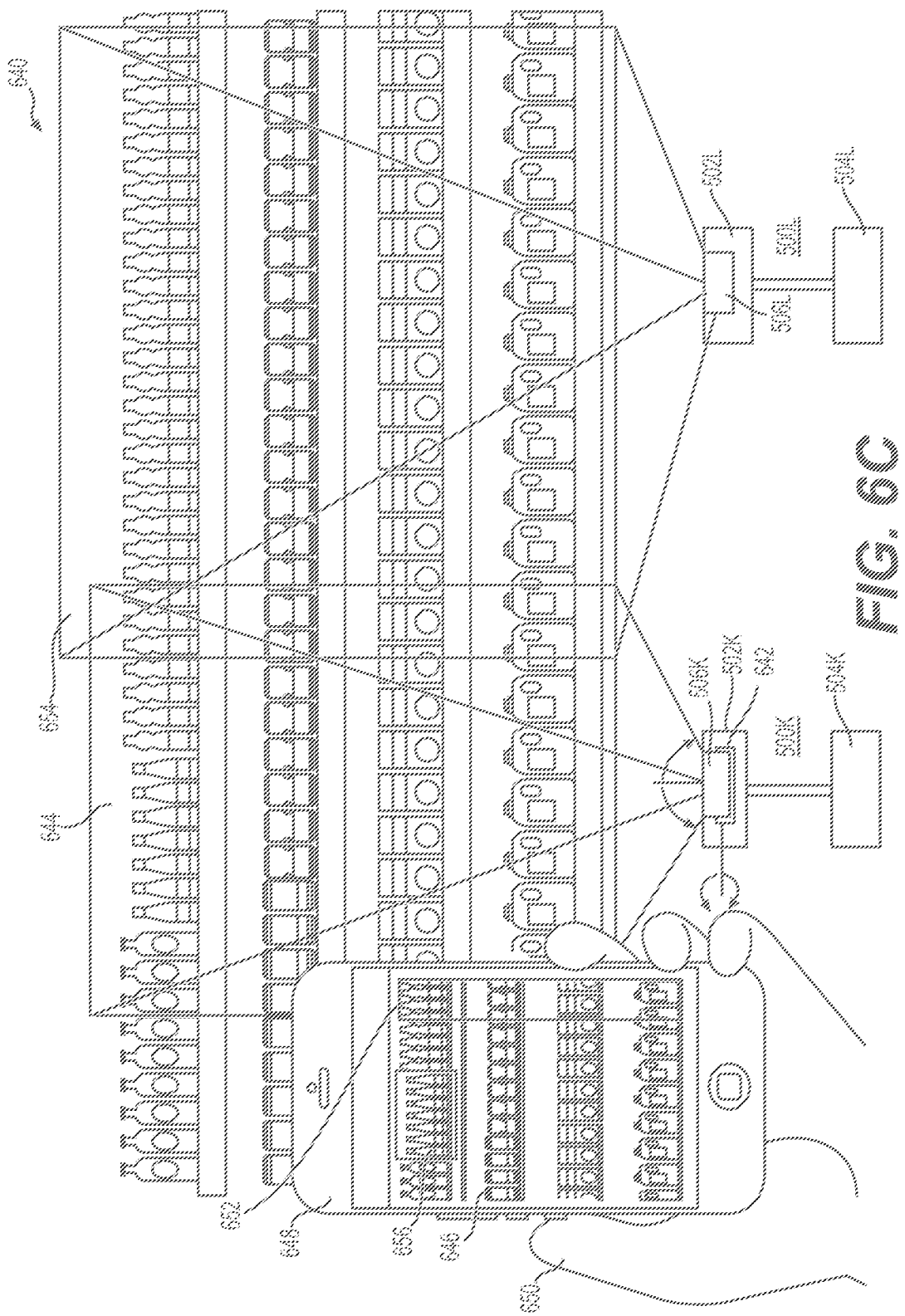
FIG. 6C provides a diagrammatic representation of how the exemplary disclosed image acquisition systems may be positioned relative to retail shelving to acquire product images, consistent with the present disclosure.

FIG. 6C provides a diagrammatic representation of a retail shelving unit 640 being captured by multiple systems 500 (e.g., system 500K and system 500L) deployed on an opposing retail shelving unit (not shown). FIG. 6C illustrates embodiments associated with the process of installing systems 500 in retail store 105. To facilitate the installation of system 500, each first housing 502 (e.g., first housing 502K) may include an adjustment mechanism 642 for setting a field of view 644 of image capture device 506K such that the field of view 644 will at least partially encompass products placed both on a bottom shelf of retail shelving unit 640 and on a top shelf of retail shelving unit 640. For example, adjustment mechanism 642 may enable setting the position of image capture device 506K relative to first housing 502K. Adjustment mechanism 642 may have at least two degrees of freedom to separately adjust manually (or automatically)

the vertical field of view and the horizontal field of view of image capture device 506K. In one embodiment, the angle of image capture device 506K may be measured using position sensors associated with adjustment mechanism 642, and the measured orientation may be used to determine if image capture device 506K is positioned in the right direction. In one example, the output of the position sensors may be displayed on a handheld device of an employee installing image capturing device 506K. Such an arrangement may provide the employee/installer with real time visual feedback representative of the field of view of an image acquisition device being installed.

In addition to adjustment mechanism 642, first housing 502 may include a first physical adapter (not shown) configured to operate with multiple types of image capture device 506 and a second physical adapter (not shown) configured to operate with multiple types of lenses. During installation, the first physical adapter may be used to connect a suitable image capture device 506 to system 500 according to the level of recognition requested (e.g., detecting a barcode from products, detecting text and price from labels, detecting different categories of products, and so forth). Similarly, during installation, the second physical adapter may be used to associate a suitable lens to image capture device 506 according to the physical conditions at the store (e.g., the distance between the aisles, the horizontal field of view required from image capture device 506, and/or the vertical field of view required from image capture device 506). The second physical adapter provides the employee/installer the ability to select the focal length of lens 312 during installation according to the distance between retail shelving units on opposite sides of an aisle (e.g., distance d1 and/or distance d2 shown in FIG. 6A). In some embodiments, adjustment mechanism 642 may include a locking mechanism to reduce the likelihood of unintentional changes in the field of view of image capture device 506. Additionally or alternatively, the at least one processor contained in second housing 504 may detect changes in the field of view of image capture device 506 and issue a warning when a change is detected, when a change larger than a selected threshold is detected, when a change is detected for a duration longer than a selected threshold, and so forth.

In addition to adjustment mechanism 642 and the different physical adapters, system 500 may modify the image data acquired by image capture device 506 based on at least one attribute associated with opposing retail shelving unit 640. Consistent with the present disclosure, the at least one attribute associated with retail shelving unit 640 may include a lighting condition, the dimensions of opposing retail shelving unit 640, the size of products displayed on opposing retail shelving unit 640, the type of labels used on opposing retail shelving unit 640, and more. In some embodiments, the attribute may be determined, based on analysis of one or more acquired images, by at least one processor contained in second housing 504. Alternatively, the attribute may be automatically sensed and conveyed to the at least one processor contained in second housing 504. In one example, the at least one processor may change the brightness of captured images based on the detected light conditions. In another example, the at least one processor may modify the image data by cropping the image such that it will include only the products on retail shelving unit (e.g., not to include the floor or the ceiling), only area of the shelving unit relevant to a selected task (such as planogram compliance check), and so forth.

Consistent with the present disclosure, during installation, system 500 may enable real-time display 646 of field of view 644 on a handheld device 648 of a user 650 installing image capturing device 506K. In one embodiment, real-time display 646 of field of view 644 may include augmented markings 652 indicating a location of a field of view 654 of an adjacent image capture device 506L. In another embodiment, real-time display 646 of field of view 644 may include augmented markings 656 indicating a region of interest in opposing retail shelving unit 640. The region of interest may be determined based on a planogram, identified product type, and/or part of retail shelving unit 640. For example, the region of interest may include products with a greater likelihood of planogram incompliance. In addition, system 500K may analyze acquired images to determine if field of view 644 includes the area that image capturing device 506K is supposed to monitor (for example, from labels on opposing retail shelving unit 640, products on opposing retail shelving unit 640, images captured from other image capturing devices that may capture other parts of opposing retail shelving unit 640 or capture the same part of opposing retail shelving unit 640 but in a lower resolution or at a lower frequency, and so forth). In additional embodiments, system 500 may further comprise an indoor location sensor which may help determine if the system 500 is positioned at the right location in retail store 105.

In some embodiments, an anti-theft device may be located in at least one of first housing 502 and second housing 504. For example, the anti-theft device may include a specific RF label or a pin-tag radio-frequency identification device, which may be the same or similar to a type of anti-theft device that is used by retail store 105 in which system 500 is located. The RF label or the pin-tag may be incorporated within the body of first housing 502 and second housing 504 and may not be visible. In another example, the anti-theft device may include a motion sensor whose output may be used to trigger an alarm in the case of motion or disturbance, in case of motion that is above a selected threshold, and so forth.

Figure 7A:
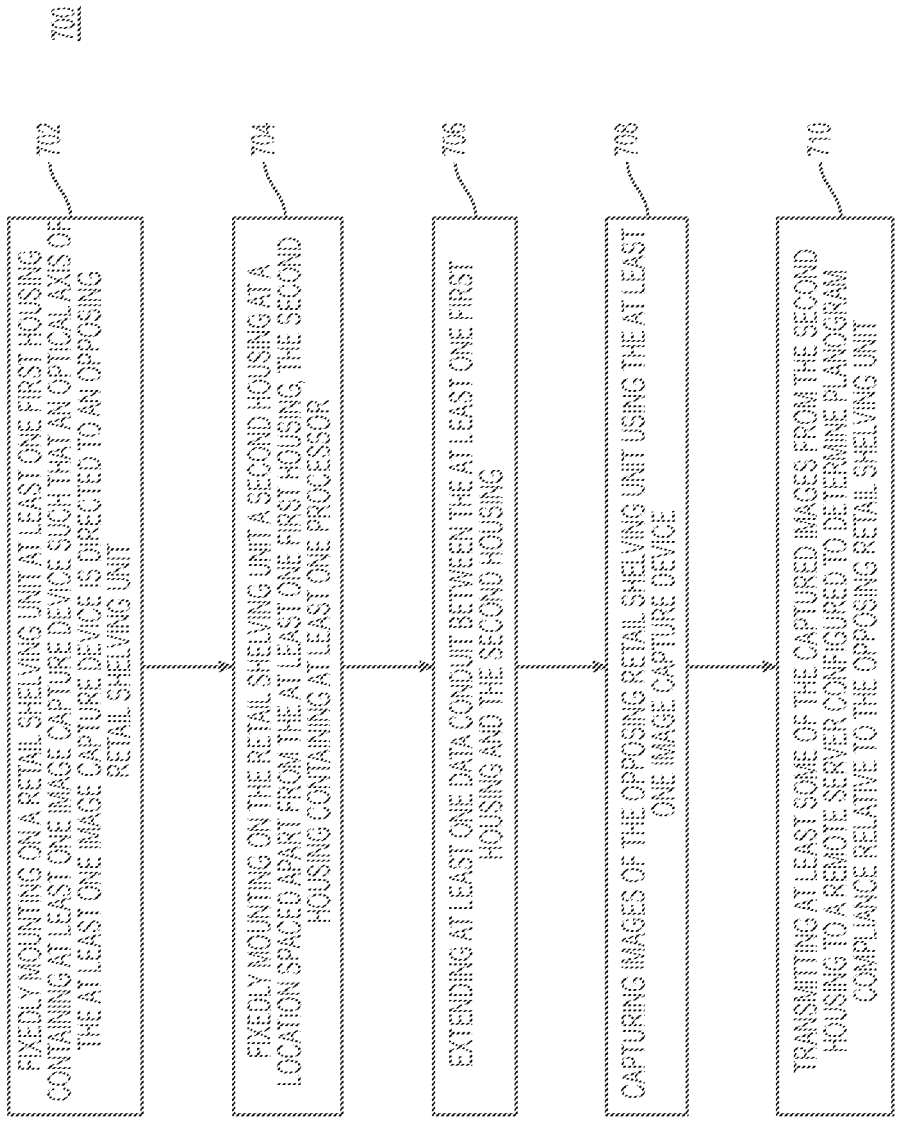
FIG. 7A provides a flowchart of an exemplary method for acquiring images of products in retail store, consistent with the present disclosure.

FIG. 7A includes a flowchart representing an exemplary method 700 for acquiring images of products in retail store 105 in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method can be altered to modify the order of steps, delete steps, or further include additional steps.

At step 702, the method includes fixedly mounting on first retail shelving unit 602 at least one first housing 502 containing at least one image capture device 506 such that an optical axis (e.g., optical axis 606) of at least one image capture device 506 is directed to second retail shelving unit 604. In one embodiment, fixedly mounting first housing 502 on first retail shelving unit 602 may include placing first housing 502 on a side of store shelf 622 facing second retail shelving unit 604. In another embodiment, fixedly mounting first housing 502 on retail shelving unit 602 may include placing first housing 502 in a slit between two adjacent horizontal shelves. In some embodiments, the method may further include fixedly mounting on first retail shelving unit 602 at least one projector (such as projector 632) such that light patterns projected by the at least one projector are directed to second retail shelving unit 604. In one embodiment, the method may include mounting the at least one projector to first retail shelving unit 602 at a selected distance to first housing 502 with image capture device 506. In one embodiment, the selected distance may be at least 5 cm, at least 10 cm, at least 15 cm, less than 40 cm, less than 30 cm, between about 5 cm to about 20 cm, or between about 10 cm to about 15 cm. In one embodiment, the selected distance may be calculated according to a distance between to first retail shelving unit 602 and second retail shelving unit 604, such as d1 and/or d2, for example selecting the distance to be a function of d1 and/or d2, a linear function of d1 and/or d2, a function of d1*log(d1) and/or d2*log(d2) such as a1*d1*log(d1) for some constant a1, and so forth.

At step 704, the method includes fixedly mounting on first retail shelving unit 602 second housing 504 at a location spaced apart from the at least one first housing 502, second housing 504 may include at least one processor (e.g., processing device 302). In one embodiment, fixedly mounting second housing 504 on the retail shelving unit may include placing second housing 504 on a different side of store shelf 622 than the side first housing 502 is mounted on.

At step 706, the method includes extending at least one data conduit 508 between at least one first housing 502 and second housing 504. In one embodiment, extending at least one data conduit 508 between at least one first housing 502 and second housing 504 may include adjusting the length of data conduit 508 to enable first housing 502 to be mounted separately from second housing 504. At step 708, the method includes capturing images of second retail shelving unit 604 using at least one image capture device 506 contained in at least one first housing 502 (e.g., first housing 502A, first housing 502B, or first housing 502C). In one embodiment, the method further includes periodically capturing images of products located on second retail shelving unit 604. In another embodiment the method includes capturing images of second retail shelving unit 604 after receiving a trigger from at least one additional sensor in communication with system 500 (wireless or wired).

At step 710, the method includes transmitting at least some of the captured images from second housing 504 to a remote server (e.g., server 135) configured to determine planogram compliance relative to second retail shelving unit 604. In some embodiments, determining planogram compliance relative to second retail shelving unit 604 may include determining at least one characteristic of planogram compliance based on detected differences between the at least one planogram and the actual placement of the plurality of product types on second retail shelving unit 604. Consistent with the present disclosure, the characteristic of planogram compliance may include at least one of: product facing, product placement, planogram compatibility, price correlation, promotion execution, product homogeneity, restocking rate, and planogram compliance of adjacent products.

Figure 7B:
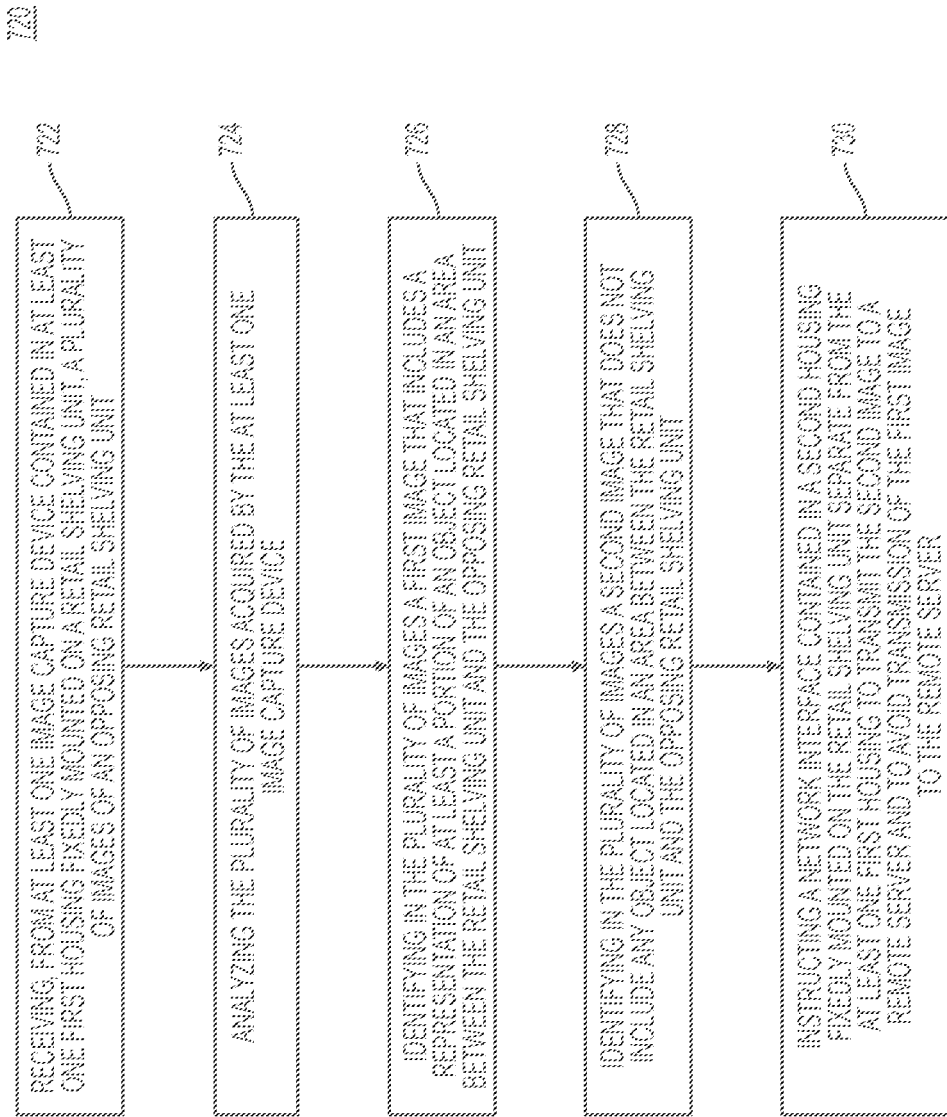
FIG. 7B provides a flowchart of a method for acquiring images of products in retail store, consistent with the present disclosure.

FIG. 7B provides a flowchart representing an exemplary method 720 for acquiring images of products in retail store 105, in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method can be altered to modify the order of steps, delete steps, or further include additional steps.

At step 722, at least one processor contained in a second housing may receive from at least one image capture device contained in at least one first housing fixedly mounted on a retail shelving unit a plurality of images of an opposing retail shelving unit. For example, at least one processor contained in second housing 504A may receive from at least one image capture device 506 contained in first housing 502A (fixedly mounted on first retail shelving unit 602) a plurality of images of second retail shelving unit 604. The plurality of images may be captured and collected during a period of time (e.g., a minute, an hour, six hours, a day, a week, or more).

At step 724, the at least one processor contained in the second housing may analyze the plurality of images acquired by the at least one image capture device. In one embodiment, at least one processor contained in second housing 504A may use any suitable image analysis technique (for example, object recognition, object detection, image segmentation, feature extraction, optical character recognition (OCR), object-based image analysis, shape region techniques, edge detection techniques, pixel-based detection, artificial neural networks, convolutional neural networks, etc.) to identify objects in the plurality of images. In one example, the at least one processor contained in second housing 504A may determine the number of products located in second retail shelving unit 604. In another example, the at least one processor contained in second housing 504A may detect one or more objects in an area between first retail shelving unit 602 and second retail shelving unit 604.

At step 726, the at least one processor contained in the second housing may identify in the plurality of images a first image that includes a representation of at least a portion of an object located in an area between the retail shelving unit and the opposing retail shelving unit. In step 728, the at least one processor contained in the second housing may identify in the plurality of images a second image that does not include any object located in an area between the retail shelving unit and the opposing retail shelving unit. In one example, the object in the first image may be an individual, such as a customer or a store employee. In another example, the object in the first image may be an inanimate object, such as carts, boxes, products, etc.

At step 730, the at least one processor contained in the second housing may instruct a network interface contained in the second housing, fixedly mounted on the retail shelving unit separate from the at least one first housing, to transmit the second image to a remote server and to avoid transmission of the first image to the remote server. In addition, the at least one processor may issue a notification when an object blocks the field of view of the image capturing device for more than a predefined period of time (e.g., at least 30 minutes, at least 75 minutes, at least 150 minutes).

Embodiments of the present disclosure may automatically assess compliance of one or more store shelves with a planogram. For example, embodiments of the present disclosure may use signals from one or more sensors to determine placement of one or more products on store shelves. The disclosed embodiments may also use one or more sensors to determine empty spaces on the store shelves. The placements and empty spaces may be automatically assessed against a digitally encoded planogram. A planogram refers to any data structure or specification that defines at least one product characteristic relative to a display structure associated with a retail environment (such as store shelf or area of one or more shelves). Such product characteristics may include, among other things, quantities of products with respect to areas of the shelves, product configurations or product shapes with respect to areas of the shelves, product arrangements with respect to areas of the shelves, product density with respect to areas of the shelves, product combinations with respect to areas of the shelves, etc. Although described with reference to store shelves, embodiments of the present disclosure may also be applied to end caps or other displays; bins, shelves, or other organizers associated with a refrigerator or freezer units; or any other display structure associated with a retail environment.

The embodiments disclosed herein may use any sensors configured to detect one or more parameters associated with products (or a lack thereof). For example, embodiments may use one or more of pressure sensors, weight sensors, light sensors, resistive sensors, capacitive sensors, inductive sensors, vacuum pressure sensors, high pressure sensors, conductive pressure sensors, infrared sensors, photo-resistor sensors, photo-transistor sensors, photo-diodes sensors, ultrasonic sensors, or the like. Some embodiments may use a plurality of different kinds of sensors, for example, associated with the same or overlapping areas of the shelves and/or associated with different areas of the shelves. Some embodiments may use a plurality of sensors configured to be placed adjacent a store shelf, configured for location on the store shelf, configured to be attached to, or configured to be integrated with the store shelf. In some cases, at least part of the plurality of sensors may be configured to be placed next to a surface of a store shelf configured to hold products. For example, the at least part of the plurality of sensors may be configured to be placed relative to a part of a store shelf such that the at least part of the plurality of sensors may be positioned between the part of a store shelf and products placed on the part of the shelf. In another embodiment, the at least part of the plurality of sensors may be configured to be placed above and/or within and/or under the part of the shelf.

In one example, the plurality of sensors may include light detectors configured to be located such that a product placed on the part of the shelf may block at least some of the ambient light from reaching the light detectors. The data received from the light detectors may be analyzed to detect a product or to identify a product based on the shape of a product placed on the part of the shelf. In one example, the system may identify the product placed above the light detectors based on data received from the light detectors that may be indicative of at least part of the ambient light being blocked from reaching the light detectors. Further, the data received from the light detectors may be analyzed to detect vacant spaces on the store shelf. For example, the system may detect vacant spaces on the store shelf based on the received data that may be indicative of no product being placed on a part of the shelf. In another example, the plurality of sensors may include pressure sensors configured to be located such that a product placed on the part of the shelf may apply detectable pressure on the pressure sensors. Further, the data received from the pressure sensors may be analyzed to detect a product or to identify a product based on the shape of a product placed on the part of the shelf. In one example, the system may identify the product placed above the pressure sensors based on data received from the pressure sensors being indicative of pressure being applied on the pressure sensors. In addition, the data from the pressure sensors may be analyzed to detect vacant spaces on the store shelf, for example based on the readings being indicative of no product being placed on a part of the shelf, for example, when the pressure readings are below a selected threshold. Consistent with the present disclosure, inputs from different types of sensors (such as pressure sensors, light detectors, etc.) may be combined and analyzed together, for example to detect products placed on a store shelf, to identify shapes of products placed on a store shelf, to identify types of products placed on a store shelf, to identify vacant spaces on a store shelf, and so forth.

Figure 8A:
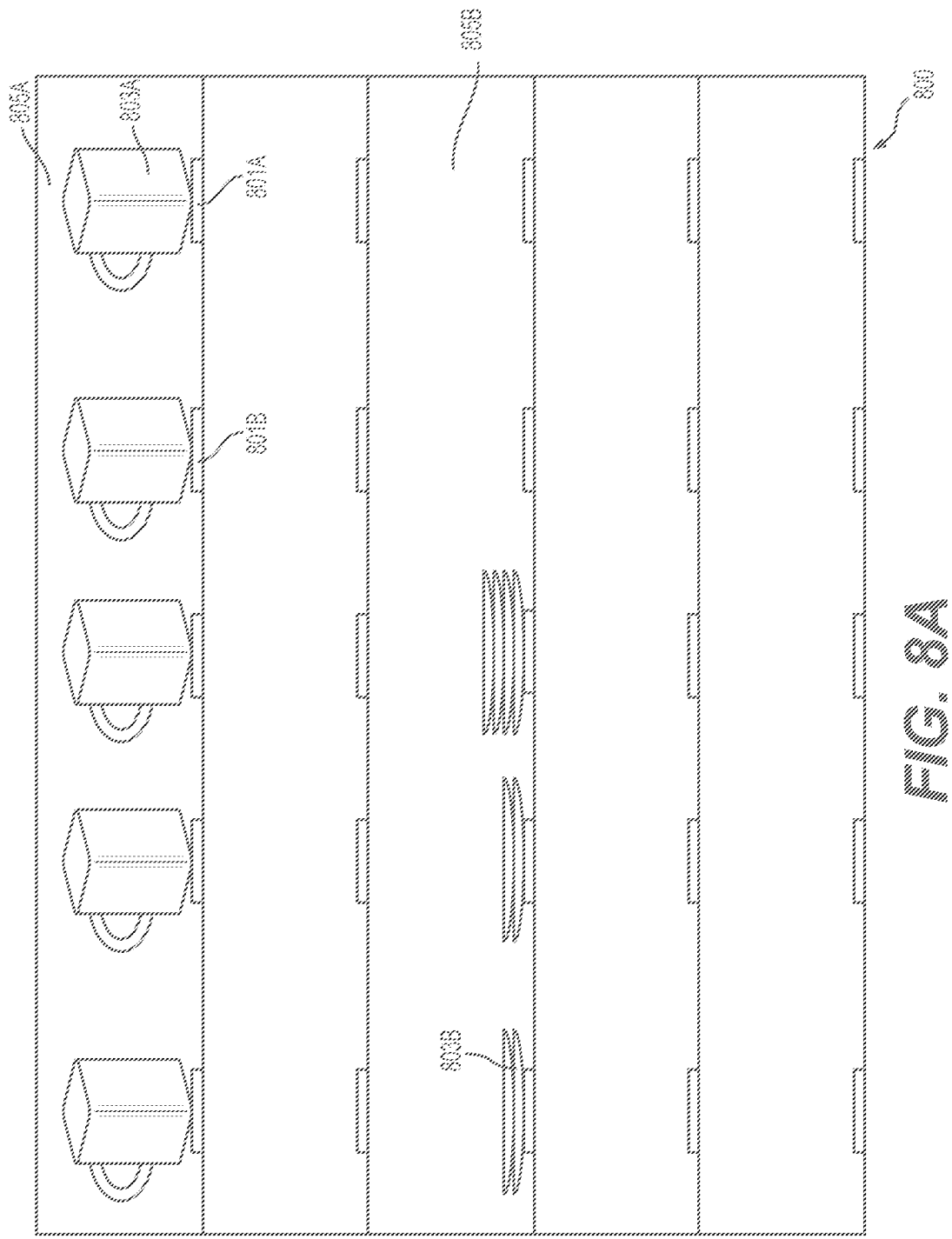
FIG. 8A is a schematic illustration of an example configuration for detecting products and empty spaces on a store shelf, consistent with the present disclosure.

With reference to FIG. 8A and consistent with the present disclosure, a store shelf 800 may include a plurality of detection elements, e.g., detection elements 801A and 801B. In the example of FIG. 8A, detection elements 801A and 801B may comprise pressure sensors and/or other type of sensors for measuring one or more parameters (such as resistance, capacitance, or the like) based on physical contact (or lack thereof) with products, e.g., product 803A and product 803B. Additionally or alternatively, detection elements configured to measure one or more parameters (such as current induction, magnetic induction, visual or other electromagnetic reflectance, visual or other electromagnetic emittance, or the like) may be included to detect products based on physical proximity (or lack thereof) to products. Consistent with the present disclosure, the plurality of detection elements may be configured for location on shelf 800. The plurality of detection elements may be configured to detect placement of products when the products are placed above at least part of the plurality of detection elements. Some embodiments of the disclosure, however, may be performed when at least some of the detection elements may be located next to shelf 800 (e.g., for magnetometers or the like), across from shelf 800 (e.g., for image sensors or other light sensors, light detection and ranging (LIDAR) sensors, radio detection and ranging (RADAR) sensors, or the like), above shelf 800 (e.g., for acoustic sensors or the like), below shelf 800 (e.g., for pressure sensors or the like), or any other appropriate spatial arrangement. Although depicted as standalone units in the example of FIG. 8A, the plurality of detection elements may form part of a fabric (e.g., a smart fabric or the like), and the fabric may be positioned on a shelf to take measurements. For example, two or more detection elements may be integrated together into a single structure (e.g., disposed within a common housing, integrated together within a fabric or mat, and so forth). In some examples, detection elements (such as detection elements 801A and 801B) may be placed adjacent to (or placed on) store shelves as described above. Some examples of detection elements may include pressure sensors and/or light detectors configured to be placed above and/or within and/or under a store shelf as described above.

Detection elements associated with shelf 800 may be associated with different areas of shelf 800. For example, detection elements 801A and 801B are associated with area 805A while other detection elements are associated with area 805B. Although depicted as rows, areas 805A and 805B may comprise any areas of shelf 800, whether contiguous (e.g., a square, a rectangular, or other regular or irregular shape) or not (e.g., a plurality of rectangles or other regular and/or irregular shapes). Such areas may also include horizontal regions between shelves (as shown in FIG. 8A) or may include vertical regions that include area of multiple different shelves (e.g., columnar regions spanning over several different horizontally arranged shelves). In some examples, the areas may be part of a single plane. In some examples, each area may be part of a different plane. In some examples, a single area may be part of a single plane or be divided across multiple planes.

One or more processors (e.g., processing device 202) configured to communicate with the detection elements (e.g., detection elements 801A and 801B) may detect first signals associated with a first area (e.g., areas 805A and/or 805B) and second signals associated with a second area. In some embodiments, the first area may, in part, overlap with the second area. For example, one or more detection elements may be associated with the first area as well as the second area and/or one or more detection elements of a first type may be associated with the first area while one or more detection elements of a second type may be associated with the second area overlapping, at least in part, the first area. In other embodiments, the first area and the second area may be spatially separate from each other.

The one or more processors may, using the first and second signals, determine that one or more products have been placed in the first area while the second area includes at least one empty area. For example, if the detection elements include pressure sensors, the first signals may include weight signals that match profiles of particular products (such as the mugs or plates depicted in the example of FIG. 8A), and the second signals may include weight signals indicative of the absence of products (e.g., by being equal to or within a threshold of a default value such as atmospheric pressure or the like). The disclosed weight signals may be representative of actual weight values associated with a particular product type or, alternatively, may be associated with a relative weight value sufficient to identify the product and/or to identify the presence of a product. In some cases, the weight signal may be suitable for verifying the presence of a product regardless of whether the signal is also sufficient for product identification. In another example, if the detection elements include light detectors (as described above), the first signals may include light signals that match profiles of particular products (such as the mugs or plates depicted in the example of FIG. 8A), and the second signals may include light signals indicative of the absence of products (e.g., by being equal to or within a threshold of a default value such as values corresponding to ambient light or the like). For example, the first light signals may be indicative of ambient light being blocked by particular products, while the second light signals may be indicative of no product blocking the ambient light. The disclosed light signals may be representative of actual light patterns associated with a particular product type or, alternatively, may be associated with light patterns sufficient to identify the product and/or to identify the presence of a product.

The one or more processors may similarly process signals from other types of sensors. For example, if the detection elements include resistive or inductive sensors, the first signals may include resistances, voltages, and/or currents that match profiles of particular products (such as the mugs or plates depicted in the example of FIG. 8A or elements associated with the products, such as tags, etc.), and the second signals may include resistances, voltages, and/or currents indicative of the absence of products (e.g., by being equal to or within a threshold of a default value such as atmospheric resistance, a default voltage, a default current, corresponding to ambient light, or the like). In another example, if the detection elements include acoustics, LIDAR, RADAR, or other reflective sensors, the first signals may include patterns of returning waves (whether sound, visible light, infrared light, radio, or the like) that match profiles of particular products (such as the mugs or plates depicted in the example of FIG. 8A), and the second signals may include patterns of returning waves (whether sound, visible light, infrared light, radio, or the like) indicative of the absence of products (e.g., by being equal to or within a threshold of a pattern associated with an empty shelf or the like).

Any of the profile matching described above may include direct matching of a subject to a threshold. For example, direct matching may include testing one or more measured values against the profile value(s) within a margin of error; mapping a received pattern onto a profile pattern with a residual having a maximum, minimum, integral, or the like within the margin of error; performing an autocorrelation, Fourier transform, convolution, or other operation on received measurements or a received pattern and comparing the resultant values or function against the profile within a margin of error; or the like. Additionally or alternatively, profile matching may include fuzzy matching between measured values and/or patterns and a database of profiles such that a profile with a highest level of confidence according to the fuzzy search. Moreover, as depicted in the example of FIG. 8A, products, such as product 803B, may be stacked and thus associated with a different profile when stacked than when standalone.

Any of the profile matching described above may include use of one or more machine learning techniques. For example, one or more artificial neural networks, random forest models, or other models trained on measurements annotated with product identifiers may process the measurements from the detection elements and identify products therefrom. In such embodiments, the one or more models may use additional or alternative input, such as images of the shelf (e.g., from capturing devices 125 of FIGS. 4A-4C explained above) or the like.

Based on detected products and/or empty spaces, determined using the first signals and second signals, the one or more processors may determine one or more aspects of planogram compliance. For example, the one or more processors may identify products and their locations on the shelves, determine quantities of products within particular areas (e.g., identifying stacked or clustered products), identify facing directions associated with the products (e.g., whether a product is outward facing, inward facing, askew, or the like), or the like. Identification of the products may include identifying a product type (e.g., a bottle of soda, a loaf of bread, a notepad, or the like) and/or a product brand (e.g., a Coca-Cola® bottle instead of a Sprite® bottle, a Starbucks® coffee tumbler instead of a Tervis® coffee tumbler, or the like). Product facing direction and/or orientation, for example, may be determined based on a detected orientation of an asymmetric shape of a product base using pressure sensitive pads, detected density of products, etc. For example, the product facing may be determined based on locations of detected product bases relative to certain areas of a shelf (e.g., along a front edge of a shelf), etc. Product facing may also be determined using image sensors, light sensors, or any other sensor suitable for detecting product orientation.

The one or more processors may generate one or more indicators of the one or more aspects of planogram compliance. For example, an indicator may comprise a data packet, a data file, or any other data structure indicating any variations from a planogram, e.g., with respect to product placement such as encoding intended coordinates of a product and actual coordinates on the shelf, with respect to product facing direction and/or orientation such as encoding indicators of locations that have products not facing a correct direction and/or in an undesired orientation, or the like.

In addition to or as an alternative to determining planogram compliance, the one or more processors may detect a change in measurements from one or more detection elements. Such measurement changes may trigger a response. For example, a change of a first type may trigger capture of at least one image of the shelf (e.g., using capturing devices 125 of FIGS. 4A-4C explained above) while a detected change of a second type may cause the at least one processor to forgo such capture. A first type of change may, for example, indicate the moving of a product from one location on the shelf to another location such that planogram compliance may be implicated. In such cases, it may be desired to capture an image of the product rearrangement in order to assess or reassess product planogram compliance. In another example, a first type of change may indicate the removal of a product from the shelf, e.g., by an employee due to damage, by a customer to purchase, or the like. On the other hand, a second type of change may, for example, indicate the removal and replacement of a product to the same (within a margin of error) location on the shelf, e.g., by a customer to inspect the item. In cases where products are removed from a shelf, but then replaced on the shelf (e.g., within a particular time window), the system may forgo a new image capture, especially if the replaced product is detected in a location similar to or the same as its recent, original position.

With reference to FIG. 8B and consistent with the present disclosure, a store shelf 850 may include a plurality of detection elements, e.g., detection elements 851A and 851B. In the example of FIG. 8B, detection elements 851A and 851B may comprise light sensors and/or other sensors measuring one or more parameters (such as visual or other electromagnetic reflectance, visual or other electromagnetic emittance, or the like) based on electromagnetic waves from products, e.g., product 853A and product 853B. Additionally or alternatively, as explained above with respect to FIG. 8B, detection elements 851A and 851B may comprise pressure sensors, other sensors measuring one or more parameters (such as resistance, capacitance, or the like) based on physical contact (or lack thereof) with the products, and/or other sensors that measure one or more parameters (such as current induction, magnetic induction, visual or other electromagnetic reflectance, visual or other electromagnetic emittance, or the like) based on physical proximity (or lack thereof) to products.

Moreover, although depicted as located on shelf 850, some detection elements may be located next to shelf 850 (e.g., for magnetometers or the like), across from shelf 850 (e.g., for image sensors or other light sensors, light detection and ranging (LIDAR) sensors, radio detection and ranging (RADAR) sensors, or the like), above shelf 850 (e.g., for acoustic sensors or the like), below shelf 850 (e.g., for pressure sensors, light detectors, or the like), or any other appropriate spatial arrangement. Further, although depicted as standalone in the example of FIG. 8B, the plurality of detection elements may form part of a fabric (e.g., a smart fabric or the like), and the fabric may be positioned on a shelf to take measurements.

Detection elements associated with shelf 850 may be associated with different areas of shelf 850, e.g., area 855A, area 855B, or the like. Although depicted as rows, areas 855A and 855B may comprise any areas of shelf 850, whether contiguous (e.g., a square, a rectangular, or other regular or irregular shape) or not (e.g., a plurality of rectangles or other regular and/or irregular shapes).

One or more processors (e.g., processing device 202) in communication with the detection elements (e.g., detection elements 851A and 851B) may detect first signals associated with a first area and second signals associated with a second area. Any of the processing of the first and second signals described above with respect to FIG. 8A may similarly be performed for the configuration of FIG. 8B.

In both FIGS. 8A and 8B, the detection elements may be integral to the shelf, part of a fabric or other surface configured for positioning on the shelf, or the like. Power and/or data cables may form part of the shelf, the fabric, the surface, or be otherwise connected to the detection elements. Additionally or alternatively, as depicted in FIGS. 8A and 8B, individual sensors may be positioned on the shelf. For example, the power and/or data cables may be positioned under the shelf and connected through the shelf to the detection elements. In another example, power and/or data may be transmitted wirelessly to the detection elements (e.g., to wireless network interface controllers forming part of the detection elements). In yet another example, the detection elements may include internal power sources (such as batteries or fuel cells).

Figure 9:
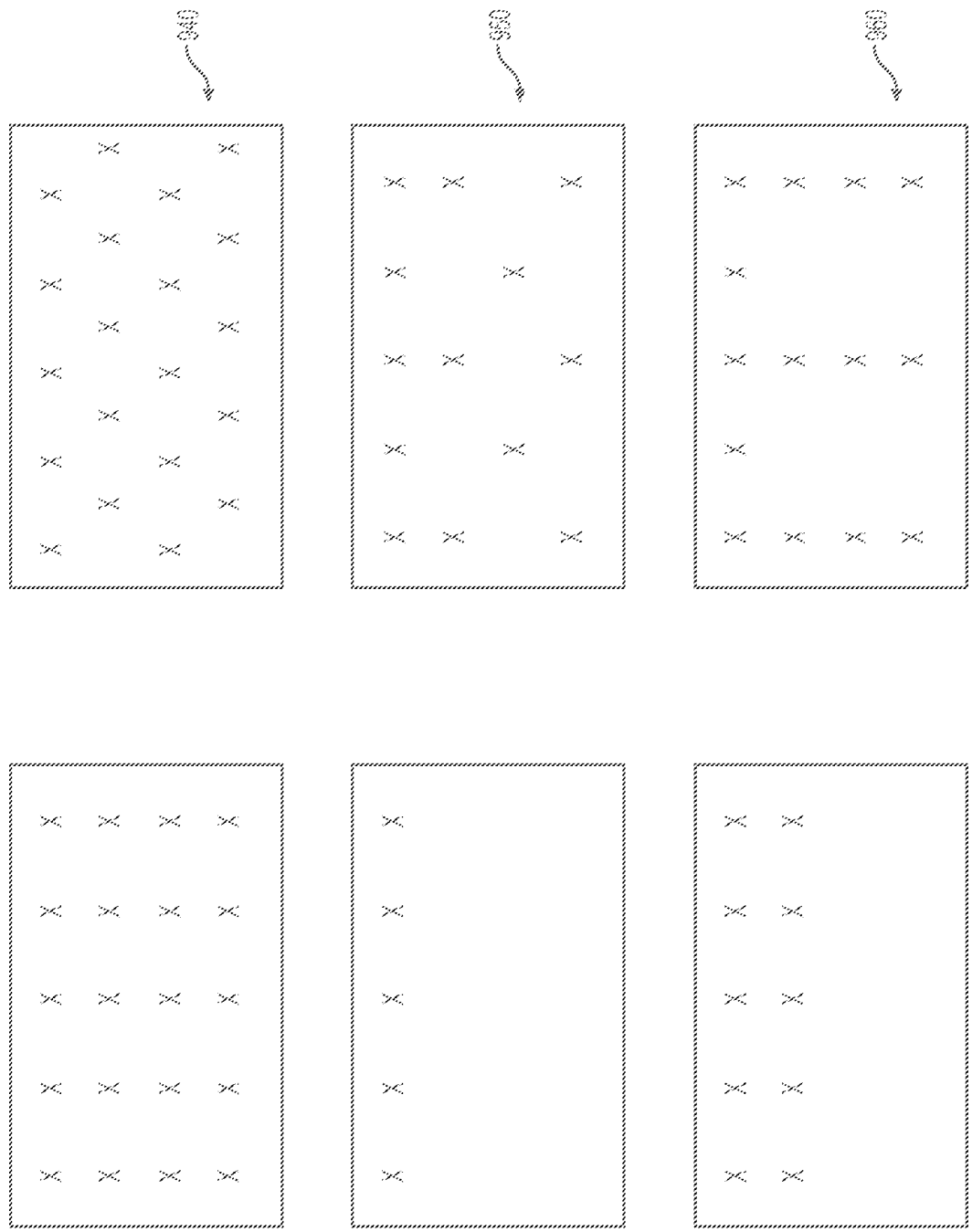
FIG. 9 is a schematic illustration of example configurations for detection elements on store shelves, consistent with the present disclosure.

With reference to FIG. 9 and consistent with the present disclosure, the detection elements described above with reference to FIGS. 8A and 8B may be arranged on rows of the shelf in any appropriate configuration. All of the arrangements of FIG. 9 are shown as a top-down view of a row (e.g., area 805A, area 805B, area 855A, area 855B, or the like) on the shelf. For example, arrangements 910 and 940 are both uniform distributions of detection elements within a row. However, arrangement 910 is also uniform throughout the depth of the row while arrangement 940 is staggered. Both arrangements may provide signals that represent products on the shelf in accordance with spatially uniform measurement locations. As further shown in FIG. 9, arrangements 920, 930, 950, and 960 cluster detection elements near the front (e.g., a facing portion) of the row. Arrangement 920 includes detection elements at a front portion while arrangement 930 includes defection elements in a larger portion of the front of the shelf. Such arrangements may save power and processing cycles by having fewer detection elements on a back portion of the shelf. Arrangements 950 and 960 include some detection elements in a back portion of the shelf but these elements are arranged less dense than detection elements in the front. Such arrangements may allow for detections in the back of the shelf (e.g., a need to restock products, a disruption to products in the back by a customer or employee, or the like) while still using less power and fewer processing cycles than arrangements 910 and 940. Such arrangements may include a higher density of detection elements in regions of the shelf (e.g., a front edge of the shelf) where product turnover rates may be higher than in other regions (e.g., at areas deeper into a shelf), and/or in regions of the shelf where planogram compliance is especially important.

FIG. 10A is a flow chart, illustrating an exemplary method 1000 for monitoring planogram compliance on a store shelf, in accordance with the presently disclosed subject matter. It is contemplated that method 1000 may be used with any of the detection element arrays discussed above with reference to, for example, FIGS. 8A, 8B and 9. The order and arrangement of steps in method 1000 is provided for purposes of illustration. As will be appreciated from this disclosure, modifications may be made to process 1000, for example, adding, combining, removing, and/or rearranging one or more steps of process 1000.

Method 1000 may include a step 1005 of receiving first signals from a first subset of detection elements (e.g., detection elements 801A and 801B of FIG. 8A) from among the plurality of detection elements after one or more of a plurality of products (e.g., products 803A and 803B) are placed on at least one area of the store shelf associated with the first subset of detection elements. As explained above with respect to FIGS. 8A and 8B, the plurality of detection elements may be embedded into a fabric configured to be positioned on the store shelf. Additionally or alternatively, the plurality of detection elements may be configured to be integrated with the store shelf. For example, an array of pressure sensitive elements (or any other type of detector) may be fabricated as part of the store shelf. In some examples, the plurality of detection elements may be configured to placed adjacent to (or located on) store shelves, as described above.

As described above with respect to arrangements 910 and 940 of FIG. 9, the plurality of detection elements may be substantially uniformly distributed across the store shelf. Alternatively, as described above with respect to arrangements 920, 930, 950, and 960 of FIG. 9, the plurality of detection elements may be distributed relative to the store shelf such that a first area of the store shelf has a higher density of detection elements than a second area of the store shelf. For example, the first area may comprise a front portion of the shelf, and the second area may comprise a back portion of the shelf.

In some embodiments, such as those including pressure sensors or other contact sensors as depicted in the example of FIG. 8A, step 1005 may include receiving the first signals from the first subset of detection elements as the plurality of products are placed above the first subset of detection elements. In some embodiments where the plurality of detection elements includes pressure detectors, the first signals may be indicative of pressure levels detected by pressure detectors corresponding to the first subset of detection elements after one or more of the plurality of products are placed on the at least one area of the store shelf associated with the first subset of detection elements. For example, the first signals may be indicative of pressure levels detected by pressure detectors corresponding to the first subset of detection elements after stocking at least one additional product above a product previously positioned on the shelf, removal of a product from the shelf, or the like. In other embodiments where the plurality of detection elements includes light detectors, the first signals may be indicative of light measurements made with respect to one or more of the plurality of products placed on the at least one area of the store shelf associated with the first subset of detection elements. Specifically, the first signals may be indicative of at least part of the ambient light being blocked from reaching the light detectors by the one or more of the plurality of products.

In embodiments including proximity sensors as depicted in the example of FIG. 8B, step 1005 may include receiving the first signals from the first subset of detection elements as the plurality of products are placed below the first subset of detection elements. In embodiments where the plurality of detection elements include proximity detectors, the first signals may be indicative of proximity measurements made with respect to one or more of the plurality of products placed on the at least one area of the store shelf associated with the first subset of detection elements.

Method 1000 may include step 1010 of using the first signals to identify at least one pattern associated with a product type of the plurality of products. For example, any of the pattern matching techniques described above with respect to FIGS. 8A and 8B may be used for identification. A pattern associated with a product type may include a pattern (e.g., a continuous ring, a discontinuous ring of a certain number of points, a certain shape, etc.) associated with a base of a single product. The pattern associated with a product type may also be formed by a group of products. For example, a six pack of soda cans may be associated with a pattern including a 2×3 array of continuous rings associated with the six cans of that product type. Additionally, a grouping of two liter bottles may form a detectable pattern including an array (whether uniform, irregular, or random) of discontinuous rings of pressure points, where the rings have a diameter associated with a particular 2-liter product. Various other types of patterns may also be detected (e.g., patterns associated with different product types arranged adjacent to one another, patterns associated with solid shapes (such as a rectangle of a boxed product), and so forth). In another example, an artificial neural network configured to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements). In yet another example, a machine learning algorithm trained using training examples to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements).

In some embodiments, step 1010 may further include accessing a memory storing data (e.g., memory device 226 of FIG. 2 and/or memory device 314 of FIG. 3A) associated with patterns of different types of products. In such embodiments, step 1010 may include using the first signals to identify at least one product of a first type using a first pattern (or a first product model) and at least one product of a second type using a second pattern (or a second product model). For example, the first type may include one brand (such as Coca-Cola® or Folgers®) while the second type may include another brand (such as Pepsi® or Maxwell House®). In this example, a size, shape, point spacing, weight, resistance or other property of the first brand may be different from that of the second brand such that the detection elements may differentiate the brands. Such characteristics may also be used to differentiate like-branded, but different products from one another (e.g., a 12-ounce can of Coca Cola, versus a 16 oz bottle of Coca Cola, versus a 2-liter bottle of Coca Cola). For example, a soda may have a base detectable by a pressure sensitive pad as a continuous ring. Further, the can of soda may be associated with a first weight signal having a value recognizable as associated with such a product. A 16 ounce bottle of soda may be associated with a base having four or five pressure points, which a pressure sensitive pad may detect as arranged in a pattern associated with a diameter typical of such a product. The 16 ounce bottle of soda may also be associated with a second weight signal having a value higher than the weight signal associated with the 12 ounce can of soda. Further still, a 2 liter bottle of soda may be associated with a base having a ring, four or five pressure points, etc. that a pressure sensitive pad may detect as arranged in a pattern associated with a diameter typical of such a product. The 2 liter bottle of soda may be associated with a weight signal having a value higher than the weight signal associated with the 12 ounce can of soda and 16 ounce bottle of soda.

In the example of FIG. 8B, the different bottoms of product 853A and product 853B may be used to differentiate the products from each other. For example, detection elements such as pressure sensitive pads may be used to detect a product base shape and size (e.g., ring, pattern of points, asymmetric shape, base dimensions, and so forth). Such a base shape and size may be used (optionally, together with one or more weight signals) to identify a particular product. The signals may also be used to identify and/or distinguish product types from one another. For example, a first type may include one category of product (such as soda cans) while a second type may include a different category of product (such as notepads). In another example, detection elements such as light detectors may be used to detect a product based on a pattern of light readings indicative of a product blocking at least part of the ambient light from reaching the light detectors. Such pattern of light readings may be used to identify product type and/or product category and/or product shape. For example, products of a first type may block a first subset of light frequencies of the ambient light from reaching the light detectors, while products of a second type may block a second subset of light frequencies of the ambient light from reaching the light detectors (the first subset and second subset may differ). In this case, the type of the products may be determined based on the light frequencies reaching the light detectors. In another example, products of a first type may have a first shape of shades and therefore may block ambient light from reaching light detectors arranged in one shape, while products of a second type may have a second shape of shades and therefore may block ambient light from reaching light detectors arranged in another shape. In this case, the type of the products may be determined based on the shape of blocked ambient light. Any of the pattern matching techniques described above may be used for the identification.

Additionally or alternatively, step 1010 may include using the at least one pattern to determine a number of products placed on the at least one area of the store shelf associated with the first subset of detection elements. For example, any of the pattern matching techniques described above may be used to identify the presence of one or more product types and then to determine the number of products of each product type (e.g., by detecting a number of similarly sized and shaped product bases and optionally by detecting weight signals associated with each detected base). In another example, an artificial neural network configured to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). In yet another example, a machine learning algorithm trained using training examples to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). Additionally or alternatively, step 1010 may include extrapolating from a stored pattern associated with a single product (or type of product) to determine the number of products matching the first signals. In such embodiments, step 1010 may further include determining, for example based on product dimension data stored in a memory, a number of additional products that can be placed on the at least one area of the store shelf associated with the second subset of detection elements. For example, step 1010 may include extrapolating based on stored dimensions of each product and stored dimensions of the shelf area to determine an area and/or volume available for additional products. Step 1010 may further include extrapolation of the number of additional products based on the stored dimensions of each product and determined available area and/or volume.

Method 1000 may include step 1015 of receiving second signals from a second subset of detection elements (e.g., detection elements 851A and 851B of FIG. 8B) from among the plurality of detection elements, the second signals being indicative of no products being placed on at least one area of the store shelf associated with the second subset of detection elements. Using this information, method 1000 may include step 1020 of using the second signals to determine at least one empty space on the store shelf. For example, any of the pattern matching techniques described above may be used to determine that the second signals include default values or other values indicative of a lack of product in certain areas associated with a retail store shelf. A default value may be include, for example, a pressure signal associated with an un-loaded pressure sensor or pressure sensitive mat, indicating that no product is located in a certain region of a shelf. In another example, a default value may include signals from light detectors corresponding to ambient light, indicating that no product is located in a certain region of a shelf.

Method 1000 may include step 1025 of determining, based on the at least one pattern associated with a detected product and the at least one empty space, at least one aspect of planogram compliance. As explained above with respect to FIGS. 8A and 8B, the aspect of planogram compliance may include the presence or absence of particular products (or brands), locations of products on the shelves, quantities of products within particular areas (e.g., identifying stacked or clustered products), facing directions associated with the products (e.g., whether a product is outward facing, inward facing, askew, or the like), or the like. A planogram compliance determination may be made, for example, by determining a number of empty spaces on a shelf and determining a location of the empty spaces on a shelf. The planogram determination may also include determining weight signal magnitudes associated with detected products at the various detected non-empty locations. This information may be used by the one or more processors in determining whether a product facing specification has been satisfied (e.g., whether a front edge of a shelf has a suitable number of products or suitable density of products), whether a specified stacking density has been achieved (e.g., by determining a pattern of detected products and weight signals of the detected products to determine how many products are stacked at each location), whether a product density specification has been achieved (e.g., by determining a ratio of empty locations to product-present locations), whether products of a selected product type are located in a selected area of the shelf, whether all products located in a selected area of the shelf are of a selected product type, whether a selected number of products (or a selected number of products of a selected product type) are located in a selected area of the shelf, whether products located in a selected area of a shelf are positioned in a selected orientation, or whether any other aspect of one or more planograms has been achieved.

For example, the at least one aspect may include product homogeneity, and step 1025 may further include counting occurrences where a product of the second type is placed on an area of the store shelf associated with the first type of product. For example, by accessing a memory including base patterns (or any other type of pattern associated with product types, such as product models), the at least one processor may detect different products and product types. A product of a first type may be recognized based on a first pattern, and product of a second type may be recognized based on a second, different pattern (optionally also based on weight signal information to aid in differentiating between products). Such information may be used, for example, to monitor whether a certain region of a shelf includes an appropriate or intended product or product type. Such information may also be useful in determining whether products or product types have been mixed (e.g., product homogeneity). Regarding planogram compliance, detection of different products and their relative locations on a shelf may aid in determining whether a product homogeneity value, ratio, etc. has been achieved. For example, the at least one processor may count occurrences where a product of a second type is placed on an area of the store shelf associated with a product of a first type.

Additionally or alternatively, the at least one aspect of planogram compliance may include a restocking rate, and step 1025 may further include determining the restocking rate based on a sensed rate at which products are added to the at least one area of the store shelf associated with the second subset of detection elements. Restocking rate may be determined, for example, by monitoring a rate at which detection element signals change as products are added to a shelf (e.g., when areas of a pressure sensitive pad change from a default value to a product-present value).

Additionally or alternatively, the at least one aspect of planogram compliance may include product facing, and step 1025 may further include determining the product facing based on a number of products determined to be placed on a selected area of the store shelf at a front of the store shelf. Such product facing may be determined by determining a number of products along a certain length of a front edge of a store shelf and determining whether the number of products complies with, for example, a specified density of products, a specified number of products, and so forth.

Step 1025 may further include transmitting an indicator of the at least one aspect of planogram compliance to a remote server. For example, as explained above with respect to FIGS. 8A and 8B, the indicator may comprise a data packet, a data file, or any other data structure indicating any variations from a planogram, e.g., with respect to product (or brand) placement, product facing direction, or the like. The remote server may include one or more computers associated with a retail store (e.g., so planogram compliance may be determined on a local basis within a particular store), one or more computers associated with a retail store evaluation body (e.g., so planogram compliance may be determined across a plurality of retail stores), one or more computers associated with a product manufacturer, one or more computers associated with a supplier (such as supplier 115), one or more computers associated with a market research entity (such as market research entity 110), etc.

Method 1000 may further include additional steps. For example, method 1000 may include identifying a change in at least one characteristic associated with one or more of the first signals (e.g., signals from a first group or type of detection elements), and in response to the identified change, triggering an acquisition of at least one image of the store shelf. The acquisition may be implemented by activating one or more of capturing devices 125 of FIGS. 4A-4C, as explained above. For example, the change in at least one characteristic associated with one or more of the first signals may be indicative of removal of at least one product from a location associated with the at least one area of the store shelf associated with the first subset of detection elements. Accordingly, method 1000 may include triggering the acquisition to determine whether restocking, reorganizing, or other intervention is required, e.g., to improve planogram compliance. Thus, method 1000 may include identifying a change in at least one characteristic associated with one or more of the first signals; and in response to the identified change, trigger a product-related task for an employee of the retail store.

Additionally or alternatively, method 1000 may be combined with method 1050 of FIG. 10B, described below, such that step 1055 is performed any time after step 1005.

FIG. 10B is a flow chart, illustrating an exemplary method 1050 for triggering image capture of a store shelf, in accordance with the presently disclosed subject matter. It is contemplated that method 1050 may be used in conjunction with any of the detection element arrays discussed above with reference to, for example, FIGS. 8A, 8B and 9. The order and arrangement of steps in method 1050 is provided for purposes of illustration. As will be appreciated from this disclosure, modifications may be made to process 1050, for example, adding, combining, removing, and/or rearranging one or more steps of process 1050.

Method 1050 may include a step 1055 of determining a change in at least one characteristic associated with one or more first signals. For example, the first signals may have been captured as part of method 1000 of FIG. 10A, described above. For example, the first signals may include pressure readings when the plurality of detection elements includes pressure sensors, contact information when the plurality of detection elements includes contact sensors, light readings when the plurality of detection elements includes light detectors (for example, from light detectors configured to be placed adjacent to (or located on) a surface of a store shelf configured to hold products, as described above), and so forth.

Method 1050 may include step 1060 of using the first signals to identify at least one pattern associated with a product type of the plurality of products. For example, any of the pattern matching techniques described above with respect to FIGS. 8A, 8B, and step 1010 may be used for identification.

Method 1050 may include step 1065 of determining a type of event associated with the change. For example, a type of event may include a product removal, a product placement, movement of a product, or the like.

Method 1050 may include step 1070 of triggering an acquisition of at least one image of the store shelf when the change is associated with a first event type. For example, a first event type may include removal of a product, moving of a product, or the like, such that the first event type may trigger a product-related task for an employee of the retail store depending on analysis of the at least one image. The acquisition may be implemented by activating one or more of capturing devices 125 of FIGS. 4A-4C, as explained above. In some examples, the triggered acquisition may include an activation of at least one projector (such as projector 632). In some examples, the triggered acquisition may include acquisition of color images, depth images, stereo images, active stereo images, time of flight images, LIDAR images, RADAR images, and so forth.

Method 1050 may include a step (not shown) of forgoing the acquisition of at least one image of the store shelf when the change is associated with a second event type. For example, a second event type may include replacement of a removed product by a customer, stocking of a shelf by an employee, or the like. As another example, a second event type may include removal, placement, or movement of a product that is detected within a margin of error of the detection elements and/or detected within a threshold (e.g., removal of only one or two products; movement of a product by less than 5 cm, 20 cm, or the like; moving of a facing direction by less than 10 degrees; or the like), such that no image acquisition is required.

Figure 11A:
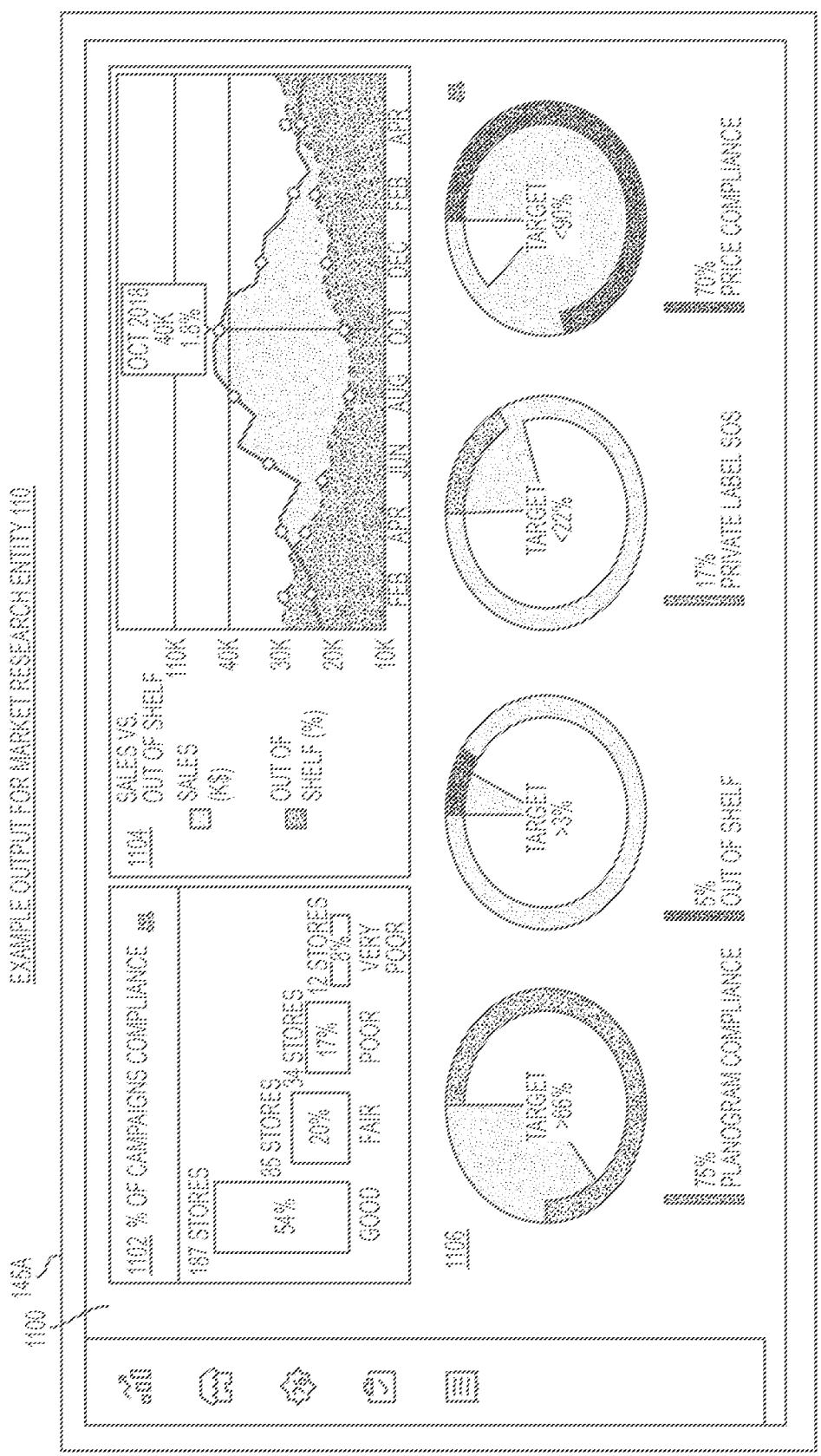
FIG. 11A is a schematic illustration of an example output for a market research entity associated with the retail store, consistent with the present disclosure.
Figure 11B:
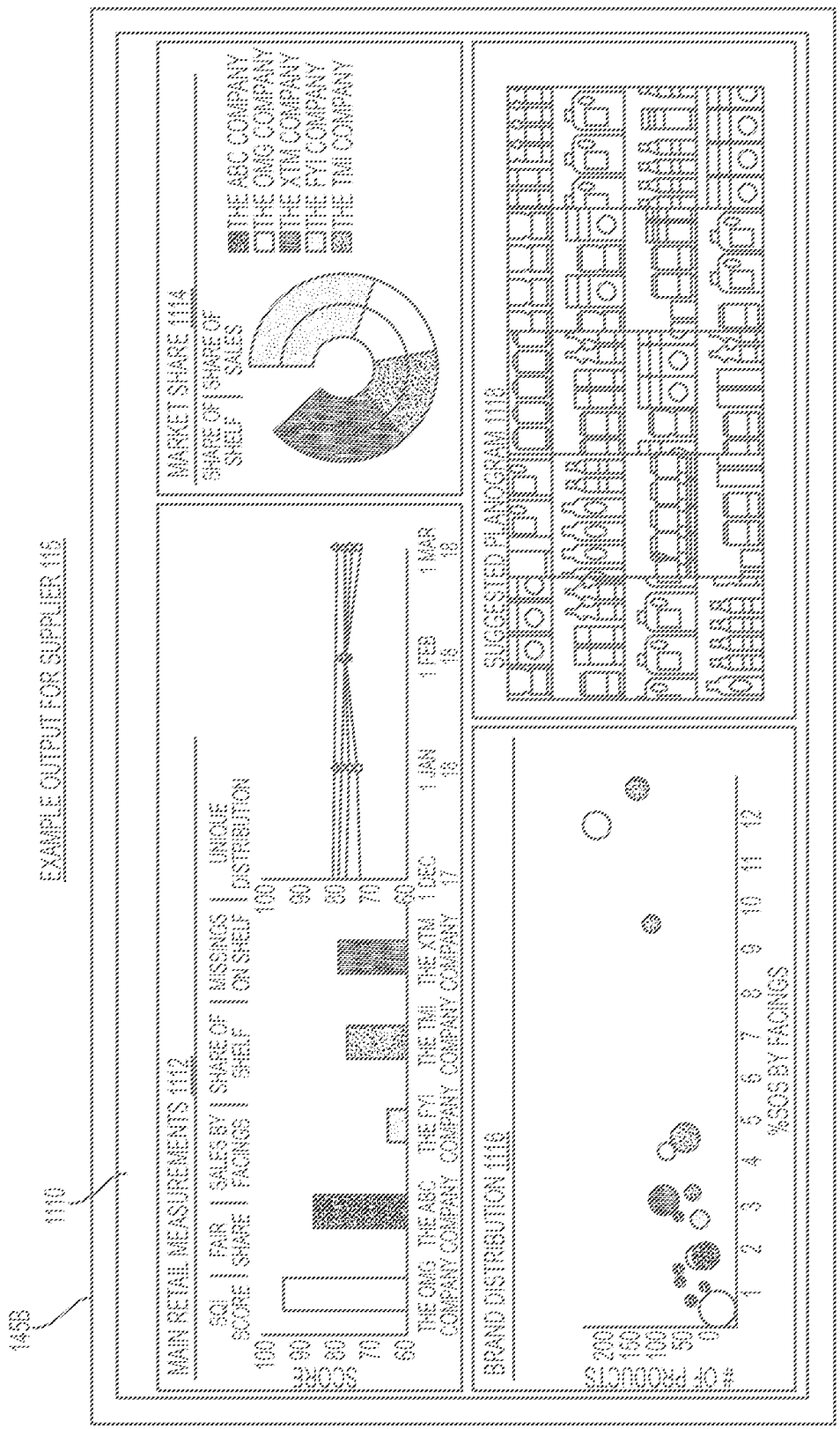
FIG. 11B is a schematic illustration of an example output for a supplier of the retail store, consistent with the present disclosure.
Figure 11C:
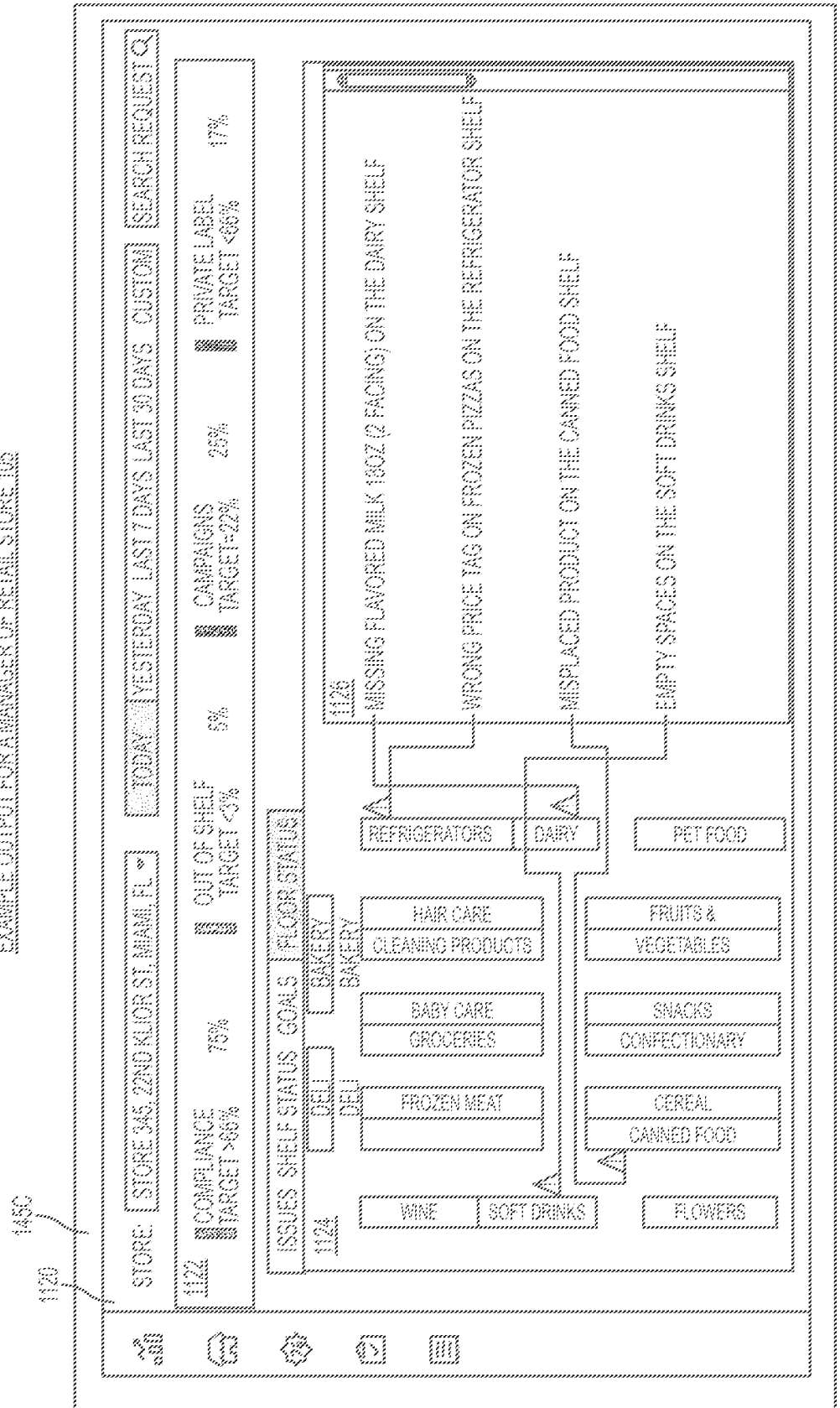
FIG. 11C is a schematic illustration of an example output for a manager of the retail store, consistent with the present disclosure.
Figure 11D:
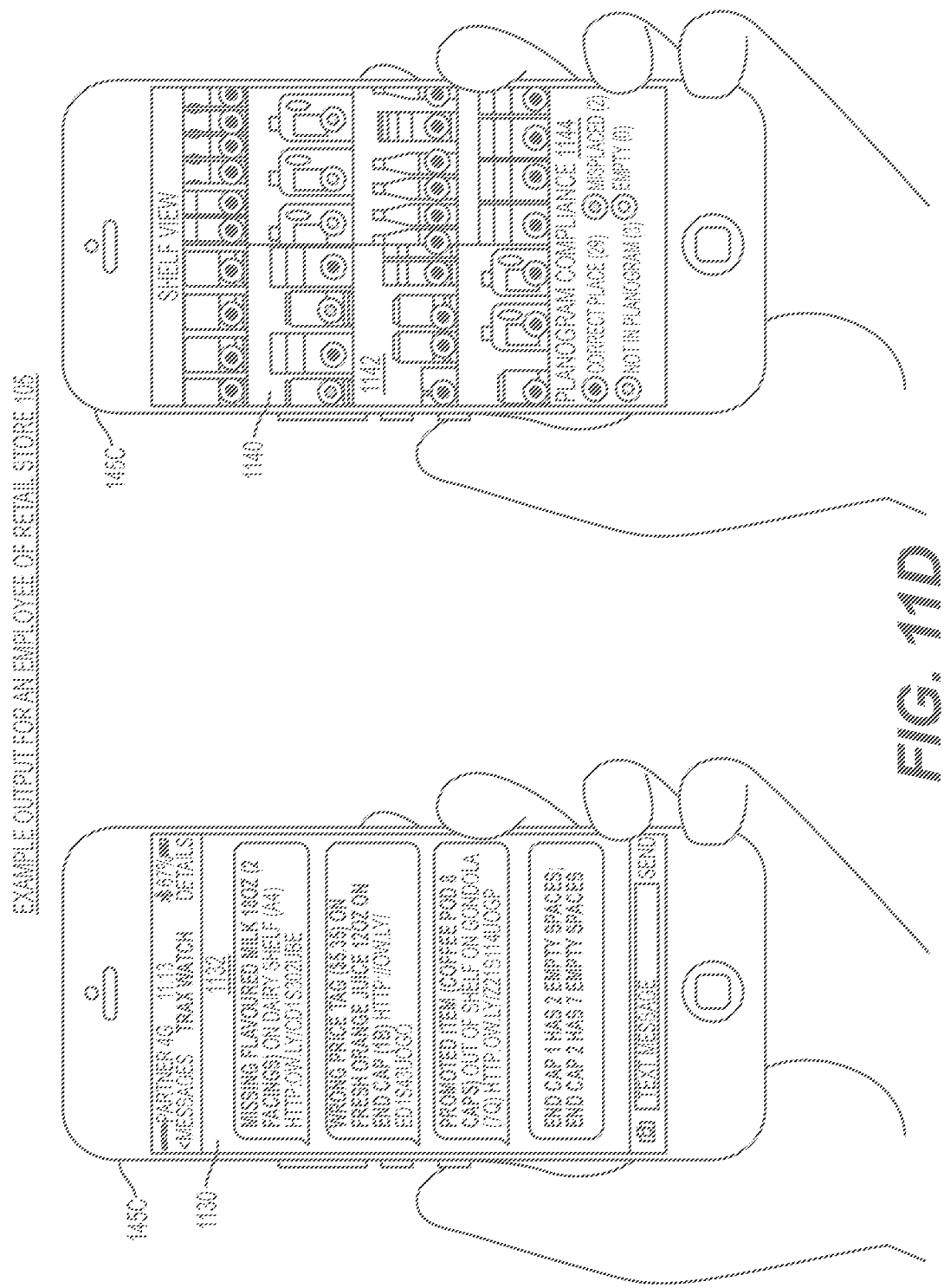
FIG. 11D is a schematic illustration of two examples outputs for an employee of the retail store, consistent with the present disclosure.
Figure 11E:
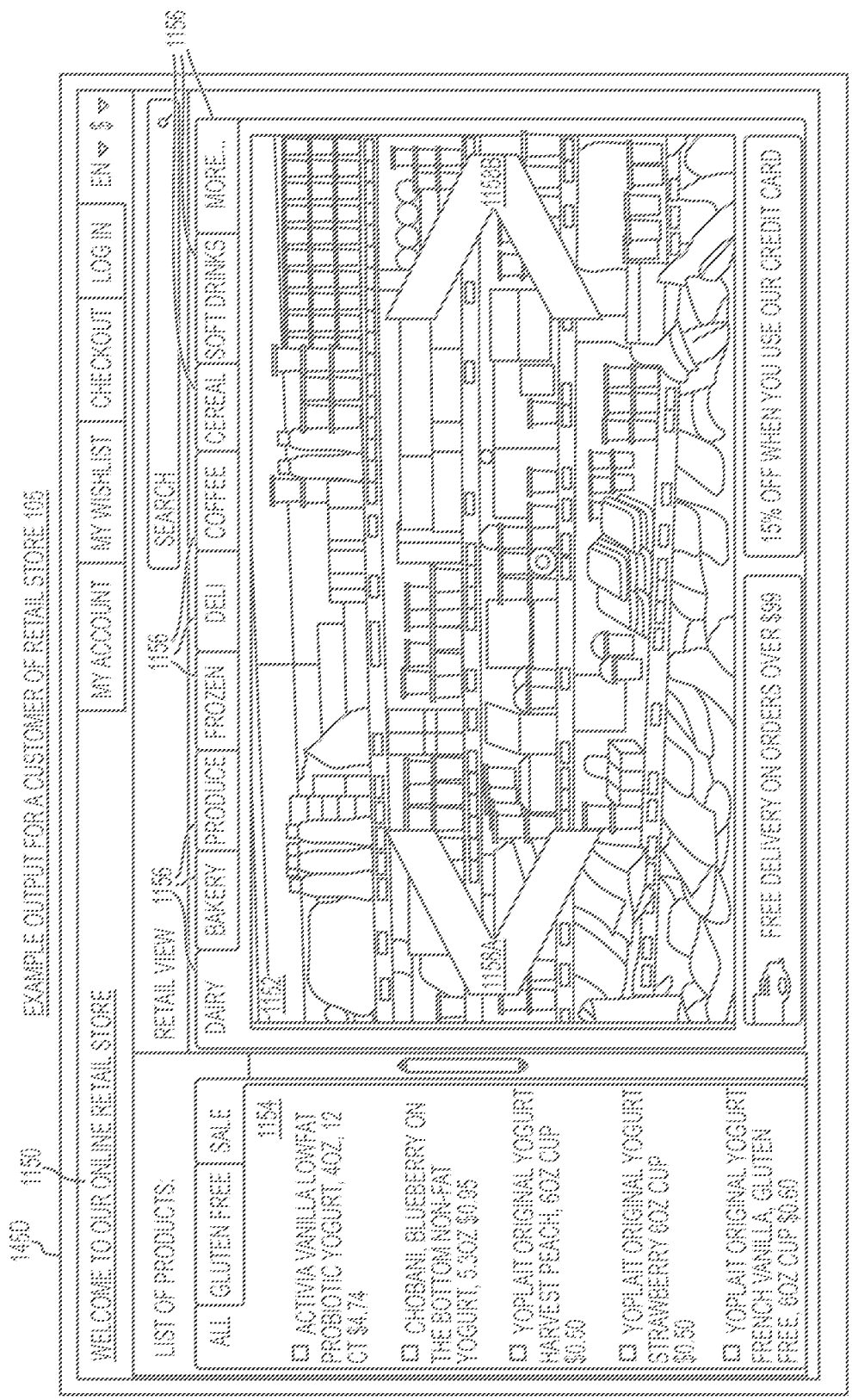
FIG. 11E is a schematic illustration of an example output for an online customer of the retail store, consistent with the present disclosure.

FIGS. 11A-11E illustrate example outputs based on data automatically derived from machine processing and analysis of images captured in retail store 105 according to disclosed embodiments. FIG. 11A illustrates an optional output for market research entity 110. FIG. 11B illustrates an optional output for supplier 115. FIGS. 11C and 11D illustrate optional outputs for employees of retail store 105. FIG. 11E illustrates optional outputs for user 120.

FIG. 11A illustrates an example graphical user interface (GUI) 500 for output device 145A, representative of a GUI that may be used by market research entity 110. Consistent with the present disclosure, market research entity 110 may assist supplier 115 and other stakeholders in identifying emerging trends, launching new products, and/or developing merchandising and distribution plans across a large number of retail stores 105. By doing so, market research entity 110 may assist supplier 115 in growing product presence and maximizing or increasing new product sales. As mentioned above, market research entity 110 may be separated from or part of supplier 115. To successfully launch a new product, supplier 115 may use information about what really happens in retail store 105. For example, supplier 115 may want to monitor how marketing plans are being executed and to learn what other competitors are doing relative to certain products or product types. Embodiments of the present disclosure may allow market research entity 110 and suppliers 115 to continuously monitor product-related activities at retail stores 105 (e.g., using system 100 to generate various metrics or information based on automated analysis of actual, timely images acquired from the retail stores). For example, in some embodiments, market research entity 110 may track how quickly or at what rate new products are introduced to retail store shelves, identify new products introduced by various entities, assess a supplier's brand presence across different retail stores 105, among many other potential metrics.

In some embodiments, server 135 may provide market research entity 110 with information including shelf organization, analysis of skew productivity trends, and various reports aggregating information on products appearing across large numbers of retail stores 105. For example, as shown in FIG. 11A, GUI 1100 may include a first display area 1102 for showing a percentage of promotion campaign compliance in different retail stores 105. GUI 1100 may also include a second display area 1104 showing a graph illustrating sales of a certain product relative to the percentage of out of shelf. GUI 1100 may also include a third display area 1106 showing actual measurements of different factors relative to target goals (e.g., planogram compliance, restocking rate, price compliance, and other metrics). The provided information may enable market research entity 110 to give supplier 115 informed shelving recommendations and fine-tune promotional strategies according to in-store marketing trends, to provide store managers with a comparison of store performances in comparison to a group of retail stores 105 or industry wide performances, and so forth.

FIG. 11B illustrates an example GUI 1110 for output device 145B used by supplier 115. Consistent with the present disclosure, server 135 may use data derived from images captured in a plurality of retail stores 105 to recommend a planogram, which often determines sales success of different products. Using various analytics and planogram productivity measures, server 135 may help supplier 115 to determine an effective planogram with assurances that most if not all retail stores 105 can execute the plan. For example, the determined planogram may increase the probability that inventory is available for each retail store 105 and may be designed to decrease costs or to keep costs within a budget (such as inventory costs, restocking costs, shelf space costs, and so forth). Server 135 may also provide pricing recommendations based on the goals of supplier 115 and other factors. In other words, server 135 may help supplier 115 understand how much room to reserve for different products and how to make them available for favorable sales and profit impact (for example, by choosing the size of the shelf dedicated to a selected product, the location of the shelf, the height of the shelf, the neighboring products, and so forth). In addition, server 135 may monitor near real-time data from retail stores 105 to determine or confirm that retail stores 105 are compliant with the determined planogram of supplier 115. As used herein, the term "near real-time data," in the context of this disclosure, refers to data acquired or generated, etc., based on sensor readings and other inputs (such as data from image sensors, audio sensors, pressure sensors, checkout stations, etc.) from retail store 105 received by system 100 within a predefined period of time (such as time periods having durations of less than a second, less than a minute, less than an hour, less than a day, less than a week, and so forth).

In some embodiments, server 135 may generate reports that summarize performance of the current assortment and the planogram compliance. These reports may advise supplier 115 of the category and the item performance based on individual SKU, sub segments of the category, vendor, and region. In addition, server 135 may provide suggestions or information upon which decisions may be made regarding how or when to remove markdowns and when to replace underperforming products. For example, as shown in FIG. 11B, GUI 1110 may include a first display area 1112 for showing different scores of supplier 115 relative to scores associated with its competitors. GUI 1110 may also include a second display area 1114 showing the market share of each competitor. GUI 1110 may also include a third display area 1116 showing retail measurements and distribution of brands. GUI 1110 may also include a fourth display area 1118 showing a suggested planogram. The provided information may help supplier 115 to select preferred planograms based on projected or observed profitability, etc., and to ensure that retail stores 105 are following the determined planogram.

FIGS. 11C and 11D illustrate example GUIs for output devices 145C, which may be used by employees of retail store 105. FIG. 11C depicts a GUI 1120 for a manager of retail store 105 designed for a desktop computer, and FIG. 11D depicts GUI 1130 and 1140 for store staff designed for a handheld device. In-store execution is one of the challenges retail stores 105 have in creating a positive customer experience. Typical in-store execution may involve dealing with ongoing service events, such as a cleaning event, a restocking event, a rearrangement event, and more. In some embodiments, system 100 may improve in-store execution by providing adequate visibility to ensure that the right products are located at preferred locations on the shelf. For example, using near real-time data (e.g., captured images of store shelves) server 135 may generate customized online reports. Store managers and regional managers, as well as other stakeholders, may access custom dashboards and online reports to see how in-store conditions (such as, planogram compliance, promotion compliance, price compliance, etc.) are affecting sales. This way, system 100 may enable managers of retail stores 105 to stay on top of burning issues across the floor and assign employees to address issues that may negatively impact the customer experience.

In some embodiments, server 135 may cause real-time automated alerts when products are out of shelf (or near out of shelf), when pricing is inaccurate, when intended promotions are absent, and/or when there are issues with planogram compliance, among others. In the example shown in FIG. 11C, GUI 1120 may include a first display area 1122 for showing the average scores (for certain metrics) of a specific retail store 105 over a selected period of time. GUI 1120 may also include a second display area 1124 for showing a map of the specific retail store 105 with real-time indications of selected in-store execution events that require attention, and a third display area 1126 for showing a list of the selected in-store execution events that require attention. In another example, shown in FIG. 11D, GUI 1130 may include a first display area 1132 for showing a list of notifications or text messages indicating selected in-store execution events that require attention. The notifications or text messages may include a link to an image (or the image itself) of the specific aisle with the in-store execution event. In another example, shown in FIG. 11D, GUI 1140 may include a first display area 1142 for showing a display of a video stream captured by output device 145C (e.g., a real-time display or a near real-time display) with augmented markings indicting a status of planogram compliance for each product (e.g., correct place, misplaced, not in planogram, empty, and so forth). GUI 1140 may also include a second display area 1144 for showing a summary of the planogram compliance for all the products identified in the video stream captured by output device 145C. Consistent with the present disclosure, server 135 may generate within minutes actionable tasks to improve store execution. These tasks may help employees of retail store 105 to quickly address situations that can negatively impact revenue and customer experience in the retail store 105.

FIG. 11E illustrates an example GUI 1150 for output device 145D used by an online customer of retail store 105. Traditional online shopping systems present online customers with a list of products. Products selected for purchase may be placed into a virtual shopping cart until the customers complete their virtual shopping trip. Virtual shopping carts may be examined at any time, and their contents can be edited or deleted. However, common problems of traditional online shopping systems arise when the list of products on the website does not correspond with the actual products on the shelf. For example, an online customer may order a favorite cookie brand without knowing that the cookie brand is out-of-stock. Consistent with some embodiments, system 100 may use image data acquired by capturing devices 125 to provide the online customer with a near real-time display of the retail store and a list of the actual products on the shelf based on near real-time data. In one embodiment, server 135 may select images without occlusions in the field of view (e.g., without other customers, carts, etc.) for the near real-time display. In one embodiment, server 135 may blur or erase depictions of customers and other people from the near real-time display. As used herein, the term "near real-time display," in the context of this disclosure, refers to image data captured in retail store 105 that was obtained by system 100 within a predefined period of time (such as less than a second, less than a minute, less than about 30 minutes, less than an hour, less than 3 hours, or less than 12 hours) from the time the image data was captured.

Consistent with the present disclosure, the near real-time display of retail store 105 may be presented to the online customer in a manner enabling easy virtual navigation in retail store 105. For example, as shown in FIG. 11E, GUI 1150 may include a first display area 1152 for showing the near real-time display and a second display area 1154 for showing a product list including products identified in the near real-time display. In some embodiments, first display area 1152 may include different GUI features (e.g., tabs 1156) associated with different locations or departments of retail store 105. By selecting each of the GUI features, the online customer can virtually jump to different locations or departments in retail store 105. For example, upon selecting the "bakery" tab, GUI 1150 may present a near real-time display of the bakery of retail store 105. In addition, first display area 1152 may include one or more navigational features (e.g., arrows 1158A and 1158B) for enabling the online customer to virtually move within a selected department and/or virtually walk through retail store 105. Server 135 may be configured to update the near real-time display and the product list upon determining that the online customer wants to virtually move within retail store 105. For example, after identifying a selection of arrow 1158B, server 135 may present a different section of the dairy department and may update the product list accordingly. In another example, server 135 may update the near-real time display and the product list in response to new captured images and new information received from retail store 105. Using GUI 1150, the online customer may have the closest shopping experience without actually being in retail store 105. For example, an online customer can visit the vegetable department and decide not to buy tomatoes after seeing that they are not ripe enough.

In some embodiments, a method, such as methods 700, 720, 1000, 1050, 1200, 1300, 1400, 1500 and 1600 may comprise one or more steps. In some examples, these methods, as well as all individual steps therein, may be performed by various aspects of capturing device 125, server 135, a cloud platform, a computational node, and so forth. For example, a system comprising of at least one processor, such as processing device 202 and/or processing device 302, may perform any of these methods as well as all individual steps therein, for example by processing device 202 and/or processing device 302 executing software instructions stored within memory device 226 and/or memory device 314. In some examples, these methods, as well as all individual steps therein, may be performed by a dedicated hardware. In some examples, computer readable medium, such as a non-transitory computer readable medium, may store data and/or computer implementable instructions for carrying out any of these methods as well as all individual steps therein. Some non-limiting examples of possible execution manners of a method may include continuous execution (for example, returning to the beginning of the method once the method normal execution ends), periodically execution, executing the method at selected times, execution upon the detection of a trigger (some non-limiting examples of such trigger may include a trigger from a user, a trigger from another process, a trigger from an external device, etc.), and so forth.

In some embodiments, machine learning algorithms (also referred to as machine learning models in the present disclosure) may be trained using training examples, for example by Step 1010, Step 1204, Step 1208, Step 1210, Step 1304, Step 1306, Step 1404, Step 1406, Step 1506 and Step 1606, and in the cases described herein. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recurrent neural network algorithms, linear machine learning models, non-linear machine learning models, ensemble algorithms, and so forth. For example, a trained machine learning algorithm may comprise an inference model, such as a predictive model, a classification model, a data regression model, a clustering model, a segmentation model, an artificial neural network (such as a deep neural network, a convolutional neural network, a recurrent neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters may be set manually by a person or automatically by an process external to the machine learning algorithm (such as a hyper parameter search algorithm), and the parameters of the machine learning algorithm may be set by the machine learning algorithm based on the training examples. In some implementations, the hyper-parameters may be set based on the training examples and the validation examples, and the parameters may be set based on the training examples and the selected hyper-parameters. For example, given the hyper-parameters, the parameters may be conditionally independent of the validation examples.

In some embodiments, trained machine learning algorithms (also referred to as machine learning models and trained machine learning models in the present disclosure) may be used to analyze inputs and generate outputs, for example by Step 1010, Step 1204, Step 1208, Step 1210, Step 1304, Step 1306, Step 1404, Step 1406, Step 1506 and Step 1606, and in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value corresponding to the sample. In yet another example, a trained machine learning algorithm may include a clustering model, the input may include a sample, and the inferred output may include an assignment of the sample to at least one cluster. In an additional example, a trained machine learning algorithm may include a classification algorithm, the input may include an image, and the inferred output may include a classification of an item depicted in the image. In yet another example, a trained machine learning algorithm may include a regression model, the input may include an image, and the inferred output may include an inferred value corresponding to an item depicted in the image (such as an estimated property of the item, such as size, volume, age of a person depicted in the image, cost of a product depicted in the image, and so forth). In an additional example, a trained machine learning algorithm may include an image segmentation model, the input may include an image, and the inferred output may include a segmentation of the image. In yet another example, a trained machine learning algorithm may include an object detector, the input may include an image, and the inferred output may include one or more detected objects in the image and/or one or more locations of objects within the image. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

In some embodiments, artificial neural networks may be configured to analyze inputs and generate corresponding outputs, for example by Step 1010, Step 1210, Step 1306, Step 1406, Step 1506 and Step 1606, and in the cases described below. Some non-limiting examples of such artificial neural networks may comprise shallow artificial neural networks, deep artificial neural networks, feedback artificial neural networks, feed forward artificial neural networks, autoencoder artificial neural networks, probabilistic artificial neural networks, time delay artificial neural networks, convolutional artificial neural networks, recurrent artificial neural networks, long short term memory artificial neural networks, and so forth. In some examples, an artificial neural network may be configured manually. For example, a structure of the artificial neural network may be selected manually, a type of an artificial neuron of the artificial neural network may be selected manually, a parameter of the artificial neural network (such as a parameter of an artificial neuron of the artificial neural network) may be selected manually, and so forth. In some examples, an artificial neural network may be configured using a machine learning algorithm. For example, a user may select hyper-parameters for the an artificial neural network and/or the machine learning algorithm, and the machine learning algorithm may use the hyper-parameters and training examples to determine the parameters of the artificial neural network, for example using back propagation, using gradient descent, using stochastic gradient descent, using mini-batch gradient descent, and so forth. In some examples, an artificial neural network may be created from two or more other artificial neural networks by combining the two or more other artificial neural networks into a single artificial neural network.

Some non-limiting examples of image data may include images, grayscale images, color images, 2D images, 3D images, videos, 2D videos, 3D videos, frames, footages, data derived from other image data, and so forth. In some embodiments, analyzing image data (for example by the methods, steps and modules described herein, such as Step 724, Step 1210, Step 1306, Step 1406, Step 1506 and Step 1606) may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing at least parts of the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some non-limiting examples of such image features may comprise information based on and/or related to: edges; corners; blobs; ridges; Scale Invariant Feature Transform (SIFT) features; temporal features; and so forth. In some examples, analyzing the image data may include calculating at least one convolution of at least a portion of the image data, and using the calculated at least one convolution to calculate at least one resulting value and/or to make determinations, identifications, recognitions, classifications, and so forth.

In some embodiments, analyzing image data (for example by the methods, steps and modules described herein, such as Step 724, Step 1210, Step 1306, Step 1406, Step 1506 and Step 1606) may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth. In some embodiments, analyzing image data (for example by the methods, steps and modules described herein, such as Step 724, Step 1210, Step 1306, Step 1406, Step 1506 and Step 1606) may comprise analyzing pixels, voxels, point cloud, range data, etc. included in the image data.

Some non-limiting examples of infrared data (also referred to as infrared input data in the present disclosure) may include any data captured using infrared sensors. Some non-limiting examples of infrared sensors may include at least one of active infrared sensors, passive infrared sensors, thermal infrared sensors, pyroelectric infrared sensors, thermoelectric infrared sensors, photoconductive infrared sensors, photovoltaic infrared sensors and thermographic cameras. For example, an infrared sensor may include a radiation-sensitive optoelectronic component with a spectral sensitivity in the infrared wavelength range (780 nm to 50 μm). In some examples, the infrared data may be or include an infrared image and/or an infrared video, and any technique for analyzing image data may be used to analyze the infrared image and/or the infrared video, including the image analysis techniques described above. In some examples, the infrared data may be or include a time series data of a plurality of data instances captured using infrared sensors and indexed in time order, and any technique for analyzing time series data may be used to analyze the infrared data. In some examples, the infrared data may be or include a single measured value, and the analysis of the infrared data may include basing a determination on the single measured value. In some embodiments, analyzing infrared data (for example by the methods, steps and modules described herein, such as Step 1204, Step 1208, Step 1404 and Step 1506) may comprise analyzing the infrared data to obtain a preprocessed infrared data, and subsequently analyzing the infrared data and/or the preprocessed infrared data to obtain the desired outcome. One of ordinary skill in the art will recognize that the followings are examples, and that the infrared data may be preprocessed using other kinds of preprocessing methods. In some examples, the infrared data may be preprocessed by transforming the infrared data using a transformation function to obtain a transformed infrared data, and the preprocessed infrared data may comprise the transformed infrared data. For example, the transformed infrared data may comprise one or more convolutions of the infrared data. For example, the transformation function may comprise at least one of low-pass filters, high-pass filters, band-pass filters, all-pass filters, and so forth. In some examples, the transformation function may comprise a nonlinear function. In some examples, the infrared data may be preprocessed by smoothing at least parts of the infrared data, for example using Gaussian convolution, using a median filter, and so forth. In some examples, the infrared data may be preprocessed to obtain a different representation of the infrared data. For example, the preprocessed infrared data may comprise: a representation of at least part of the infrared data in a lower dimension; a lossy representation of at least part of the infrared data; a lossless representation of at least part of the infrared data; a time ordered series of any of the above; any combination of the above; and so forth. In some examples, analyzing the infrared data may include calculating at least one convolution of at least a portion of the infrared data, and using the calculated at least one convolution to calculate at least one resulting value and/or to make determinations, identifications, recognitions, classifications, and so forth.

In some embodiments, analyzing infrared data (for example by the methods, steps and modules described herein, such as Step 1204, Step 1208, Step 1404 and Step 1506) may comprise analyzing the infrared data and/or the preprocessed infrared data using one or more rules, functions, procedures, artificial neural networks, object detection algorithms, motion detection algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

In some embodiments, infrared data may be captured using one or more infrared sensors (for example by the methods, steps and modules described herein, such as Step 1202, Step 1206, Step 1402 and 1502). Some non-limiting examples of such infrared sensors may include at least one of active infrared sensors, passive infrared sensors, thermal infrared sensors, pyroelectric infrared sensors, thermoelectric infrared sensors, photoconductive infrared sensors and photovoltaic infrared sensors. In some examples, at least one of the one or more infrared sensors may be positioned on one side of an aisle fixedly mounted thereon and directed such that they may capture infrared data of the middle of the aisle and/or of the opposing side of aisle. For example, the at least one of the one or more infrared sensors may be positioned on one side of aisle 400, for example in a similar fashion to capturing devices 125A, 125B, and 125C as illustrated in FIG. 4A. In some examples, at least one of the one or more infrared sensors may be positioned under a retail shelf and/or between two retail shelves. For example, the at least one of the one or more infrared sensors may be positioned under retail shelf 622E, for example in a similar fashion to housing 504I as illustrated in FIG. 6B. In another example, the at least one of the one or more infrared sensors may be positioned between retail shelf 622B and retail shelf 622E, for example in a similar fashion to housing 504I as illustrated in FIG. 6B. In yet another example, the at least one of the one or more infrared sensors may be included in housing 504I. In some examples, at least one of the one or more infrared sensors may be mounted to a surface of a shelving unit (such as retail shelving unit 620, a rack of shelves, a unit including multiple shelves mounted to a wall, etc.) that is perpendicular to the shelves (such as a surface of the back of a rack, a surface of the wall, etc.).

Some non-limiting examples of vibration data may include any data captured using vibration sensors. Some non-limiting examples of vibration sensors may include at least one of accelerometers, piezoelectric sensors, piezoresistive sensors, capacitive MEMS sensors, displacement sensors, velocity sensors, laser based vibration sensors, and so forth. In some examples, the vibration data may be or include a vibration image and/or a vibration video, and any technique for analyzing image data may be used to analyze the vibration image and/or the vibration video, including the image analysis techniques described above. In some examples, the vibration data may be or include a time series data of a plurality of data instances captured using vibration sensors and indexed in time order, and any technique for analyzing time series data may be used to analyze the vibration data. In some examples, the vibration data may be or include a single measured value, and the analysis of the infrared data may include basing a determination on the single measured value. In some embodiments, analyzing vibration data (for example by the methods, steps and modules described herein, such as Step 1304 and Step 1606) may comprise analyzing the vibration data to obtain a preprocessed vibration data, and subsequently analyzing the vibration data and/or the preprocessed vibration data to obtain the desired outcome. One of ordinary skill in the art will recognize that the followings are examples, and that the vibration data may be preprocessed using other kinds of preprocessing methods. In some examples, the vibration data may be preprocessed by transforming the vibration data using a transformation function to obtain a transformed vibration data, and the preprocessed vibration data may comprise the transformed vibration data. For example, the transformed vibration data may comprise one or more convolutions of the vibration data. For example, the transformation function may comprise at least one of low-pass filters, high-pass filters, band-pass filters, all-pass filters, and so forth. In some examples, the transformation function may comprise a nonlinear function. In some examples, the vibration data may be preprocessed by smoothing at least parts of the vibration data, for example using Gaussian convolution, using a median filter, and so forth. In some examples, the vibration data may be preprocessed to obtain a different representation of the vibration data. For example, the preprocessed vibration data may comprise: a representation of at least part of the vibration data in a lower dimension; a lossy representation of at least part of the vibration data; a lossless representation of at least part of the vibration data; a time ordered series of any of the above; any combination of the above; and so forth. In some examples, analyzing the vibration data may include calculating at least one convolution of at least a portion of the vibration data, and using the calculated at least one convolution to calculate at least one resulting value and/or to make determinations, identifications, recognitions, classifications, and so forth.

In some embodiments, analyzing vibration data (for example by the methods, steps and modules described herein, such as Step 1304 and Step 1606) may comprise analyzing the vibration data and/or the preprocessed vibration data using one or more rules, functions, procedures, artificial neural networks, object detection algorithms, motion detection algorithms, inference models, and so forth. Some non-limiting examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

In some embodiments, vibration data may be captured using one or more vibration sensors (for example by the methods, steps and modules described herein, such as Step 1302 and Step 1602). Some non-limiting examples of such vibration sensors may include at least one of an accelerometer, a piezoelectric sensor, a piezoresistive sensor, a capacitive MEMS sensor, a displacement sensor, a velocity sensor, a laser based vibration sensor, and so forth. In some examples, at least one of the one or more vibration sensors may be physically connected to at least one retail shelve, for example above the at least one retail shelve, below the at least one retail shelve, to the side of at least one retail shelve, to an internal part of the at least one retail shelve, and so forth. For example, the at least one of the one or more vibration sensors may be physically connected to retail shelf 622E, for example in a similar fashion to housing 504I as illustrated in FIG. 6B. In another example, at least one of the one or more vibration sensors may be physically connected to a shelving unit, for example to a part of the shelving unit that is not a shelf, for example to a surface of a shelving unit (such as retail shelving unit 620, a rack of shelves, a unit including multiple shelves mounted to a wall, etc.) that is perpendicular to the shelves (such as a surface of the back of the rack, a surface of the wall, etc.). In yet another example, at least one of the one or more vibration sensors may not be physically connected to a shelving unit or a retail shelf.

Image processing of images and videos captured from a retail environment may be a burdening task. Processing the images and videos in the retail environment may require placing expensive hardware in the retail environment. Further, image and video processing may consume significant amount of power, which may be challenging for battery powered systems. On the other hand, transmitting images and videos to a remove system (such as a server or a cloud platform) for processing may be challenging due to the large size of images and videos. Therefore, it is desired to reduce the number of images and videos processed, and to limit the parts of the images and videos that are transmitted or processed, to the images and videos, or the parts of the images and videos that include relevant information.

In some examples, systems, methods and computer-readable media for triggering image processing based on infrared data analysis are provided.

FIG. 12 provides a flowchart of an exemplary method 1200 for triggering image processing based on infrared data analysis, consistent with the present disclosure. In this example, method 1200 may comprise receiving first infrared input data captured using a first group of one or more infrared sensors (Step 1202); analyzing the first infrared input data to detect an engagement of a person with a retail shelf (Step 1204); receiving second infrared input data captured using a second group of one or more infrared sensors after the capturing of the first infrared input data (Step 1206); analyzing the second infrared input data to determine a completion of the engagement of the person with the retail shelf (Step 1208); in response to the determined completion of the engagement of the person with the retail shelf, analyzing at least one image of the retail shelf captured using at least one image sensor after the completion of the engagement of the person with the retail shelf (Step 1210); and using the analysis of the at least one image to determine a state of the retail shelf (Step 1212). In some examples, method 1200 may further comprise providing information based on the state of the retail shelf determined by Step 1212. For example, providing the information based on the state of the retail shelf may comprise at least one of storing the information in memory, transmitting the information to an external device, providing the information to a user (for example, visually, audibly, textually, etc.), and so forth. Additionally or alternatively to Step 1212, method 1200 may further comprise providing information based on the analysis of the at least one image by Step 1210. For example, providing the information based on the analysis of the at least one image by Step 1210 may comprise at least one of storing the information in memory, transmitting the information to an external device, providing the information to a user (for example, visually, audibly, textually, through a user interface, etc.), and so forth.

In some examples, Step 1202 may comprise receiving first infrared input data captured using a first group of one or more infrared sensors. For example, receiving the first infrared input data by Step 1202 may comprise at least one of reading the first infrared input data, receiving the first infrared input data from an external device (for example, using a digital communication device), capturing the first infrared input data using the first group of one or more infrared sensors, and so forth. In some examples, the first group of one or more infrared sensors may be a group of at least one of active infrared sensors, passive infrared sensors, thermal infrared sensors, pyroelectric infrared sensors, thermoelectric infrared sensors, photoconductive infrared sensors and photovoltaic infrared sensors. In one example, the first group of one or more infrared sensors may be a group of one or more passive infrared sensors. In some examples, the first group of one or more infrared sensors may be a group of one or more infrared sensors positioned below a second retail shelf. In one example, the second retail shelf may be positioned above the retail shelf. For example, the first group of one or more infrared sensors may be a group of one or more infrared sensors mounted to the second retail shelf, mounted to a surface (for example, of a wall, of a rack, etc.) connecting the second retail shelf and the retail shelf, and so forth.

In some examples, Step 1204 may comprise analyzing the first infrared input data received by Step 1202 to detect an engagement of a person with a retail shelf. In one example, a machine learning model may be trained using training examples to detect engagements of people with retail shelves from infrared data. An example of such training example may include sample infrared data, together with a label indicating whether the sample infrared data corresponds to an engagement of a person with a retail shelf. In one example, Step 1204 may use the trained machine learning model to analyze the first infrared input data received by Step 1202 to detect the engagement of the person with the retail shelf. In another example, Step 1204 may compare the first infrared input data or a preprocessed version of the first infrared input data (such as a function of the first infrared input data) with a threshold, and may use a result of the comparison to detect the engagement of the person with the retail shelf. For example, the threshold may differentiate between an ambient temperature of an environment of the retail shelf and a typical human body temperature. In an additional example, the threshold may be selected based on a statistical measure of infrared data captured using the first group of one or more infrared sensors of Step 1202 over time. In some examples, Step 1204 may calculate a convolution of at least part of the first infrared input data received by Step 1202. Further, in response to a first value of the calculated convolution of the at least part of the first infrared input data, Step 1204 may detect the engagement of a person with a retail shelf, and in response to a second value of the calculated convolution of the at least part of the first infrared input data, Step 1204 may forgo detecting the engagement of a person with a retail shelf.

In some examples, Step 1206 may comprise receiving second infrared input data captured using a second group of one or more infrared sensors after the capturing of the second infrared input data by Step 1202. For example, receiving the second infrared input data by Step 1202 may comprise at least one of reading the second infrared input data, receiving the second infrared input data from an external device (for example, using a digital communication device), capturing the second infrared input data using the second group of one or more infrared sensors, and so forth. In some examples, the second group of one or more infrared sensors may be a group of at least one of active infrared sensors, passive infrared sensors, thermal infrared sensors, pyroelectric infrared sensors, thermoelectric infrared sensors, photoconductive infrared sensors and photovoltaic infrared sensors. In one example, the second group of one or more infrared sensors may be a group of one or more passive infrared sensors. In one example, the first group of one or more infrared sensors may be identical to the second group of one or more infrared sensors. In another example, the first group of one or more infrared sensors may differ from the second group of one or more infrared sensors. In yet another example, the first group of one or more infrared sensors and the second group of one or more infrared sensors may include at least one common infrared sensor. In an additional example, the first group of one or more infrared sensors and the second group of one or more infrared sensors may include no common infrared sensor. In some examples, the second group of one or more infrared sensors may be a group of one or more infrared sensors positioned below a second retail shelf. In one example, the second retail shelf may be positioned above the retail shelf. For example, the second group of one or more infrared sensors may be a group of one or more infrared sensors mounted to the second retail shelf, mounted to a surface (for example, of a wall, of a rack, etc.) connecting the second retail shelf and the retail shelf, and so forth.

In some examples, Step 1208 may comprise analyzing the second infrared input data received by Step 1206 to determine a completion of the engagement of the person with the retail shelf detected by Step 1204. In one example, a machine learning model may be trained using training examples to determine completions of engagements of people with retail shelves from infrared data. An example of such training example may include sample infrared data, together with a label indicating whether the sample infrared data corresponds to a completion of an engagement of a person with a retail shelf. In one example, Step 1208 may use the trained machine learning model to analyze the second infrared input data received by Step 1206 to determine the completion of the engagement of the person with the retail shelf. In another example, Step 1204 may compare the second infrared input data or a preprocessed version of the second infrared input data (such as a function of the second infrared input data) with a threshold, and may use a result of the comparison to determine the completion of the engagement of the person with the retail shelf. For example, the threshold may differentiate between an ambient temperature of an environment of the retail shelf and a typical human body temperature. In another example, the threshold may be selected based on an analysis of the first infrared input data received by Step 1202, for example, based on a value of a statistical measure of the first infrared input data. In an additional example, the threshold may be selected based on a statistical measure of infrared data captured using the second group of one or more infrared sensors of Step 1206 over time. In yet another example, the threshold of Step 1208 may be identical or different from the threshold of Step 1204. In some examples, the determination of the completion of the engagement of the person with the retail shelf by Step 1208 may be a determination that the person cleared an environment of the retail shelf. In some examples, Step 1208 may calculate a convolution of at least part of the second infrared input data received by Step 1206. Further, in response to a first value of the calculated convolution of the at least part of the second infrared input data, Step 1208 may determine a completion of the engagement of the person with the retail shelf detected by Step 1204, and in response to a second value of the calculated convolution of the at least part of the second infrared input data, Step 1208 may determine that the engagement of the person with the retail shelf detected by Step 1204 is not completed.

In some examples, Step 1210 may comprise, for example in response to the determined completion of the engagement of the person with the retail shelf by Step 1208, analyzing at least one image of the retail shelf captured using at least one image sensor after the completion of the engagement of the person with the retail shelf. The analysis of the at least one image of the retail shelf may include any image analysis described herein. For example, Step 1210 may analyze the at least one image of the retail shelf using at least one of image processing instructions 232, Step 724, Step 726 and Step 728. In another example, Step 1210 may analyze the at least one image of the retail shelf using any of the techniques for analyzing image data described above. In yet another example, Step 1210 may analyze the at least one image of the retail shelf using at least one of an image classification algorithm, an object recognition algorithm, a product recognition algorithm, a label recognition algorithm, a logo recognition algorithm and a semantic segmentation algorithm. In some examples, a machine learning model may be trained using training examples to analyze images. An example of such training example may include a sample image, together with a label indicating a desired outcome corresponding to the analysis of the sample image. In one example, Step 1210 may use the trained machine learning model to analyze the at least one image of the retail shelf captured using at least one image sensor after the completion of the engagement of the person with the retail shelf to obtain an outcome of the analysis. In some example, Step 1210 may use an artificial neural network to analyze the at least one image of the retail shelf captured using at least one image sensor after the completion of the engagement of the person with the retail shelf to obtain an outcome of the analysis, for example as described above. In some examples, Step 1210 may base the analysis of the at least one image of the retail shelf captured using at least one image sensor after the completion of the engagement of the person with the retail shelf on a calculated convolution of at least part of the at least one image. In some examples, for example in response to the determined completion of the engagement of the person with the retail shelf by Step 1208, Step 1210 may further comprise triggering the capturing of the at least one image of the retail shelf using the at least one image sensor. In some examples, the at least one image sensor of Step 1210 may be at least one image sensor mounted to a second retail shelf. For example, the second retail shelf may be positioned on an opposite side of an aisle from the retail shelf. In another example, the second retail shelf may be positioned above the retail shelf. In yet another example, the second retail shelf may be positioned above the retail shelf and the at least one image sensor may be positioned below the second retail shelf. In some examples, the at least one image sensor of Step 1210 may be at least one image sensor mounted to an image capturing robot. In some examples, the at least one image sensor of Step 1210 may be at least one image sensor mounted to a ceiling of a retail store. In some examples, the at least one image sensor of Step 1210 may be part of a personal mobile device.

In some examples, Step 1212 may comprise using the analysis of the at least one image to determine a state of the retail shelf. In some example, Step 1210 may analyze the at least one image to obtain an outcome of the analysis. In one example, in response to a first outcome of the analysis of Step 1210, Step 1212 may determine a first state of the retail shelf, and in response to a second outcome of the analysis of Step 1210, Step 1212 may determine a second state of the retail shelf, the second state of the retail shelf may differ from the first state of the retail shelf. In some examples, Step 1210 may recognize products and/or labels associated with the retail shelf, and Step 1212 may determine the state of the retail shelf based on the products and/or labels associated with the retail shelf. In some examples, a machine learning model may be trained using training examples to determine state of retail shelves from images. An example of such training example may include a sample image of a sample retail shelf, together with a label indicating a state of the sample retail shelf. In one example, Steps 1210 and 1212 may use the trained machine learning model to analyze the at least one image of the retail shelf captured using at least one image sensor after the completion of the engagement of the person with the retail shelf to determine the state of the retail shelf. In some example, Steps 1210 and 1212 may use an artificial neural network to analyze the at least one image of the retail shelf captured using at least one image sensor after the completion of the engagement of the person with the retail shelf to determine the state of the retail shelf. In some example, Steps 1210 and 1212 may use an image classification model to analyze the at least one image of the retail shelf captured using at least one image sensor after the completion of the engagement of the person with the retail shelf to determine the state of the retail shelf, for example where each class of the classification model correspond to a different state of the retail shelf. In some example, Steps 1210 and 1212 may use a regression model to analyze the at least one image of the retail shelf captured using at least one image sensor after the completion of the engagement of the person with the retail shelf to determine at least one aspect the state of the retail shelf (such as number of product on the retail shelf, score corresponding to the retail shelf, size of an empty space on the retail shelf, and so forth). In some examples, the state of the retail shelf determined by Step 1212 may include an inventory data associated with products on the retail shelf after the engagement of the person with the retail shelf. In some examples, the state of the retail shelf determined by Step 1212 may include facings data associated with products on the retail shelf after the engagement of the person with the retail shelf. In some examples, the state of the retail shelf determined by Step 1212 may include planogram compliance status associated with the retail shelf after the engagement of the person with the retail shelf. In some examples, the state of the retail shelf determined by Step 1212 may include empty space indication associated with the retail shelf after the engagement of the person with the retail shelf.

In some examples, Step 1212 may comprise using the analysis of the at least one image by Step 1210 and an analysis of one or more images of the retail shelf captured using the at least one image sensor before the engagement of the person with the retail shelf to determine a change associated with the retail shelf during the engagement of the person with the retail shelf. Some non-limiting examples of such change may include a product placed on the retail shelf, a product moved from one position on the retail shelf to another position on the retail shelf, a product removed from the retail shelf, and so forth. For example, Step 1212 may compare the state of the retail shelf before the engagement of the person with the retail shelf (determined based on the analysis of the at least one image by Step 1210) and the state of the retail shelf after the completion of the engagement of the person with the retail shelf (determined based on the analysis of the one or more images of the retail shelf captured using the at least one image sensor before the engagement of the person with the retail shelf) to determine the change associated with the retail shelf during the engagement of the person with the retail shelf. In another example, Steps 1210 and 1212 may compare the at least one image of Step 1210 and the one or more images of the retail shelf captured using the at least one image sensor before the engagement of the person with the retail shelf to determine the change associated with the retail shelf during the engagement of the person with the retail shelf.

In some examples, Step 1204 may further comprise analyzing the first infrared input data received by Step 1202 to determine a type of the engagement of the person with the retail shelf. For example, a classification model may be used to analyze the first infrared input data received by Step 1202 and classify it to a particular class of a plurality of alternative classes, each class of the plurality of alternative classes may correspond to a different type of engagement. In one example, in response to a first determined type of the engagement, Step 1210 may trigger the analyzing the at least one image of the retail shelf, and in response to a second determined type of the engagement, method 1200 may forgo analyzing the at least one image of the retail shelf. In another example, in response to a first determined type of the engagement, Step 1210 may include a first analysis step in the analysis of the at least one image of the retail shelf, and in response to a second determined type of the engagement (and may exclude a second analysis step from the analysis of the at least one image of the retail shelf), Step 1210 may include the second analysis step in the analysis of the at least one image of the retail shelf (and may exclude the first analysis step from the analysis of the at least one image of the retail shelf), the second analysis step may differ from the first analysis step. In one example, the first type of engagement may include a physical contact (for example, with items placed on the retail shelf, with the retail shelf, with items associated with the retail shelf, etc.), and the second type of engagement may include no physical contact. In another example, the first type of engagement may include engagement associated with a first portion of the retail shelf, and the second type of engagement may include engagement associated with a second portion of the retail shelf. In yet another example, the first type of engagement from a first distance, and the second type of engagement may include engagement from a second distance. In an additional example, the first type of engagement may include engagement associated with a first time duration, and the second type of engagement may include engagement associated with a second time duration.

In some examples, for example in response to the detected engagement of a person with a retail shelf, method 1200 may analyze one or more images of the retail shelf captured before the completion of the engagement of the person with the retail shelf to determine at least one aspect of the engagement. For example, the at least one aspect of the engagement may include a change associated with the retail shelf during the engagement of the person with the retail shelf, as described above. In another example, the at least one aspect of the engagement may include at least one of a product type associated with the engagement (such as a product type of a product taken from the retail shelf during the engagement, a product type of a product placed on the retail shelf during the engagement, a product moved from one location to another on the retail shelf during the engagement, etc.), a quantity of products associated with the engagement (such as a quantity of products of products taken from the retail shelf during the engagement, a quantity of products of products placed on the retail shelf during the engagement, a quantity of products moved from one location to another on the retail shelf during the engagement, etc.), and so forth. In one example, method 1200 may further comprise updating a virtual shopping cart associated with the person based on the determined at least one aspect of the engagement (for example, based on the determined product type, based on the determined quantity of products, and so forth). In one example, Step 1212 may further comprise using the analysis of the at least one image captured after the completion of the engagement of the person with the retail shelf and the determined at least one aspect of the engagement to determine the state of the retail shelf.

In some examples, systems, methods and computer-readable media for triggering image processing based on vibration data analysis are provided.

Figure 13:
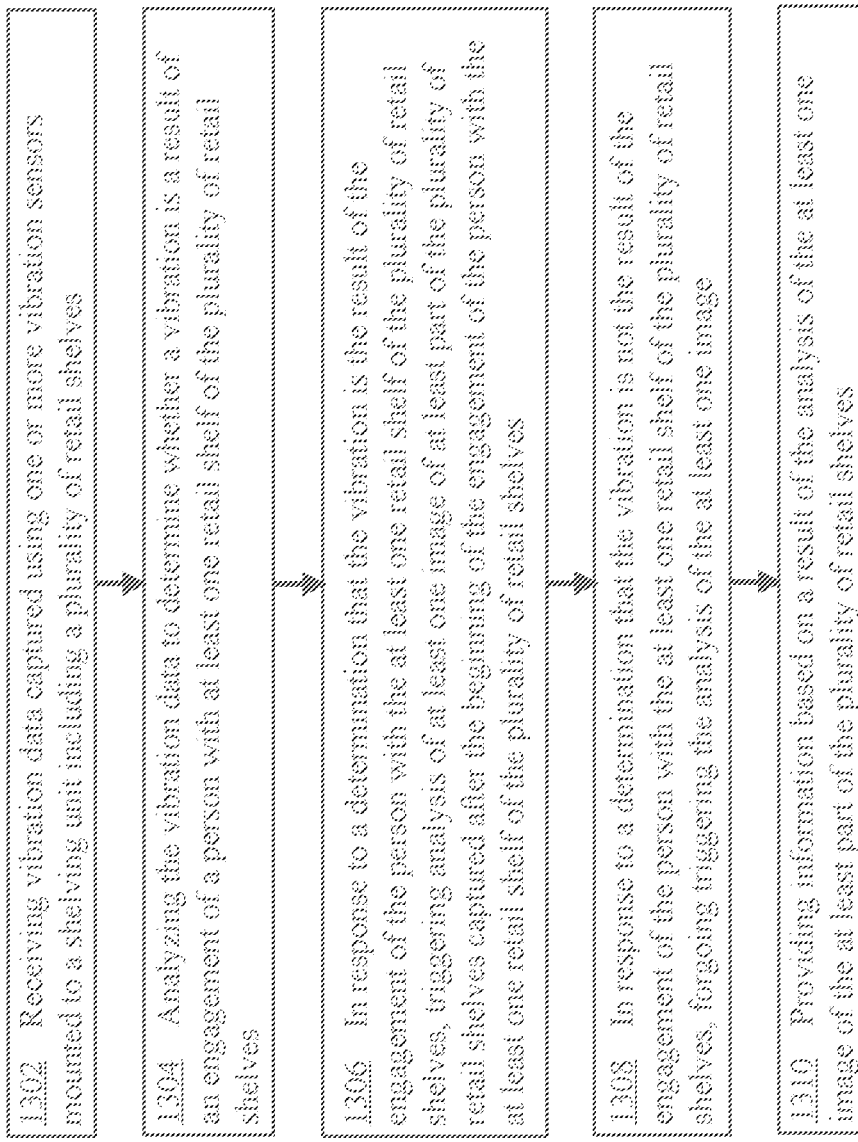
FIG. 13 provides a flowchart of an exemplary method for triggering image processing based on vibration data analysis, consistent with the present disclosure.

FIG. 13 provides a flowchart of an exemplary method 1300 for triggering image processing based on vibration data analysis, consistent with the present disclosure. In this example, method 1300 may comprise receiving vibration data captured using one or more vibration sensors mounted to a shelving unit including a plurality of retail shelves (Step 1302); analyzing the vibration data to determine whether a vibration is a result of an engagement of a person with at least one retail shelf of the plurality of retail shelves (Step 1304); in response to a determination that the vibration is a result of the engagement of the person with the at least one retail shelf of the plurality of retail shelves, triggering analysis of at least one image of at least part of the plurality of retail shelves captured after the beginning of the engagement of the person with the at least one retail shelf of the plurality of retail shelves (Step 1306); in response to a determination that the vibration is not a result of the engagement of the person with the at least one retail shelf of the plurality of retail shelves, forgoing triggering the analysis of the at least one image (Step 1308); and providing information based on a result of the analysis of the at least one image of the at least part of the plurality of retail shelves (Step 1310).

In some examples, Step 1302 may comprise receiving vibration data captured using one or more vibration sensors mounted to a shelving unit including a plurality of retail shelves. For example, receiving the vibration data by Step 1302 may comprise at least one of reading the vibration data, receiving the vibration data from an external device (for example, using a digital communication device), capturing the vibration data using the one or more vibration sensors, and so forth.

In some examples, Step 1304 may comprise analyzing the vibration data to determine whether a vibration is a result of an engagement of a person with at least one retail shelf of the plurality of retail shelves. In one example, a machine learning model may be trained using training examples to determine whether vibrations are result of engagement of people with retail shelves. An example of such training example may include sample vibration data, together with a label indicating whether the sample vibration data corresponds to engagement of people with retail shelves. In one example, Step 1304 may use the trained machine learning model to analyze the vibration data received by Step 1302 to determine whether the vibration is the result of an engagement of a person with at least one retail shelf of the plurality of retail shelves. In another example, Step 1304 may compare the vibration data or a preprocessed version of the vibration data (such as a function of the vibration data) with a threshold, and may use a result of the comparison to determine whether the vibration is the result of an engagement of a person with at least one retail shelf of the plurality of retail shelves. For example, the threshold may differentiate between an ambient vibrations from an environment of the retail shelf and vibrations originating from the retail shelf. In an additional example, the threshold may be selected based on a statistical measure of historic vibration data captured using the one or more vibration sensors of Step 1302 over time. In some examples, Step 1304 may calculate a convolution of at least part of the vibration data received by Step 1302. Further, in response to a first value of the calculated convolution of the at least part of the vibration data, Step 1304 may determine that the vibration is the result of an engagement of a person with at least one retail shelf of the plurality of retail shelves, and in response to a second value of the calculated convolution of the at least part of the vibration data, Step 1304 may determine that the vibration is not the result of an engagement of a person with at least one retail shelf of the plurality of retail shelves.

In some examples, Step 1306 may comprise, for example in response to a determination by Step 1304 that the vibration is the result of the engagement of the person with the at least one retail shelf of the plurality of retail shelves, triggering analysis of at least one image of at least part of the plurality of retail shelves captured after the beginning of the engagement of the person with the at least one retail shelf of the plurality of retail shelves. In some examples, Step 1308 may comprise, for example in response to a determination by Step 1304 that the vibration is not the result of the engagement of the person with the at least one retail shelf of the plurality of retail shelves, forgoing triggering the analysis of the at least one image In some examples, the triggering of the analysis of the at least one image may comprise transmitting a signal (for example to an external device) configured to cause the analysis of the at least one image (for example by the external device), performing the analysis of the at least one image, storing a selected value at a selected location in a memory configured to cause another process to perform the analysis of the at least one image, and so forth. The analysis of the at least one image of at least part of the plurality of retail shelves captured after the beginning of the engagement of the person with the at least one retail shelf of the plurality of retail shelves may include any image analysis described herein. For example, Step 1306 may analyze the at least one image of the at least part of the plurality of retail shelves using at least one of image processing instructions 232, Step 724, Step 726 and Step 728. In another example, Step 1306 may analyze the at least one image of the at least part of the plurality of retail shelves using any of the techniques for analyzing image data described above. In yet another example, Step 1306 may analyze the at least one image of the at least part of the plurality of retail shelves using at least one of an image classification algorithm, an object recognition algorithm, a product recognition algorithm, a label recognition algorithm, a logo recognition algorithm and a semantic segmentation algorithm. In some examples, a machine learning model may be trained using training examples to analyze images. An example of such training example may include a sample image, together with a label indicating a desired outcome corresponding to the analysis of the sample image. In one example, Step 1306 may use the trained machine learning model to analyze the at least one image of at least part of the plurality of retail shelves captured after the beginning of the engagement of the person with the at least one retail shelf of the plurality of retail shelves to obtain an outcome of the analysis. In some example, Step 1306 may use an artificial neural network to analyze the at least one image of at least part of the plurality of retail shelves captured after the beginning of the engagement of the person with the at least one retail shelf of the plurality of retail shelves to obtain an outcome of the analysis, for example as described above. In some examples, Step 1306 may base the analysis of the at least one image of at least part of the plurality of retail shelves captured after the beginning of the engagement of the person with the at least one retail shelf of the plurality of retail shelves on a calculated convolution of at least part of the at least one image. Additionally or alternatively to triggering analysis of at least one image, Step 1306 may comprise, for example in response to the determination by Step 1304 that the vibration is the result of the engagement of the person with the at least one retail shelf, triggering capturing of the at least one image of the at least part of the plurality of retail shelves, and in some examples, Step 1308 may comprise, for example in response to the determination by Step 1304 that the vibration is not the result of the engagement of the person with the at least one retail shelf, forgoing triggering the capturing of the at least one image.

In some examples, Step 1310 may comprise providing information based on a result of the analysis triggered by Step 1306 of the at least one image of the at least part of the plurality of retail shelves. For example, providing the information based on the based on the result of the analysis triggered by Step 1306 of the at least one image of the at least part of the plurality of retail shelves may comprise at least one of storing the information in memory, transmitting the information to an external device, providing the information to a user (for example, visually, audibly, textually, through a user interface, etc.), and so forth.

In some examples, the plurality of retail shelves of method 1300 may include at least a first retail shelf and a second retail shelf. Additionally or alternatively to Step 1304, method 1304 may comprise analyzing the vibration data to determine that the vibration is a result of an engagement with the first retail shelf of the plurality of retail shelves and not a result of an engagement with the second retail shelf of the plurality of retail shelves. In one example, a machine learning model may be trained using training examples to determine particular retail shelves corresponding to engagement of people from vibration data. An example of such training example may include sample vibration data, together with a label indicating a particular retail shelf corresponding to engagement corresponding to the sample vibration data of a plurality of alternative retail shelves. In one example, method 1300 may use the trained machine learning model to analyze the vibration data received by Step 1302 to determine that the vibration is a result of an engagement with the first retail shelf of the plurality of retail shelves and not a result of an engagement with the second retail shelf of the plurality of retail shelves. In another example, method 1300 may compare the vibration data or a preprocessed version of the vibration data (such as a function of the vibration data) with a threshold, and may use a result of the comparison to determine that the vibration is a result of an engagement with the first retail shelf of the plurality of retail shelves and not a result of an engagement with the second retail shelf of the plurality of retail shelves. In some examples, method 1300 may calculate a convolution of at least part of the vibration data received by Step 1302. Further, in response to a first value of the calculated convolution of the at least part of the vibration data, method 1300 may determine that the vibration is a result of an engagement with the first retail shelf of the plurality of retail shelves and not a result of an engagement with the second retail shelf of the plurality of retail shelves, and in response to a second value of the calculated convolution of the at least part of the vibration data, method 1300 may determine that the vibration is not a result of an engagement with the first retail shelf of the plurality of retail shelves and/or that the vibration is a result of an engagement with the second retail shelf of the plurality of retail shelves. Further, in some examples, for example in response to the determination that the vibration is a result of an engagement with the first retail shelf of the plurality of retail shelves and not a result of an engagement with the second retail shelf of the plurality of retail shelves, method 1300 may avoid including images depicting the second shelf in the at least one image of Steps 1306, 1308 and 1310.

In some examples, the at least one image of method 1300 may be captured using at least one image sensor mounted to a retail shelf not included the at least one retail shelf. In one example, the retail shelf not included the at least one retail shelf may be on an opposite side of an aisle from the at least one retail shelf, for example as illustrated in FIG. 4A and FIG. 6A. In another example, the retail shelf not included the at least one retail shelf may be positioned above the at least one retail shelf. In some examples, the retail shelf not included the at least one retail shelf may be positioned above the at least one retail shelf and the at least one image sensor may be positioned below the second retail shelf. In some examples, the at least one image of method 1300 may be captured using at least one image sensor mounted to an image capturing robot (for example, a wheeled robot such as capturing device 125G, a legged robot, a snake-like robot, and so forth). In some examples, the at least one image of method 1300 may be captured using at least one image sensor mounted to a ceiling of a retail store. In some examples, the at least one image of method 1300 may be captured using at least one image sensor included in a personal mobile device, such as capturing device 125D.

Additionally or alternatively to determining whether the vibration is the result of an engagement of a person with the at least one retail shelf, Step 1304 may analyze the vibration data received by Step 1302 to determine a type of the engagement of the person with the at least one retail shelf. For example, a classification model may be used to analyze the vibration data received by Step 1302 and classify it to a particular class of a plurality of alternative classes, each class of the plurality of alternative classes may correspond to a different type of engagement. In one example, in response to a first determined type of the engagement, Step 1306 may trigger the analysis of the at least one image of the at least part of the plurality of retail shelves, and in response to a second determined type of the engagement, Step 1308 may forgo triggering the analysis of the at least one image of the at least part of the plurality of retail shelves. In another example, in response to a first determined type of the engagement, Step 1306 may include a first analysis step in the analysis of the at least one image of the at least part of the plurality of retail shelves (and may exclude a second analysis step from the analysis of the at least one image of the at least part of the plurality of retail shelves), and in response to a second determined type of the engagement, Step 1306 may include the second analysis step in the analysis of the at least one image of the at least part of the plurality of retail shelves (and may exclude the first analysis step from the analysis of the at least one image of the at least part of the plurality of retail shelves), the second analysis step may differ from the first analysis step. In one example, the first type of engagement may include a physical contact (for example, with items placed on the retail shelf, with the retail shelf, with items associated with the retail shelf, etc.), and the second type of engagement may include no physical contact. In another example, the first type of engagement may include engagement associated with a first portion of the at least one retail shelf, and the second type of engagement may include engagement associated with a second portion of the at least one retail shelf. In yet another example, the first type of engagement may include engagement associated with a first type of action, and the second type of engagement may include engagement associated with a second type of action. Some non-limiting examples of such types of actions may include removal of at least one item (such as a product) from the at least one retail shelf, placement of at least one item (such as a product) on the at least one retail shelf, repositioning of at least one item (such as a product) on the at least one retail shelf, and so forth.

In some examples, the at least one image of method 1300 may be at least one image of the at least part of the plurality of retail shelves captured after a completion of the engagement of the person with the at least one retail shelf. In one example, Step 1304 may comprise analyzing the vibration data to determine the completion of the engagement of the person with the at least one retail shelf from vibration data. In one example, a machine learning model may be trained using training examples to determine completion of engagement of people with retail shelves. An example of such training example may include sample vibration data, together with a label indicating whether the sample vibration data corresponds to completion of engagement of a person with a retail shelf. In one example, Step 1304 may use the trained machine learning model to analyze the vibration data received by Step 1302 to determine the completion of the engagement of the person with the at least one retail shelf. In another example, Step 1304 may compare the vibration data or a preprocessed version of the vibration data (such as a function of the vibration data) with a threshold, and may use a result of the comparison to determine the completion of the engagement of the person with the at least one retail shelf. For example, the threshold may differentiate between an ambient vibrations from an environment of the retail shelf and vibrations resulting from such engagement. In an additional example, the threshold may be selected based on a statistical measure of historic vibration data captured using the one or more vibration sensors of Step 1302 over time. In some examples, Step 1304 may calculate a convolution of at least part of the vibration data received by Step 1302. Further, in response to a first value of the calculated convolution of the at least part of the vibration data, Step 1304 may determine the completion of the engagement of the person with the at least one retail shelf, and in response to a second value of the calculated convolution of the at least part of the vibration data, Step 1304 may forgo the determination of the completion of the engagement of the person with the at least one retail shelf.

In some examples, the at least one image of method 1300 may be at least one image of the at least part of the plurality of retail shelves captured after a completion of the engagement of the person with the at least one retail shelf. In some examples, method 1300 may comprise analyzing one or more images of the at least one retail shelf to determine the completion of the engagement of the person with the at least one retail shelf. In one example, a machine learning model may be trained using training examples to determine completion of engagement of people with retail shelves from images. An example of such training example may include sample image, together with a label indicating whether the sample image corresponds to completion of engagement of a person with a retail shelf. In one example, method 1300 may use the trained machine learning model to analyze the one or more images of the at least one retail shelf to determine the completion of the engagement of the person with the at least one retail shelf. In one example, method 1300 may calculate a convolution of at least part of the one or more images of the at least one retail shelf. Further, in response to a first value of the calculated convolution of the at least part of the vibration data, method 1300 may determine the completion of the engagement of the person with the at least one retail shelf, and in response to a second value of the calculated convolution of the at least part of the vibration data, method 1300 may forgo the determination of the completion of the engagement of the person with the at least one retail shelf. In some examples, method 1300 may analyzing infrared data captured using at least one infrared sensor to determine a completion of the engagement of the person with the at least one retail shelf, for example as described above.

In some examples, the at least one image of method 1300 may be at least one image of the at least part of the plurality of retail shelves captured after a completion of the engagement of the person with the at least one retail shelf. Further, in some examples, method 1300 may use the analysis of Step 1306 of the at least one image of the at least part of the plurality of retail shelves to determine a state of at least one retail shelf after the completion of the engagement, for example as described above in relation to Step 1210. In one example, the determined state of the at least one retail shelf may include an inventory data associated with products on the at least one retail shelf after the completion of the engagement, and the inventory data may be determined using the analysis of the at least one image by Step 1306, for example as described above in relation to Step 1212. In another example, the determined state of the at least one retail shelf may include facings data associated with products on the at least one retail shelf after the completion of the engagement, and the facings data may be determined using the analysis of the at least one image by Step 1306, for example as described above in relation to Step 1212. In yet another example, the determined state of the at least one retail shelf may include planogram compliance status of the at least one retail shelf after the completion of the engagement, and the planogram compliance status may be determined using the analysis of the at least one image by Step 1306, for example as described above in relation to Step 1212.

In some examples, the at least one image of method 1300 may be at least one image of the at least part of the plurality of retail shelves captured after a completion of the engagement of the person with the at least one retail shelf. Further, in some examples, method 1300 may use the analysis of the at least one image by Step 1306 and an analysis of one or more images of the at least one retail shelf captured using the at least one image sensor before the engagement to determine a change associated with the at least one retail shelf during the engagement, for example as described above in relation to Steps 1210 and 1212. Some non-limiting examples of such change may include a product placed on the retail shelf, a product moved from one position on the retail shelf to another position on the retail shelf, a product removed from the retail shelf, and so forth.

In some examples, systems, methods and computer-readable media for forgoing image processing in response to infrared data analysis are provided.

Figure 14:
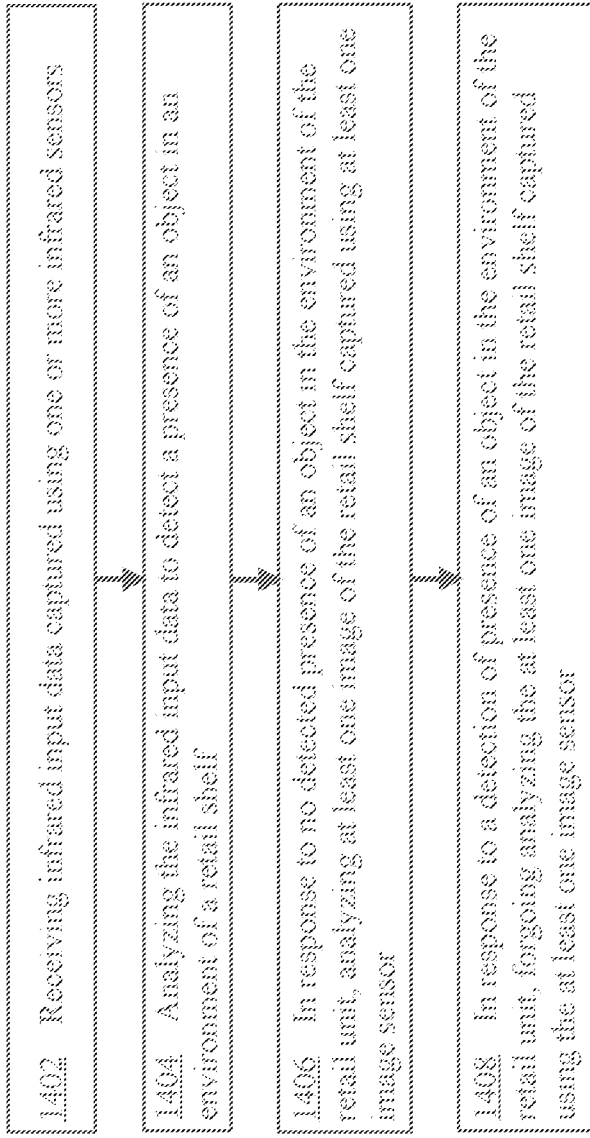
FIG. 14 provides a flowchart of an exemplary method for forgoing image processing in response to infrared data analysis, consistent with the present disclosure.

FIG. 14 provides a flowchart of an exemplary method 1400 for forgoing image processing in response to infrared data analysis, consistent with the present disclosure. In this example, method 1400 may comprise receiving infrared input data captured using one or more infrared sensors (Step 1402); analyzing the infrared input data to detect a presence of an object in an environment of a retail shelf (Step 1404); in response to no detected presence of an object in the environment of the retail unit, analyzing at least one image of the retail shelf captured using at least one image sensor (Step 1406); and in response to a detection of presence of an object in the environment of the retail unit, forgoing analyzing the at least one image of the retail shelf captured using the at least one image sensor (Step 1408). In one example, the environment of the retail shelf may be, include, or be included in an area between the at least one image sensor and at least part of the retail shelf, for example an area that a presence of an opaque object in it will cause an occlusion of at least part of the retail shelf in at least one image.

In some examples, Step 1402 may comprise receiving infrared input data captured using one or more infrared sensors. For example, receiving the infrared input data by Step 1402 may comprise at least one of reading the infrared input data, receiving the infrared input data from an external device (for example, using a digital communication device), capturing the infrared input data using the one or more infrared sensors, and so forth. In some examples, the one or more infrared sensors may be at least one of active infrared sensors, passive infrared sensors, thermal infrared sensors, pyroelectric infrared sensors, thermoelectric infrared sensors, photoconductive infrared sensors and photovoltaic infrared sensors. In one example, the one or more infrared sensors may be one or more passive infrared sensors. In some examples, the one or more infrared sensors may be one or more infrared sensors positioned below a second retail shelf. In one example, the second retail shelf may be positioned above the retail shelf. For example, the one or more infrared sensors may be one or more infrared sensors mounted to the second retail shelf, mounted to a surface (for example, of a wall, of a rack, etc.) connecting the second retail shelf and the retail shelf, and so forth. In some examples, the one or more infrared sensors may be one or more infrared sensors mounted to a second retail shelf. In one example, the second retail shelf may be positioned on an opposite side of an aisle from the retail shelf.

In some examples, Step 1404 may comprise analyzing the infrared input data received by Step 1402 to detect a presence of an object in an environment of a retail shelf. In one example, a machine learning model may be trained using training examples to detect presence of objects in environments from infrared data. An example of such training example may include sample infrared data, together with a label indicating whether the sample infrared data corresponds to a presence of an object in an environment. In one example, Step 1404 may use the trained machine learning model to analyze the infrared input data received by Step 1402 to detect the presence of the object in the environment of the retail shelf. In another example, Step 1404 may compare the infrared input data or a preprocessed version of the infrared input data (such as a function of the infrared input data) with a threshold, and may use a result of the comparison to detect the presence of the object in the environment of the retail shelf. For example, the threshold may differentiate between an ambient temperature of an environment of the retail shelf and a typical human body temperature, or between typical temperatures of a refrigeration unit including the retail shelf to an ambient temperature. In an additional example, the threshold may be selected based on a statistical measure of infrared data captured using the one or more infrared sensors of Step 1402 over time. In some examples, Step 1404 may calculate a convolution of at least part of the infrared input data received by Step 1402. Further, in response to a first value of the calculated convolution of the at least part of the infrared input data, Step 1404 may detect the presence of the object in the environment of the retail shelf, and in response to a second value of the calculated convolution of the at least part of the infrared input data, Step 1404 may avoid detecting the presence of the object in the environment of the retail shelf. In some examples, the one or more infrared sensors may be one or more infrared sensors physically coupled with the at least one image sensor (such as capturing devices 125A, 125B, and 125C as illustrated in FIG. 4A). For example, a common housing may include both the one or more infrared sensors and the at least one image sensor. In another example, the one or more infrared sensors may be physically connected to the at least one image sensor, for example with at least one wire, with a power cable, with a data cable, with a bracket, and so forth. In yet another example, the one or more infrared sensors and the at least one image sensor may be physically connected to a third housing, such as housing 504J or housing 504I. For example, the third housing may include a processing unit, may include memory, may include a wireless communication device, may include a power source, and so forth. In some examples, the object of Step 1404 may include at least one of a person, a robot, and an inanimate object. Other non-limiting examples of the object of Step 1404 may include a shopping cart, a ladder and a pallet jack.

In some examples, Step 1406 may comprise, for example in response to no detected presence of an object in the environment of the retail unit by Step 1404, analyzing at least one image of the retail shelf captured using at least one image sensor. In some examples, Step 1408 may comprise, for example in response to a detection of presence of an object in the environment of the retail unit by Step 1404, forgoing analyzing the at least one image of the retail shelf captured using the at least one image sensor. In some examples, analyzing at least one image of the retail shelf captured using at least one image sensor by Step 1406 may include any image analysis described herein. For example, Step 1406 may analyze the at least one image using at least one of image processing instructions 232, Step 724, Step 726 and Step 728. In another example, Step 1406 may analyze the at least one image using any of the techniques for analyzing image data described above. In yet another example, Step 1406 may analyze the at least one image using at least one of an image classification algorithm, an object recognition algorithm, a product recognition algorithm, a label recognition algorithm, a logo recognition algorithm and a semantic segmentation algorithm. In some examples, a machine learning model may be trained using training examples to analyze images. An example of such training example may include a sample image, together with a label indicating a desired outcome corresponding to the analysis of the sample image. In one example, Step 1406 may use the trained machine learning model to analyze the at least one image to obtain an outcome of the analysis. In some example, Step 1406 may use an artificial neural network to analyze the at least one image to obtain an outcome of the analysis, for example as described above. In some examples, Step 1406 may base the analysis of the at least one image on a calculated convolution of at least part of the at least one image. Additionally or alternatively to triggering analysis of at least one image, Step 1406 may comprise, for example in response to no detected presence of an object in the environment of the retail unit by Step

1404, triggering capturing of the at least one image, and in some examples, Step 1408 may comprise, for example in response to a detection of presence of an object in the environment of the retail unit by Step 1404, forgoing triggering the capturing of the at least one image.

In some examples, the at least one image sensor of Step 1406 and Step 1408 may be at least one image sensor mounted to a second retail shelf. In one example, the second retail shelf may be on an opposite side of an aisle from the retail shelf, for example as illustrated in FIG. 4A and FIG. 6A. In another example, the second retail shelf may be positioned above the retail shelf. In some examples, the second retail shelf may be positioned above the retail shelf and the at least one image sensor may be positioned below the second retail shelf. In some examples, the at least one image sensor of Step 1406 and Step 1408 may be at least one image sensor mounted to an image capturing robot (for example, a wheeled robot such as capturing device 125G, a legged robot, a snake-like robot, and so forth). In some examples, the at least one image sensor of Step 1406 and Step 1408 may be at least one image sensor mounted to a ceiling of a retail store. In some examples, the at least one image sensor of Step 1406 and Step 1408 may be part of a personal mobile device, such as capturing device 125D.

In some examples, method 1400 may further comprise using the analysis of the at least one image by Step 1406 to determine a state of the retail shelf, for example as described above in relation to Step 1210. In one example, the determined state of the retail shelf may include an inventory data associated with products on the retail shelf, and the inventory data may be determined using the analysis of the at least one image by Step 1406, for example as described above in relation to Step 1212. In another example, the determined state of the retail shelf may include facings data associated with products on the retail shelf, and the facings data may be determined using the analysis of the at least one image by Step 1406, for example as described above in relation to Step 1212. In yet another example, the determined state of the retail shelf may include planogram compliance status of the retail shelf, and the planogram compliance status may be determined using the analysis of the at least one image by Step 1406, for example as described above in relation to Step 1212.

In some examples, Step 1404 may analyze the infrared input data to determine a portion of a field of view of the at least one image sensor associated with the object, for example using a regression model, using a semantic segmentation model, using a background subtraction model, and so forth. Further, in some examples, in response to a first portion of the field of view of the at least one image sensor associated with the object determined by Step 1404, Step 1406 may analyze the at least one image of the retail shelf captured using the at least one image sensor, and in response to a second portion of the field of view of the at least one image sensor associated with the object determined by Step 1404, Step 1408 may forgo analyzing the at least one image of the retail shelf captured using the at least one image sensor. In one example, the field of view of the at least one image sensor may differ from the field of view of the one or more infrared sensors. In another example, the field of view of the at least one image sensor and the field of view of the one or more infrared sensors may be identical or substantially identical. In some examples, Step 1404 may analyze the infrared input data to determine a type of the object, for example using an object recognition algorithm, using a classification model, and so forth. Further, in some examples, in response to a first type of the object determined by Step 1404, Step 1406 may analyze the at least one image of the retail shelf captured using the at least one image sensor, and in response to a second type of the object determined by Step 1404, Step 1408 may forgo analyzing the at least one image of the retail shelf captured using the at least one image sensor.

In some examples, Step 1404 may analyze the infrared input data to determine a duration associated with the presence of an object in the environment of the retail shelf, for example using a regression model, using a Markov model, using a Viterbi algorithm, and so forth. In some examples, method 1400 may further comprise comparing the duration determined by Step 1404 with a threshold. Further, in response to a first result of the comparison, Step 1406 may analyze the at least one image of the retail shelf captured using the at least one image sensor, and in response to a second result of the comparison, Step 1408 may forgo analyzing the at least one image of the retail shelf captured using the at least one image sensor. In one example, the threshold may be selected based on at least one product type associated with the retail shelf. For example, in response to a first product type associated with the retail shelf, a first threshold may be selected, and in response to a second product type associated with the retail shelf, a second threshold may be selected, the second threshold may differ from the first threshold. In one example, the threshold may be selected based on a status of the retail shelf determined using image analysis (for example using Steps 1210 and 1212 or using method 1200) of one or more images of the retail shelf captured using the at least one image sensor before the capturing of the infrared input data by Step 1402. For example, in response to a first status of the retail shelf, a first threshold may be selected, and in response to a second status of the retail shelf, a second threshold may be selected, the second threshold may differ from the first threshold. In one example, the threshold may be selected based on a time of day. For example, in response to a first time of day, a first threshold may be selected, and in response to a second time of day, a second threshold may be selected, the second threshold may differ from the first threshold.

In some examples, method 1400 may further comprise, in response to no presence of an object in the environment of the retail unit detected by Step 1404, capturing the at least one image of the retail shelf using the at least one image sensor, and in response to a detection of presence of an object in the environment of the retail unit by Step 1404, forgoing the capturing of the at least one image of the retail shelf.

Using only one type modality (such as image data, infrared data, vibration data, etc.) to detect and/or recognize actions may result in unsatisfactory results, such as low accuracy, low precision, low sensitivity, results with low confidence levels, failure to successfully determine aspects of the actions (such as a type of an action, a product type associated with an action, a quantity associated with an action, etc.), and so forth. For example, using only image data to detect and/or recognize actions may fail due to image blur, occlusions, insufficient pixel resolution, insufficient frame rate, ambiguity in the visual data, and so forth. In another example, using only infrared data to detect and/or recognize actions may fail due to ambient noise, ambiguity in the infrared data, and so forth. In yet another example, using only vibration data to detect and/or recognize actions may fail due to ambient noise, ambiguity in the vibration data, and so forth. Analyzing data from multiple modalities together to detect and/or recognize actions may improve the results. For example, combining data from multiple modalities may overcome many of the problems faced when using only one modality, and may therefore provide improve accuracy, improve precision, improve sensitivity, provide results with higher confidence levels, enable determination of additional aspects of the actions (such as a type of an action, a product type associated with an action, a quantity associated with an action, etc.), and so forth.

In some examples, systems, methods and computer-readable media for using infrared data analysis and image analysis for robust action recognition in retail environment are provided.

Figure 15:
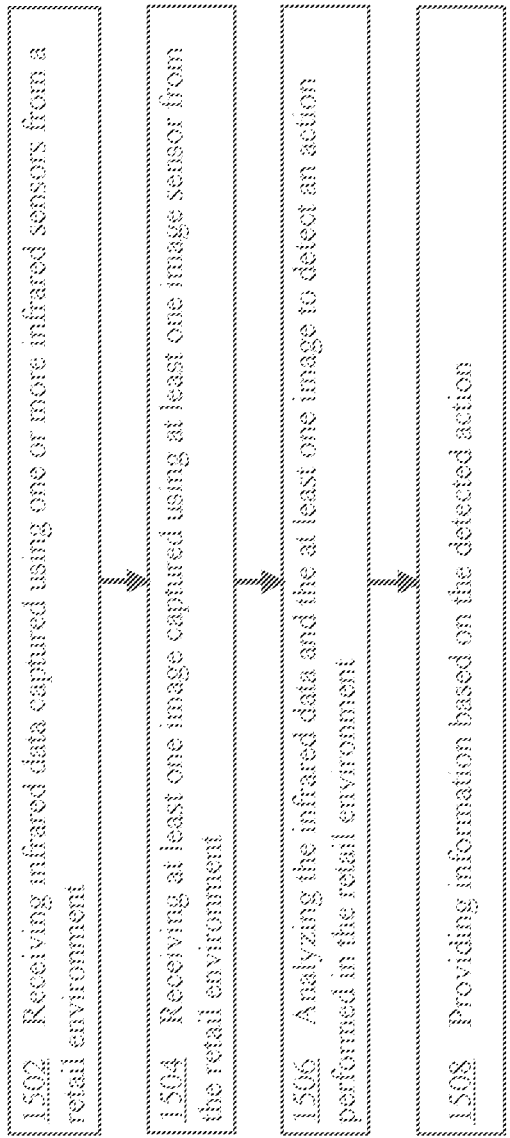
FIG. 15 provides a flowchart of an exemplary method for using infrared data analysis and image analysis for robust action recognition in retail environment, consistent with the present disclosure.

FIG. 15 provides a flowchart of an exemplary method 1500 for using infrared data analysis and image analysis for robust action recognition in retail environment, consistent with the present disclosure. In this example, method 1500 may comprise: receiving infrared data captured using one or more infrared sensors from a retail environment (Step 1502); receiving at least one image captured using at least one image sensor from the retail environment (Step 1504); analyzing the infrared data and the at least one image to detect an action performed in the retail environment (Step 1506); and providing information based on the detected action (Step 1508).

In some examples, Step 1502 may comprise receiving infrared data captured using one or more infrared sensors from a retail environment. For example, receiving the infrared data by Step 1502 may comprise at least one of reading the infrared data, receiving the infrared data from an external device (for example, using a digital communication device), capturing the infrared data using the one or more infrared sensors from the retail environment, and so forth. In some examples, the one or more infrared sensors may be at least one of active infrared sensors, passive infrared sensors, thermal infrared sensors, pyroelectric infrared sensors, thermoelectric infrared sensors, photoconductive infrared sensors and photovoltaic infrared sensors. In one example, the one or more infrared sensors may be one or more passive infrared sensors. In some examples, the one or more infrared sensors may be one or more infrared sensors positioned below a second retail shelf. In one example, the second retail shelf may be positioned above the retail shelf. For example, the one or more infrared sensors may be one or more infrared sensors mounted to the second retail shelf, mounted to a surface (for example, of a wall, of a rack, etc.) connecting the second retail shelf and the retail shelf, and so forth. In some examples, the one or more infrared sensors may be one or more infrared sensors mounted to a second retail shelf. In one example, the second retail shelf may be positioned on an opposite side of an aisle from the retail shelf.

In some examples, Step 1504 may comprise receiving at least one image captured using at least one image sensor from a retail environment (for example, from the retail environment of Step 1502), for example as described above. In some examples, receiving at least one image by Step 1504 may comprise at least one of reading the at least one image, receiving the at least one image from an external device (for example, using a digital communication device), capturing the at least one image using the at least one image sensor from the retail environment, and so forth. In some examples, the at least one image sensor of Step 504 may be at least one image sensor mounted to a retail shelf, for example as illustrated in FIG. 4A, FIG. 6A and FIG. 6B. In some examples, the at least one image sensor of Step 1504 may be at least one image sensor mounted to an image capturing robot (for example, a wheeled robot such as capturing device 125G, a legged robot, a snake-like robot, and so forth). In some examples, the at least one image sensor of Step 1504 may be at least one image sensor mounted to a ceiling of a retail store. In some examples, the at least one image sensor of Step 1504 may be part of a personal mobile device, such as capturing device 125D. In some examples, the at least one image received by Step 1504 may include at least one three-dimensional image (such as a range image, a stereo image, a depth image, a three-dimensional array of voxels, and so forth).

In some examples, Step 1506 may comprise analyzing the infrared data received by Step 1502 and the at least one image received by Step 1504 to detect an action performed in the retail environment. In some examples, the action may include at least one of picking a product from a retail shelf, placing a product on a retail shelf and moving a product on a retail shelf. Some other non-limiting examples of such action may include placing a label (such as a shelf label), remoting a label (such as a shelf label), placing a promotional sign, removing a promotion sign, changing a price, cleaning, restocking, rearranging products, and so forth. In some examples, a machine learning model may be trained using training examples to detect actions from infrared data and images. An example of such training example may include a sample infrared data and a sample image, together with a label indicating whether the sample infrared data and the sample image corresponds to an action performed in an environment. In one example, Step 1506 may use the trained machine learning model to analyze the infrared data received by Step 1502 and the at least one image received by Step 1504 to detect the action performed in the retail environment. In some example, Step 1506 may use an artificial neural network to analyze the infrared data received by Step 1502 and the at least one image received by Step 1504 to detect the action performed in the retail environment.

In some examples, Step 1506 may calculate a convolution of at least part of the at least one image received by Step 1504 to obtain a value of the calculated convolution, and may use the value of the calculated convolution to analyze the infrared data received by Step 1502 to detect the action performed in the retail environment. For example, Step 1506 may analyze the infrared data received by Step 1502 using a parametric model to detect the action performed in the retail environment, and the parameter may be selected based on the value of the calculated convolution. In another example, in response to a first value of the calculated convolution, Step 1506 may analyze the infrared data received by Step 1502 using a first analysis step to detect the action performed in the retail environment, and in response to a second value of the calculated convolution, Step 1506 may analyze the infrared data received by Step 1502 using a second analysis step to detect the action performed in the retail environment, the second analysis step may differ from the first analysis step.

In some examples, Step 1506 may calculate a convolution of at least part of the infrared data received by Step 1502 to obtain a value of the calculated convolution, and may use the value of the calculated convolution to analyze the at least one image received by Step 1504 to detect the action performed in the retail environment. For example, Step 1506 may analyze at least one image received by Step 1504 using a parametric model to detect the action performed in the retail environment, and the parameter may be selected based on the value of the calculated convolution. In another example, in response to a first value of the calculated convolution, Step 1506 may analyze the at least one image received by Step 1504 using a first analysis step to detect the action performed in the retail environment, and in response to a second value of the calculated convolution, Step 1506 may analyze the at least one image received by Step 1504 using a second analysis step to detect the action performed in the retail environment, the second analysis step may differ from the first analysis step.

In some examples, the infrared data received by Step 1502 may include a time series of samples captured using the one or more infrared sensors at different points in time. In some examples, Step 1506 may compare two samples of the time series of samples, and may use a result of the comparison to analyze the at least one image received by Step 1504 to detect the action performed in the retail environment. For example, Step 1506 may analyze at least one image received by Step 1504 using a parametric model to detect the action performed in the retail environment, and the parameter may be selected based on the result of the comparison. In another example, in response to a first result of the comparison, Step 1506 may analyze the at least one image received by Step 1504 using a first analysis step to detect the action performed in the retail environment, and in response to a second result of the comparison, Step 1506 may analyze the at least one image received by Step 1504 using a second analysis step to detect the action performed in the retail environment, the second analysis step may differ from the first analysis step.

In some examples, the at least one image received by Step 1504 may include a plurality of frames of a video captured using the at least one image sensor. In some examples, Step 1506 may compare two frames of the plurality of frames, and may use a result of the comparison to analyze the infrared data received by Step 1502 to detect the action performed in the retail environment. For example, Step 1506 may analyze the infrared data received by Step 1502 using a parametric model to detect the action performed in the retail environment, and the parameter may be selected based on the result of the comparison. In another example, in response to a first result of the comparison, Step 1506 may analyze the infrared data received by Step 1502 using a first analysis step to detect the action performed in the retail environment, and in response to a second result of the comparison, Step 1506 may analyze the infrared data received by Step 1502 using a second analysis step to detect the action performed in the retail environment, the second analysis step may differ from the first analysis step.

In some examples, Step 1506 may analyzing the infrared data received by Step 1502 to select a portion of the at least one image received by Step 1504. For example, in response to a first infrared data received by Step 1502, Step 1504 may select a first portion of the at least one image received by Step 1504, and in response to a second infrared data received by Step 1502, Step 1504 may select a second portion of the at least one image received by Step 1504, the second portion may differ from the first portion. In another example, the infrared data received by Step 1502 may include spatial properties, and Step 1506 may select the portion of the at least one image received by Step 1504 based on the spatial properties. For example, the spatial properties may include an indication of a region in the retail environment, and Step 1506 may select a portion of the at least one image received by Step 1504 corresponding to the indicated region of the retail environment. Further, in some examples, Step 1506 may analyzing the selected portion of the at least one image to detect the action performed in the retail environment, for example using the image analysis described above.

In some examples, Step 1506 may comprise analyzing the infrared data received by Step 1502 to attempt to detect the action performed in the retail environment, for example using a pattern recognition algorithm. In some examples, for example in response to a failure of the attempt to successfully detect the action, Step 1506 may analyze the at least one image received by Step 1504 to detect the action performed in the retail environment, for example using a visual action recognition algorithm. In one example, for example in response to a failure to successfully detect the action, method 1500 may trigger the capturing of the at least one image using the at least one image sensor. In one example, the failure to successfully detect the action may be a failure to successfully detect the action at a confidence level higher than a selected threshold. In another example, the failure to successfully detect the action may be a failure to determine at least one aspect of the action. Some non-limiting examples of such aspect may include at least one of a type of the action, a product type associated with the action, and a quantity of products associated with the action.

In some examples, Step 1508 may comprise providing information based on the action detected by Step 1506. For example, providing the information based on the action detected by Step 1506 may comprise at least one of storing the information in memory, transmitting the information to an external device, providing the information to a user (for example, visually, audibly, textually, through a user interface, etc.), and so forth.

In some examples, detecting the action performed in the retail environment by Step 1506 may further include recognizing a type of the action. For example, Step 1506 may use a classification model to classify the action to a particular class of a plurality of alternative classes, each class of the plurality of alternative classes may correspond to a different type of action. In another example, Step 1506 may analyze the infrared data received by Step 1502 and the at least one image received by Step 1504 (for example using the classification mode, using a machine learning model trained using training examples to recognize types of actions from records including both infrared data and images, using an artificial neural network, and so forth) to recognize the type of the action. Some non-limiting examples of such types of actions may include picking an item, picking a product, placing an item, placing a product, moving an item, moving a product, placing a label (such as a shelf label), remoting a label (such as a shelf label), placing a promotional sign, removing a promotion sign, changing a price, cleaning, restocking, rearranging products, and so forth. Further, in some examples, the information provided by Step 1508 may be based on the type of the action. In one example, the information provided by Step 1508 may include an indication of the type of the action. In one example, in response to a first type of the action, Step 1508 may provide first information, and in response to a second type of the action, Step 1508 may provide second information, the second information may differ from the first information. In one example, in response to a first type of the action, Step 1508 may provide the information, and in response to a second type of the action, Step 1508 may forgo providing the information.

In some examples, detecting the action performed in the retail environment by Step 1506 may further include identifying a product type associated with the action. For example, Step 1506 may use a classification model to classify the action to a particular class of a plurality of alternative classes, each class of the plurality of alternative classes may correspond to a different product type. In another example, Step 1506 may analyze the infrared data received by Step 1502 and the at least one image received by Step 1504 (for example using the classification mode, using a machine learning model trained using training examples to identify product types of products associated with actions from records including both infrared data and images, using an artificial neural network, and so forth) to identify the product type. In one example, the action may include at least one of picking, placing and moving a product, and the product type associated with the action may be a product type of the product. In one example, the action may include at least one of placing and remoting a label (such as a shelf label), and the product type associated with the action may be a product type indicated by the label (for example, by text printed on the label, by a logo on the label, by a picture on the label, by a visual code on the label, and so forth). In one example, the action may include at least one of placing and removing a promotion sign, and the product type associated with the action may be a product type associated with the promotion sign. In one example, the action may include changing a price of products of a particular product type, and the product type associated with the action may be the particular product type. Further, in some examples, the information provided by Step 1508 may be based on the product type associated with the action. In one example, the information provided by Step 1508 may include an indication of the product type (for example, textual indication, a picture of a product of the product type, a barcode associated with the product type, and so forth). In one example, in response to a first product type associated with of the action, Step 1508 may provide first information, and in response to a second product type associated with of the action, Step 1508 may provide second information, the second information may differ from the first information. In one example, in response to a first product type associated with of the action, Step 1508 may provide the information, and in response to a second product type associated with of the action, Step 1508 may forgo providing the information.

In some examples, detecting the action performed in the retail environment by Step 1506 may further include determining a quantity of products associated with the action. For example, Step 1506 may use a regression model to determine the quantity of products associated with the action. In another example, Step 1506 may analyze the infrared data received by Step 1502 and the at least one image received by Step 1504 (for example using the classification mode, using a machine learning model trained using training examples to determine quantity of products associated with actions from records including both infrared data and images, using an artificial neural network, and so forth) to determine the quantity of products associated with the action. In one example, the action may include at least one of picking, placing and moving at least one product, and the quantity of products associated with the action may be the quantity of products picked, placed and/or moved in the action. In one example, the action may include at least one of placing and removing a promotion sign, and the quantity of products associated with the action may be a quantity of products indicated in the promotion sign. Further, in some examples, the information provided by Step 1508 may be based on the quantity of products associated with the action. In one example, the information provided by Step 1508 may include an indication of the quantity of products associated with the action. In one example, in response to a first quantity of products associated with the action, Step 1508 may provide first information, and in response to a second quantity of products associated with the action, Step 1508 may provide second information, the second information may differ from the first information. In one example, in response to a first quantity of products associated with the action, Step 1508 may provide the information, and in response to a second quantity of products associated with the action, Step 1508 may forgo providing the information.

In some examples, the infrared data received by Step 1502 may include a time series of samples captured using the one or more infrared sensors at different points in time. In some examples, Step 1504 may further comprise analyzing the time series of the samples captured using the one or more infrared sensors at the different points in time to select the at least one image of a plurality of images. For example, in response to a first result of the analysis of the time series of samples, Step 1504 may selected a first subgroup of the plurality of images, and in response to a second result of the analysis of the time series of samples, Step 1504 may selected a second subgroup of the plurality of images, the second subgroup may differ from the first subgroup. In another example, Step 1504 may analyze the time series of the samples captured using the one or more infrared sensors at the different points in time to select a particular point in time (for example, a point in time corresponding to an extremum of the samples, a point in time corresponding to a sample satisfying a particular criterion, and so forth), each image of the plurality of images may correspond to a different point in time (for example, based on the capturing time of the image), and Step 1504 may select the image of the plurality of images corresponding to the particular point in time (or corresponding to a point in time nearest to the particular point in time of the points in time corresponding to the plurality of images).

In some examples, Step 1506 may calculate a convolution of at least part of the at least one image to obtain a value of the calculated convolution. Further, in some examples, Step 1506 may analyze the infrared data to determine a wavelength associated with the infrared data. For example, the wavelength associated with the infrared data may be the most prominent wavelength in the infrared data, the most prominent wavelength in a selected range of wavelengths in the infrared data, the second most prominent wavelength in the infrared data, and so forth. In one example, in response to a first combination of the value of the calculated convolution and the wavelength associated with the infrared data, Step 1506 may detect the action performed in the retail environment, and in response to a second combination of the value of the calculated convolution and the wavelength associated with the infrared data, Step 1506 may forgo the detection of the action performed in the retail environment. In another example, in response to a first combination of the value of the calculated convolution and the wavelength associated with the infrared data, Step 1506 may determine a first type of the action performed in the retail environment, and in response to a second combination of the value of the calculated convolution and the wavelength associated with the infrared data, Step 1506 may determine a second type of the action performed in the retail environment, the second type may differ from the first type.

In some examples, systems, methods and computer-readable media for using vibration data analysis and image analysis for robust action recognition in retail environment are provided.

Figure 16:
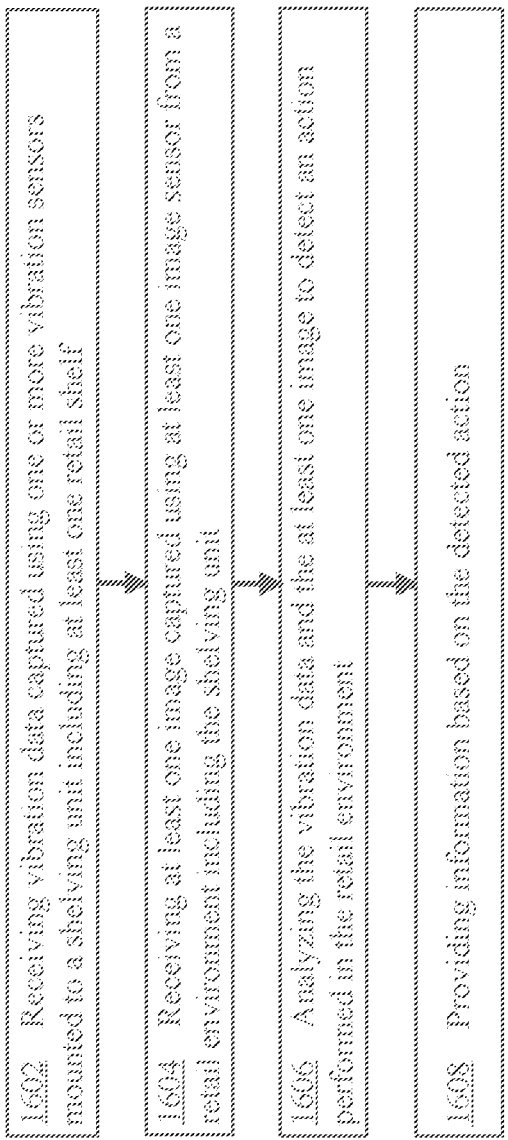
FIG. 16 provides a flowchart of an exemplary method for using vibration data analysis and image analysis for robust action recognition in retail environment, consistent with the present disclosure.

FIG. 16 provides a flowchart of an exemplary method 1600 for using vibration data analysis and image analysis for robust action recognition in retail environment, consistent with the present disclosure. In this example, method 1600 may comprise: receiving vibration data captured using one or more vibration sensors mounted to a shelving unit including at least one retail shelf (Step 1602); receiving at least one image captured using at least one image sensor from a retail environment including the shelving unit (Step 1604); analyzing the vibration data and the at least one image to detect an action performed in the retail environment (Step 1606); and providing information based on the detected action (Step 1608).

In some examples, Step 1602 may comprise receiving vibration data captured using one or more vibration sensors mounted to a shelving unit including at least one retail shelf. For example, receiving the vibration data by Step 1602 may comprise at least one of reading the vibration data, receiving the vibration data from an external device (for example, using a digital communication device), capturing the vibration data using the one or more vibration sensors mounted to a shelving unit including at least one retail shelf, and so forth. In some examples, the one or more vibration sensors may be at least one of active vibration sensors, passive vibration sensors, thermal vibration sensors, pyroelectric vibration sensors, thermoelectric vibration sensors, photoconductive vibration sensors and photovoltaic vibration sensors. In one example, the one or more vibration sensors may be one or more passive vibration sensors. In some examples, the one or more vibration sensors may be one or more vibration sensors positioned below a second retail shelf. In one example, the second retail shelf may be positioned above the retail shelf. For example, the one or more vibration sensors may be one or more vibration sensors mounted to the second retail shelf, mounted to a surface (for example, of a wall, of a rack, etc.) connecting the second retail shelf and the retail shelf, and so forth. In some examples, the one or more vibration sensors may be one or more vibration sensors mounted to a second retail shelf. In one example, the second retail shelf may be positioned on an opposite side of an aisle from the retail shelf.

In some examples, Step 1604 may comprise receiving at least one image captured using at least one image sensor from a retail environment (for example, a retail environment including the shelving unit of Step 1602), for example as described above. In some examples, receiving at least one image by Step 1604 may comprise at least one of reading the at least one image, receiving the at least one image from an external device (for example, using a digital communication device), capturing the at least one image using the at least one image sensor from the retail environment, and so forth. In some examples, the at least one image sensor of Step 504 may be at least one image sensor mounted to a second retail shelf, for example as illustrated in FIG. 4A, FIG. 6A and FIG. 6B. In some examples, the at least one image sensor of Step 1604 may be at least one image sensor mounted to an image capturing robot (for example, a wheeled robot such as capturing device 125G, a legged robot, a snake-like robot, and so forth). In some examples, the at least one image sensor of Step 1604 may be at least one image sensor mounted to a ceiling of a retail store. In some examples, the at least one image sensor of Step 1604 may be part of a personal mobile device, such as capturing device 125D. In some examples, the at least one image received by Step 1604 may include at least one three-dimensional image (such as a range image, a stereo image, a depth image, a three-dimensional array of voxels, and so forth).

In some examples, Step 1606 may comprise analyzing the vibration data received by Step 1602 and the at least one image received by Step 1604 to detect an action performed in the retail environment. In some examples, the action may include at least one of picking a product from a retail shelf, placing a product on a retail shelf and moving a product on a retail shelf. Some other non-limiting examples of such action may include placing a label (such as a shelf label), remoting a label (such as a shelf label), placing a promotional sign, removing a promotion sign, changing a price, cleaning, restocking, rearranging products, and so forth. In some examples, a machine learning model may be trained using training examples to detect actions from vibration data and images. An example of such training example may include a sample vibration data and a sample image, together with a label indicating whether the sample vibration data and the sample image corresponds to an action performed in an environment. In one example, Step 1606 may use the trained machine learning model to analyze the vibration data received by Step 1602 and the at least one image received by Step 1604 to detect the action performed in the retail environment. In some example, Step 1606 may use an artificial neural network to analyze the vibration data received by Step 1602 and the at least one image received by Step 1604 to detect the action performed in the retail environment.

In some examples, Step 1606 may calculate a convolution of at least part of the at least one image received by Step 1604 to obtain a value of the calculated convolution, and may use the value of the calculated convolution to analyze the vibration data received by Step 1602 to detect the action performed in the retail environment. For example, Step 1606 may analyze the vibration data received by Step 1602 using a parametric model to detect the action performed in the retail environment, and the parameter may be selected based on the value of the calculated convolution. In another example, in response to a first value of the calculated convolution, Step 1606 may analyze the vibration data received by Step 1602 using a first analysis step to detect the action performed in the retail environment, and in response to a second value of the calculated convolution, Step 1606 may analyze the vibration data received by Step 1602 using a second analysis step to detect the action performed in the retail environment, the second analysis step may differ from the first analysis step.

In some examples, Step 1606 may calculate a convolution of at least part of the vibration data received by Step 1602 to obtain a value of the calculated convolution, and may use the value of the calculated convolution to analyze the at least one image received by Step 1604 to detect the action performed in the retail environment. For example, Step 1606 may analyze at least one image received by Step 1604 using a parametric model to detect the action performed in the retail environment, and the parameter may be selected based on the value of the calculated convolution. In another example, in response to a first value of the calculated convolution, Step 1606 may analyze the at least one image received by Step 1604 using a first analysis step to detect the action performed in the retail environment, and in response to a second value of the calculated convolution, Step 1606 may analyze the at least one image received by Step 1604 using a second analysis step to detect the action performed in the retail environment, the second analysis step may differ from the first analysis step.

In some examples, the vibration data received by Step 1602 may include a time series of samples captured using the one or more vibration sensors at different points in time. In some examples, Step 1606 may compare two samples of the time series of samples, and may use a result of the comparison to analyze the at least one image received by Step 1604 to detect the action performed in the retail environment. For example, Step 1606 may analyze at least one image received by Step 1604 using a parametric model to detect the action performed in the retail environment, and the parameter may be selected based on the result of the comparison. In another example, in response to a first result of the comparison, Step 1606 may analyze the at least one image received by Step 1604 using a first analysis step to detect the action performed in the retail environment, and in response to a second result of the comparison, Step 1606 may analyze the at least one image received by Step 1604 using a second analysis step to detect the action performed in the retail environment, the second analysis step may differ from the first analysis step.

In some examples, the at least one image received by Step 1604 may include a plurality of frames of a video captured using the at least one image sensor. In some examples, Step 1606 may compare two frames of the plurality of frames, and may use a result of the comparison to analyze the vibration data received by Step 1602 to detect the action performed in the retail environment. For example, Step 1606 may analyze the vibration data received by Step 1602 using a parametric model to detect the action performed in the retail environment, and the parameter may be selected based on the result of the comparison. In another example, in response to a first result of the comparison, Step 1606 may analyze the vibration data received by Step 1602 using a first analysis step to detect the action performed in the retail environment, and in response to a second result of the comparison, Step 1606 may analyze the vibration data received by Step 1602 using a second analysis step to detect the action performed in the retail environment, the second analysis step may differ from the first analysis step.

In some examples, Step 1606 may analyzing the vibration data received by Step 1602 to select a portion of the at least one image received by Step 1604. For example, in response to a first vibration data received by Step 1602, Step 1604 may select a first portion of the at least one image received by Step 1604, and in response to a second vibration data received by Step 1602, Step 1604 may select a second portion of the at least one image received by Step 1604, the second portion may differ from the first portion. In another example, the vibration data received by Step 1602 may include spatial properties, and Step 1606 may select the portion of the at least one image received by Step 1604 based on the spatial properties. For example, the spatial properties may include an indication of a region in the retail environment, and Step 1606 may select a portion of the at least one image received by Step 1604 corresponding to the indicated region of the retail environment. Further, in some examples, Step 1606 may analyzing the selected portion of the at least one image to detect the action performed in the retail environment, for example using the image analysis described above.

In some examples, Step 1606 may comprise analyzing the vibration data received by Step 1602 to attempt to detect the action performed in the retail environment, for example using a pattern recognition algorithm. In some examples, for example in response to a failure of the attempt to successfully detect the action, Step 1606 may analyze the at least one image received by Step 1604 to detect the action performed in the retail environment, for example using a visual action recognition algorithm. In one example, for example in response to a failure to successfully detect the action, method 1600 may trigger the capturing of the at least one image using the at least one image sensor. In one example, the failure to successfully detect the action may be a failure to successfully detect the action at a confidence level higher than a selected threshold. In another example, the failure to successfully detect the action may be a failure to determine at least one aspect of the action. Some non-limiting examples of such aspect may include at least one of a type of the action, a product type associated with the action, and a quantity of products associated with the action.

In some examples, Step 1608 may comprise providing information based on the action detected by Step 1606. For example, providing the information based on the action detected by Step 1606 may comprise at least one of storing the information in memory, transmitting the information to an external device, providing the information to a user (for example, visually, audibly, textually, through a user interface, etc.), and so forth.

In some examples, detecting the action performed in the retail environment by Step 1606 may further include recognizing a type of the action. For example, Step 1606 may use a classification model to classify the action to a particular class of a plurality of alternative classes, each class of the plurality of alternative classes may correspond to a different type of action. In another example, Step 1606 may analyze the vibration data received by Step 1602 and the at least one image received by Step 1604 (for example using the classification mode, using a machine learning model trained using training examples to recognize types of actions from records including both vibration data and images, using an artificial neural network, and so forth) to recognize the type of the action. Some non-limiting examples of such types of actions may include picking an item, picking a product, placing an item, placing a product, moving an item, moving a product, placing a label (such as a shelf label), remoting a label (such as a shelf label), placing a promotional sign, removing a promotion sign, changing a price, cleaning, restocking, rearranging products, and so forth. Further, in some examples, the information provided by Step 1608 may be based on the type of the action. In one example, the information provided by Step 1608 may include an indication of the type of the action. In one example, in response to a first type of the action, Step 1608 may provide first information, and in response to a second type of the action, Step 1608 may provide second information, the second information may differ from the first information. In one example, in response to a first type of the action, Step 1608 may provide the information, and in response to a second type of the action, Step 1608 may forgo providing the information.

In some examples, detecting the action performed in the retail environment by Step 1606 may further include identifying a product type associated with the action. For example, Step 1606 may use a classification model to classify the action to a particular class of a plurality of alternative classes, each class of the plurality of alternative classes may correspond to a different product type. In another example, Step 1606 may analyze the vibration data received by Step 1602 and the at least one image received by Step 1604 (for example using the classification mode, using a machine learning model trained using training examples to identify product types of products associated with actions from records including both vibration data and images, using an artificial neural network, and so forth) to identify the product type. In one example, the action may include at least one of picking, placing and moving a product, and the product type associated with the action may be a product type of the product. In one example, the action may include at least one of placing and remoting a label (such as a shelf label), and the product type associated with the action may be a product type indicated by the label (for example, by text printed on the label, by a logo on the label, by a picture on the label, by a visual code on the label, and so forth). In one example, the action may include at least one of placing and removing a promotion sign, and the product type associated with the action may be a product type associated with the promotion sign. In one example, the action may include changing a price of products of a particular product type, and the product type associated with the action may be the particular product type. Further, in some examples, the information provided by Step 1608 may be based on the product type associated with the action. In one example, the information provided by Step 1608 may include an indication of the product type (for example, textual indication, a picture of a product of the product type, a barcode associated with the product type, and so forth). In one example, in response to a first product type associated with of the action, Step 1608 may provide first information, and in response to a second product type associated with of the action, Step 1608 may provide second information, the second information may differ from the first information. In one example, in response to a first product type associated with of the action, Step 1608 may provide the information, and in response to a second product type associated with of the action, Step 1608 may forgo providing the information.

In some examples, detecting the action performed in the retail environment by Step 1606 may further include determining a quantity of products associated with the action. For example, Step 1606 may use a regression model to determine the quantity of products associated with the action. In another example, Step 1606 may analyze the vibration data received by Step 1602 and the at least one image received by Step 1604 (for example using the classification mode, using a machine learning model trained using training examples to determine quantity of products associated with actions from records including both vibration data and images, using an artificial neural network, and so forth) to determine the quantity of products associated with the action. In one example, the action may include at least one of picking, placing and moving at least one product, and the quantity of products associated with the action may be the quantity of products picked, placed and/or moved in the action. In one example, the action may include at least one of placing and removing a promotion sign, and the quantity of products associated with the action may be a quantity of products indicated in the promotion sign. Further, in some examples, the information provided by Step 1608 may be based on the quantity of products associated with the action. In one example, the information provided by Step 1608 may include an indication of the quantity of products associated with the action. In one example, in response to a first quantity of products associated with the action, Step 1608 may provide first information, and in response to a second quantity of products associated with the action, Step 1608 may provide second information, the second information may differ from the first information. In one example, in response to a first quantity of products associated with the action, Step 1608 may provide the information, and in response to a second quantity of products associated with the action, Step 1608 may forgo providing the information.

In some examples, the vibration data received by Step 1602 may include a time series of samples captured using the one or more vibration sensors at different points in time. In some examples, Step 1604 may further comprise analyzing the time series of the samples captured using the one or more vibration sensors at the different points in time to select the at least one image of a plurality of images. For example, in response to a first result of the analysis of the time series of samples, Step 1604 may selected a first subgroup of the plurality of images, and in response to a second result of the analysis of the time series of samples, Step 1604 may selected a second subgroup of the plurality of images, the second subgroup may differ from the first subgroup. In another example, Step 1604 may analyze the time series of the samples captured using the one or more vibration sensors at the different points in time to select a particular point in time (for example, a point in time corresponding to an extremum of the samples, a point in time corresponding to a sample satisfying a particular criterion, and so forth), each image of the plurality of images may correspond to a different point in time (for example, based on the capturing time of the image), and Step 1604 may select the image of the plurality of images corresponding to the particular point in time (or corresponding to a point in time nearest to the particular point in time of the points in time corresponding to the plurality of images).

In some example, Step 1606 may calculate a convolution of at least part of the at least one image to obtain a value of the calculated convolution. Further, Step 1606 may analyze the vibration data to determine a frequency associated with the vibration data, for example using spectral analysis of the vibration data, using narrow-band frequency analysis, and so forth. Some non-limiting examples of such determined frequency associated with the vibration data may include a prominent periodic frequency, a prominent frequency in a selected range of frequencies, the second most prominent periodic frequency, and so forth. In one example, in response to a first combination of the value of the calculated convolution and the frequency associated with the vibration data, Step 1606 may detect the action performed in the retail environment, and in response to a second combination of the value of the calculated convolution and the frequency associated with the vibration data, Step 1606 may forgo the detection of the action performed in the retail environment. In another example, in response to a first combination of the value of the calculated convolution and the frequency associated with the vibration data, Step 1606 may determine a first type of the action performed in the retail environment, and in response to a second combination of the value of the calculated convolution and the frequency associated with the vibration data, Step 1606 may determine a second type of the action performed in the retail environment, the second type may differ from the first type.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A non-transitory computer-readable medium including instructions that when executed by a processor cause the processor to perform a method for triggering image processing based on vibration data analysis, the method comprising:
receiving vibration data captured using one or more vibration sensors mounted to a shelving unit including a plurality of retail shelves;
analyzing the vibration data to determine whether a vibration is a result of an engagement of a person with at least one retail shelf of the plurality of retail shelves;
performing, based on the analysis of the vibration data, a selective image analysis associated with the at least one retail shelf of the plurality of retail shelves, the selective image analysis including either:
in response to a determination that the vibration is the result of the engagement of the person with the at least one retail shelf of the plurality of retail shelves:
triggering analysis of at least one image of at least part of the plurality of retail shelves captured after the beginning of the engagement of the person with the at least one retail shelf of the plurality of retail shelves; and
providing information based on a result of the analysis of the at least one image of the at least part of the plurality of retail shelves; or
in response to a determination that the vibration is not the result of the engagement of the person with the at least one retail shelf of the plurality of retail shelves, forgoing triggering the analysis of the at least one image.

2. The non-transitory computer-readable medium of claim 1, wherein the plurality of retail shelves includes at least a first retail shelf and a second retail shelf, the method further comprises:
analyzing the vibration data to determine that the vibration is a result of an engagement with the first retail shelf of the plurality of retail shelves and not a result of an engagement with the second retail shelf of the plurality of retail shelves; and
in response to the determination that the vibration is a result of an engagement with the first retail shelf of the plurality of retail shelves and not a result of an engagement with the second retail shelf of the plurality of retail shelves, avoiding including images depicting the second shelf in the at least one image.

3. The non-transitory computer-readable medium of claim 1, wherein the at least one image is at least one image of the at least part of the plurality of retail shelves captured after a completion of the engagement of the person with the at least one retail shelf.

4. The non-transitory computer-readable medium of claim 3, wherein the method further comprises analyzing the vibration data to determine the completion of the engagement of the person with the at least one retail shelf.

5. The non-transitory computer-readable medium of claim 3, wherein the method further comprises analyzing one or more images of the at least one retail shelf to determine the completion of the engagement of the person with the at least one retail shelf.

6. The non-transitory computer-readable medium of claim 3, wherein the method further comprises analyzing infrared data captured using at least one infrared sensor to determine a completion of the engagement of the person with the at least one retail shelf.

7. The non-transitory computer-readable medium of claim 3, wherein the method further comprises using the analysis of the at least one image of the at least part of the plurality of retail shelves to determine a state of at least one retail shelf after the completion of the engagement.

8. The non-transitory computer-readable medium of claim 7, wherein the determined state of the at least one retail shelf includes an inventory data associated with products on the at least one retail shelf after the completion of the engagement, the inventory data is determined using the analysis of the at least one image.

9. The non-transitory computer-readable medium of claim 7, wherein the determined state of the at least one retail shelf includes facings data associated with products on the at least one retail shelf after the completion of the engagement, the facings data is determined using the analysis of the at least one image.

10. The non-transitory computer-readable medium of claim 7, wherein the determined state of the at least one retail shelf includes planogram compliance status of the at least one retail shelf after the completion of the engagement, the planogram compliance status is determined using the analysis of the at least one image.

11. The non-transitory computer-readable medium of claim 7, wherein the method further comprises using the analysis of the at least one image and an analysis of one or more images of the at least one retail shelf captured using the at least one image sensor before the engagement to determine a change associated with the at least one retail shelf during the engagement.

12. The non-transitory computer-readable medium of claim 1, wherein the at least one image is captured using at least one image sensor mounted to a retail shelf not included in the at least one retail shelf.

13. The non-transitory computer-readable medium of claim 1, wherein the at least one image is captured using at least one image sensor mounted to an image capturing robot.

14. The non-transitory computer-readable medium of claim 1, wherein the at least one image is captured using at least one image sensor mounted to a ceiling of a retail store.

15. The non-transitory computer-readable medium of claim 1, wherein the at least one image is captured using at least one image sensor included in a personal mobile device.

16. The non-transitory computer-readable medium of claim 1, wherein the method further comprises, in response to the determination that the vibration is a result of the engagement of the person with the at least one retail shelf, triggering capturing of the at least one image of the at least part of the plurality of retail shelves.

17. The non-transitory computer-readable medium of claim 1, wherein the method further comprises:

analyzing the vibration data to determine a type of the engagement of the person with the at least one retail shelf;
in response to a first determined type of the engagement, including a first analysis step in the analysis of the at least one image of the at least part of the plurality of retail shelves; and
in response to a second determined type of the engagement, including a second analysis step in the analysis of the at least one image of the at least part of the plurality of retail shelves, the second analysis step differs from the first analysis step.

18. The non-transitory computer-readable medium of claim 1, wherein the method further comprises:
analyzing the vibration data to determine a type of the engagement of the person with the at least one retail shelf;
in response to a first determined type of the engagement, triggering the analysis of the at least one image of the at least part of the plurality of retail shelves; and
in response to a second determined type of the engagement, forgoing triggering the analysis of the at least one image of the at least part of the plurality of retail shelves.

19. A method for triggering image processing based on vibration data analysis, the method comprising:
receiving vibration data captured using one or more vibration sensors mounted to a shelving unit including a plurality of retail shelves;
analyzing the vibration data to determine whether a vibration is a result of an engagement of a person with at least one retail shelf of the plurality of retail shelves;
performing, based on the analysis of the vibration data, a selective image analysis associated with the at least one retail shelf of the plurality of retail shelves, the selective image analysis including either:
in response to a determination that the vibration is the result of the engagement of the person with the at least one retail shelf of the plurality of retail shelves:
triggering analysis of at least one image of at least part of the plurality of retail shelves captured after the beginning of the engagement of the person with the at least one retail shelf of the plurality of retail shelves; and
providing information based on a result of the analysis of the at least one image of the at least part of the plurality of retail shelves; or
in response to a determination that the vibration is not the result of the engagement of the person with the at least one retail shelf of the plurality of retail shelves, forgoing triggering the analysis of the at least one image.

20. A system for triggering image processing based on vibration data analysis, the system comprising:
at least one processing unit configured to:
receive vibration data captured using one or more vibration sensors mounted to a shelving unit including a plurality of retail shelves;
analyze the vibration data to determine whether a vibration is a result of an engagement of a person with at least one retail shelf of the plurality of retail shelves;
perform, based on the analysis of the vibration data, a selective image analysis associated with the at least one retail shelf of the plurality of retail shelves, the selective image analysis including either:
in response to a determination that the vibration is the result of the engagement of the person with the at least one retail shelf of the plurality of retail shelves;
triggering analysis of at least one image of at least part of the plurality of retail shelves captured after the beginning of the engagement of the person with the at least one retail shelf of the plurality of retail shelves; and
providing information based on a result of the analysis of the at least one image of the at least part of the plurality of retail shelves; or
in response to a determination that the vibration is not the result of the engagement of the person with the at least one retail shelf of the plurality of retail shelves, forgo triggering the analysis of the at least one image.

\* \* \* \* \*